US012759000B2

United States Patent
Boulais

(12) United States Patent
(10) Patent No.: US 12,759,000 B2
(45) Date of Patent: Oct. 13, 2026

(54) FLUID DISPENSER WITH PRIMING MEANS

(71) Applicant: GB DEVELOPPEMENT, Vernon (FR)

(72) Inventor: Guillaume Boulais, Levallois Perret (FR)

(73) Assignee: GB DEVELOPPEMENT, Vernon (FR)

( * ) Notice: Subject to any disclaimer, the term of this patent is extended or adjusted under 35 U.S.C. 154(b) by 293 days.

(21) Appl. No.: 18/272,414

(22) PCT Filed: Jan. 17, 2022

(86) PCT No.: PCT/FR2022/000003

§ 371 (c)(1),
(2) Date: Jul. 14, 2023

(87) PCT Pub. No.: WO2022/152992

PCT Pub. Date: Jul. 21, 2022

(65) Prior Publication Data

US 2024/0066540 A1 Feb. 29, 2024

(30) Foreign Application Priority Data

Jan. 18, 2021 (FR) ....................................... 2100450
Apr. 12, 2021 (FR) ....................................... 2103748
(Continued)

(51) Int. Cl.
*B05B 11/10* (2023.01)

(52) U.S. Cl.
CPC ...... *B05B 11/1061* (2023.01); *B05B 11/1032* (2023.01); *B05B 11/1052* (2023.01); *B05B 11/1064* (2023.01); *B05B 11/1094* (2023.01)

(58) Field of Classification Search
CPC ............. B05B 11/1061; B05B 11/1032; B05B 11/1052; B05B 11/1064; B05B 11/1094;
(Continued)

(56) References Cited

U.S. PATENT DOCUMENTS 2,815,890 A 12/1957 Cooprider et al.
2017/0021375 A1 1/2017 Boulais
(Continued)

FOREIGN PATENT DOCUMENTS

FR 2062908 A1 7/1971
FR 3067952 A1 12/2018
(Continued)

OTHER PUBLICATIONS

International Search Report for corresponding Application No. PCT/FR2022/000003, mailed May 11, 2022.

*Primary Examiner* — Vishal Pancholi
(74) *Attorney, Agent, or Firm* — Lawrence S. Drasner

(57) ABSTRACT

A device for dispensing a fluid, including a bottom part having a bottom wall; a pocket having an interior volume arranged to contain the fluid; a pressing surface arranged to, under the exertion of pressure, reduce the interior volume of the pocket; a feed orifice arranged to feed the fluid to inside the pocket; and a bottom dispensing orifice arranged to release fluid inside the pocket. The device may include a cap, preferably rotating between closed and open positions, which is formed in a one-piece of the pocket and an outlet orifice from which fluid goes to the exterior of the device, and/or means to facilitate priming of the device when the pocket is initially filled at least partially with gas or air, and an outlet.

12 Claims, 52 Drawing Sheets

(30) Foreign Application Priority Data

Jun. 30, 2021 (FR) ........................................ 2107110
Nov. 23, 2021 (FR) ........................................ 2112418

(58) Field of Classification Search
CPC ............. B05B 11/1069; B05B 11/0038; B05B 11/007; B05B 11/1008; B05B 11/0029; A45D 2200/055; A45D 34/04; A45D 34/041
See application file for complete search history.

(56) References Cited

U.S. PATENT DOCUMENTS

| | | | |
|---|---|---|---|
| 2018/0369843 | A1 | 12/2018 | Ezzina et al. |
| 2020/0108991 | A1 | 4/2020 | Warner et al. |
| 2020/0222927 | A1 | 7/2020 | Boulais |

FOREIGN PATENT DOCUMENTS

| | | | |
|---|---|---|---|
| FR | 3068266 | A1 | 1/2019 |
| WO | 2015155318 | A1 | 10/2015 |
| WO | 2017072506 | A1 | 5/2017 |

[Fig.1]
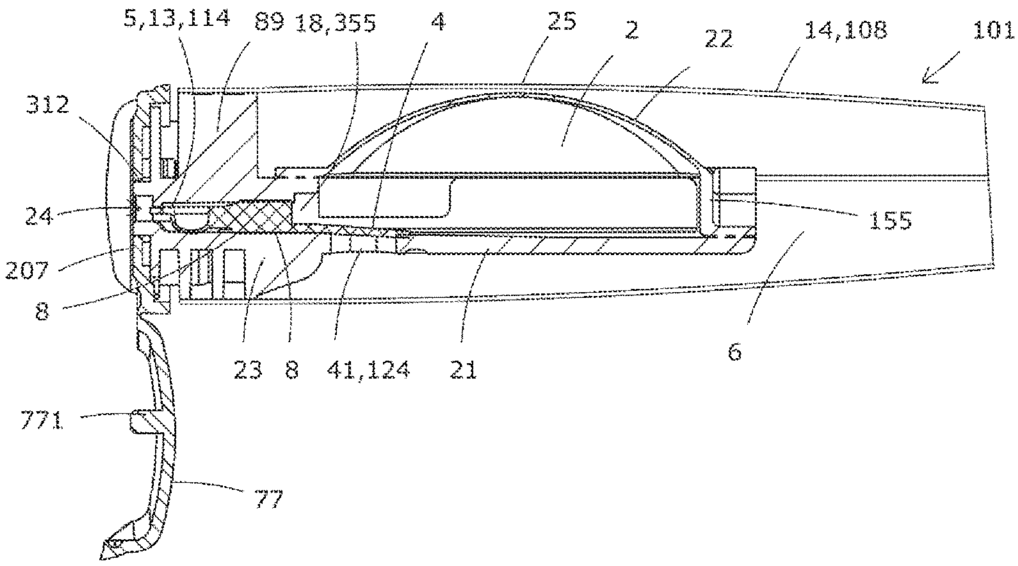
[Fig. 2]
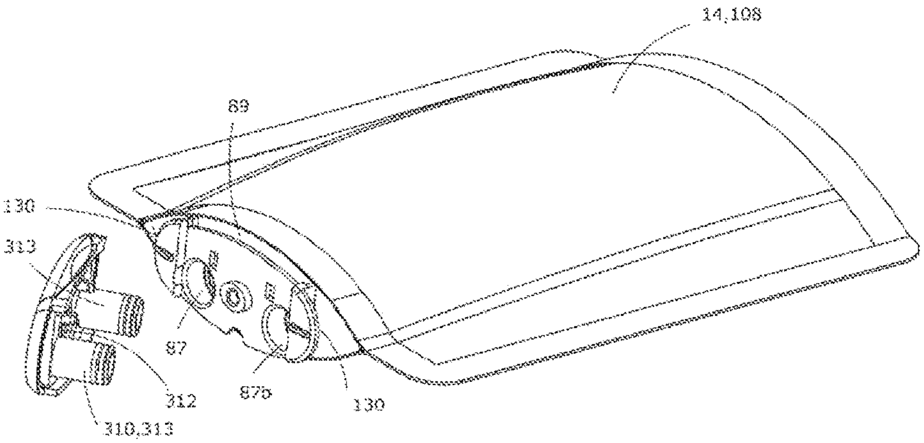
[Fig. 3]
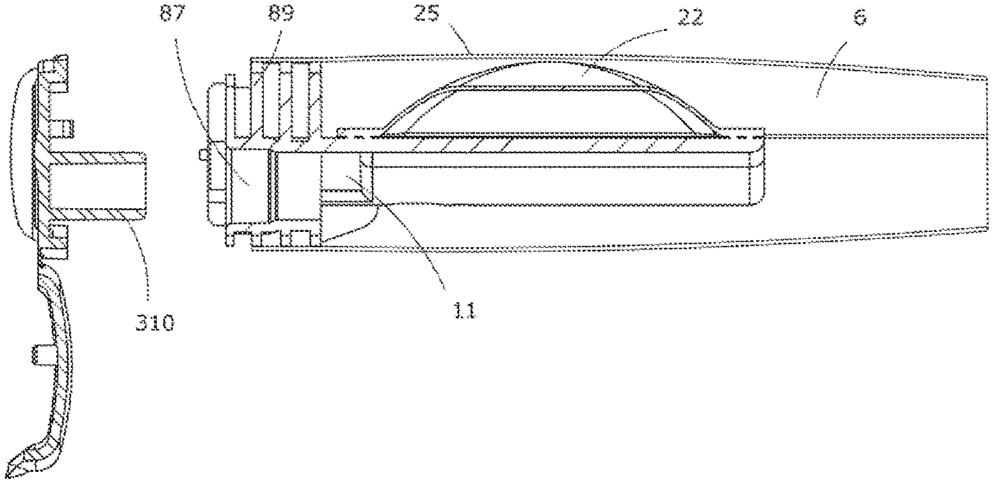

[Fig. 3a]
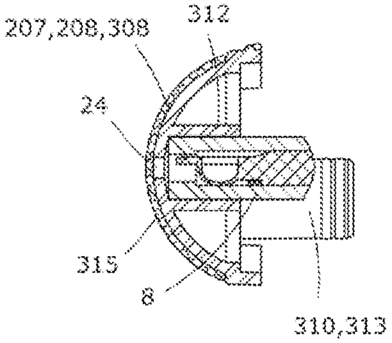
[Fig. 3b]
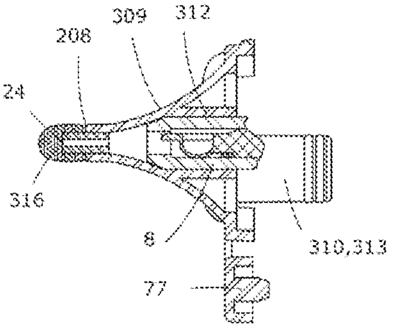
[Fig. 3c]
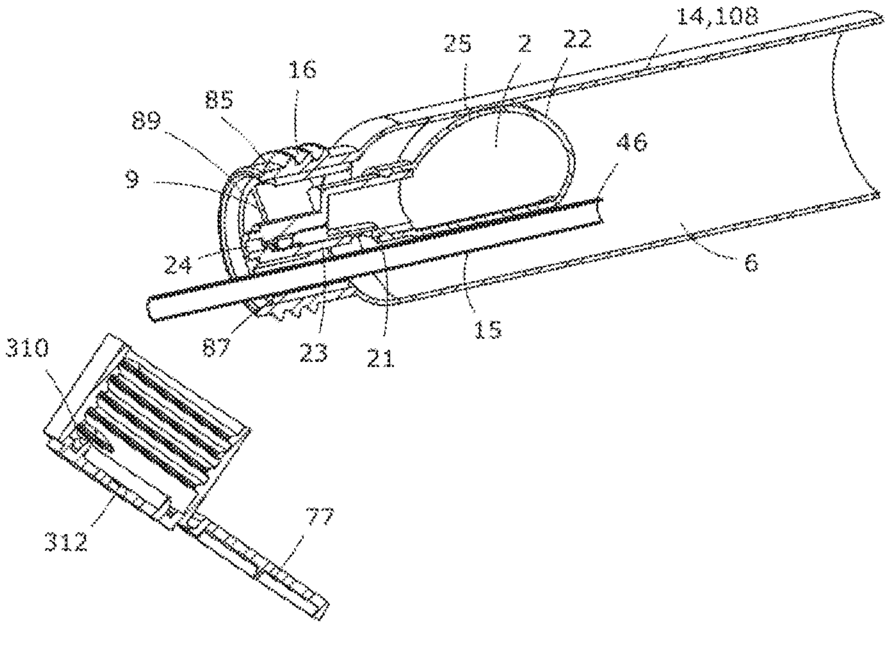

[Fig. 3d]
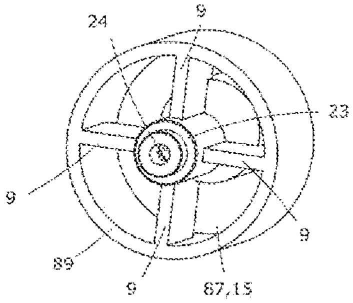
[Fig. 4]
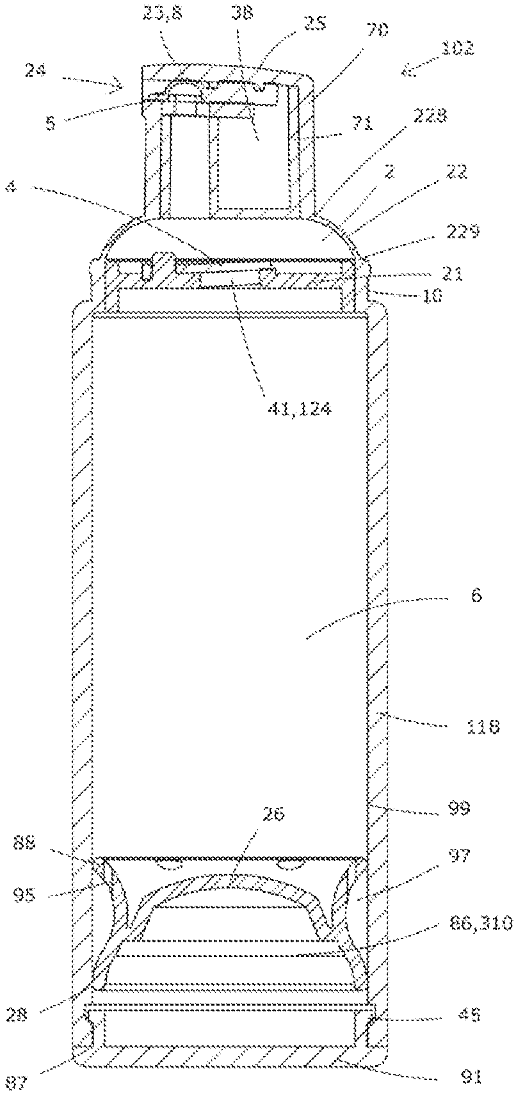

[Fig. 5]
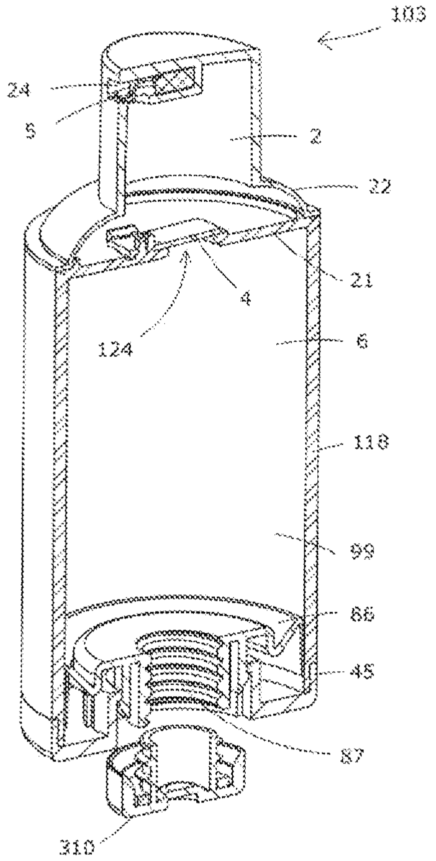
[Fig. 6]
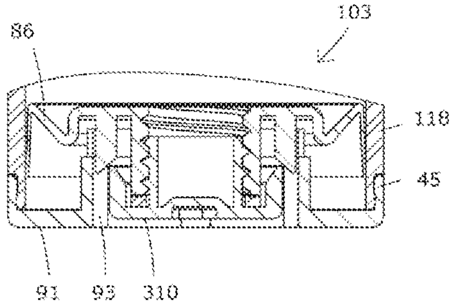
[Fig. 7]
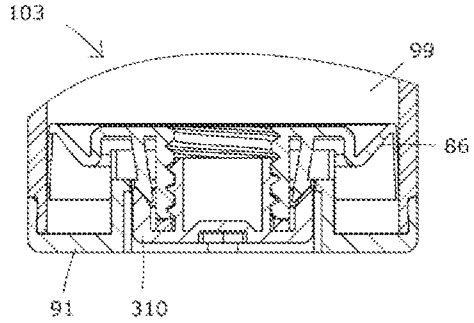

[Fig. 8]
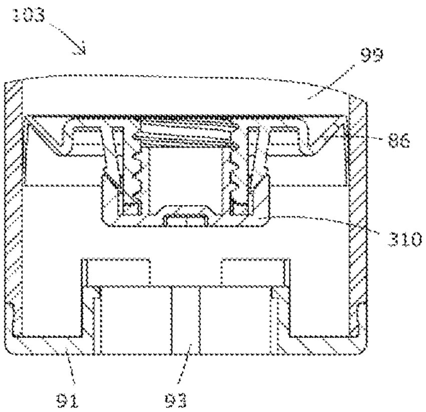
[Fig. 9]
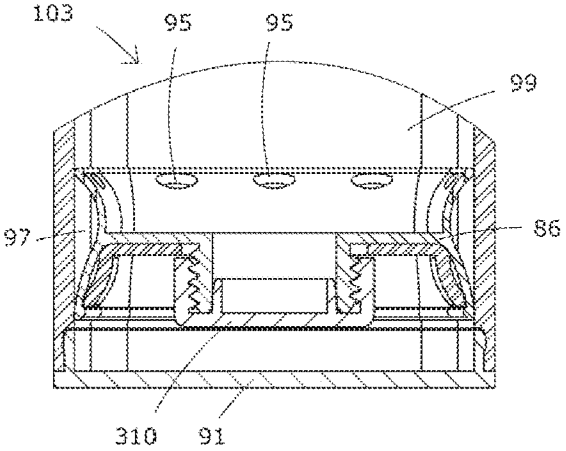
[Fig. 10]
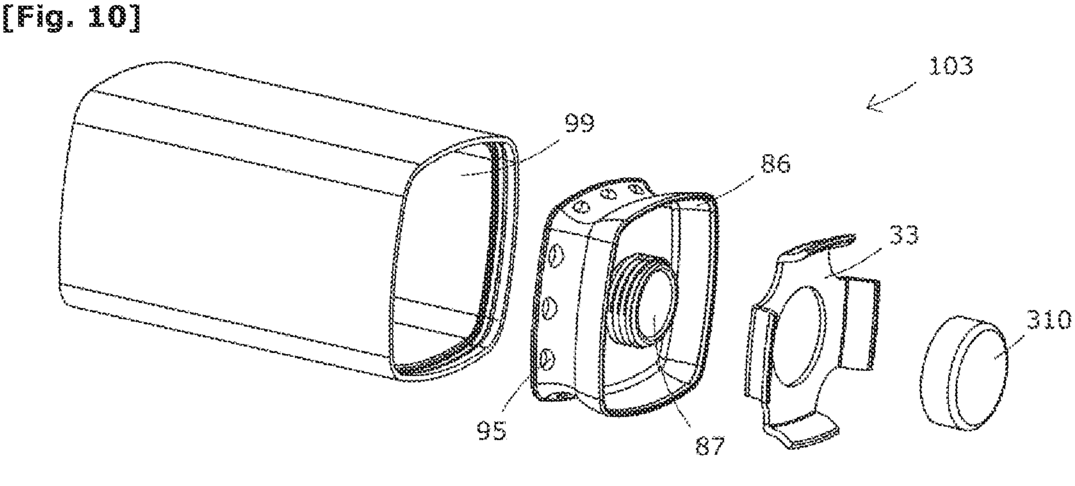

[Fig. 11]
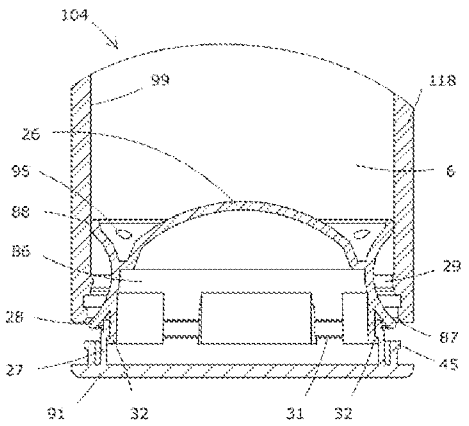
[Fig. 12]
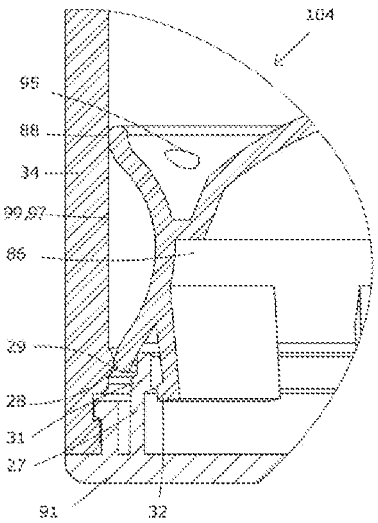
[Fig. 12a]
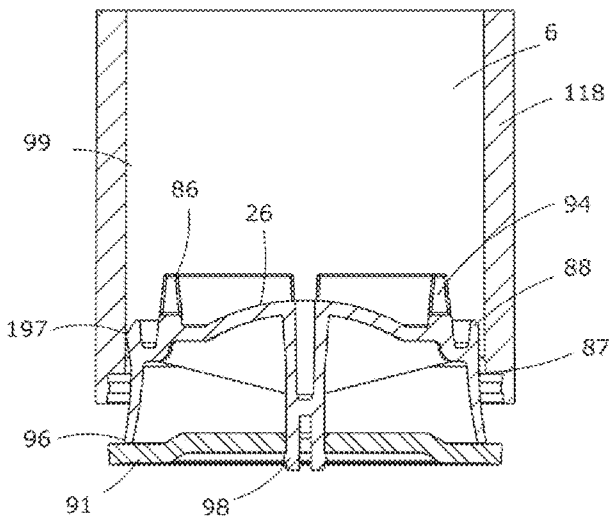

[Fig. 12b]
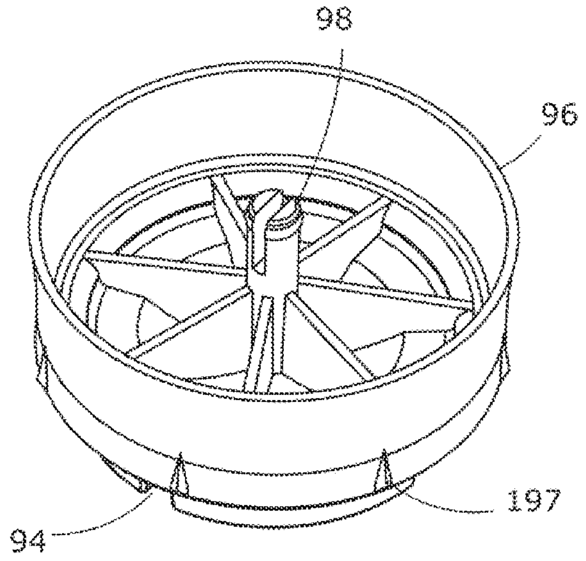
[Fig. 13]
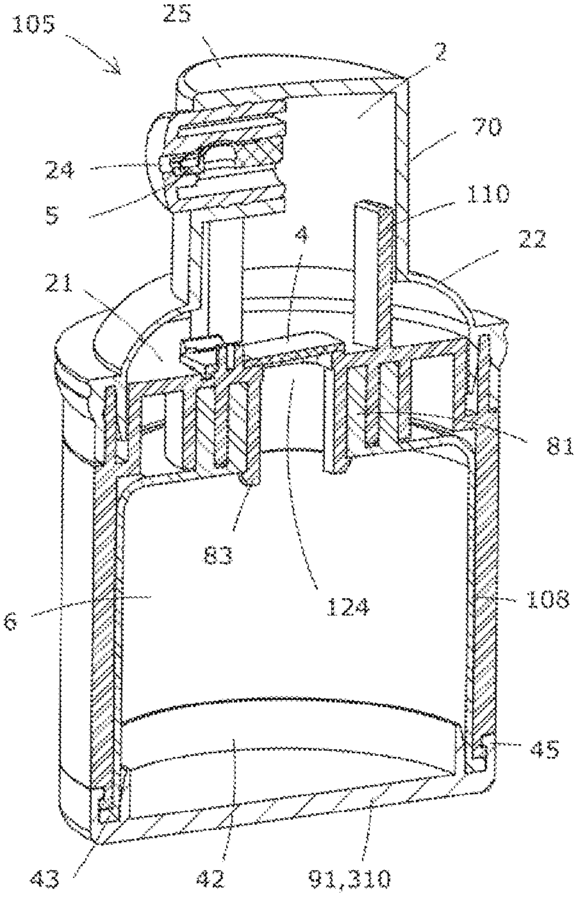

[Fig. 14]
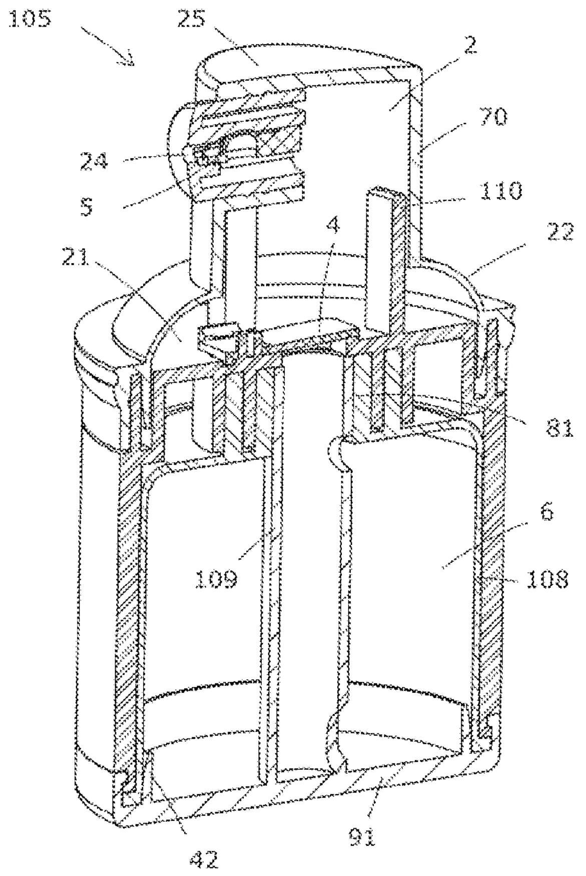
[Fig. 15]
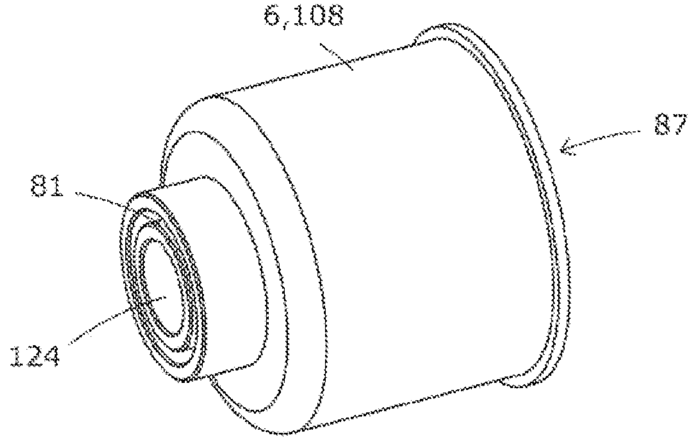

[Fig. 16]
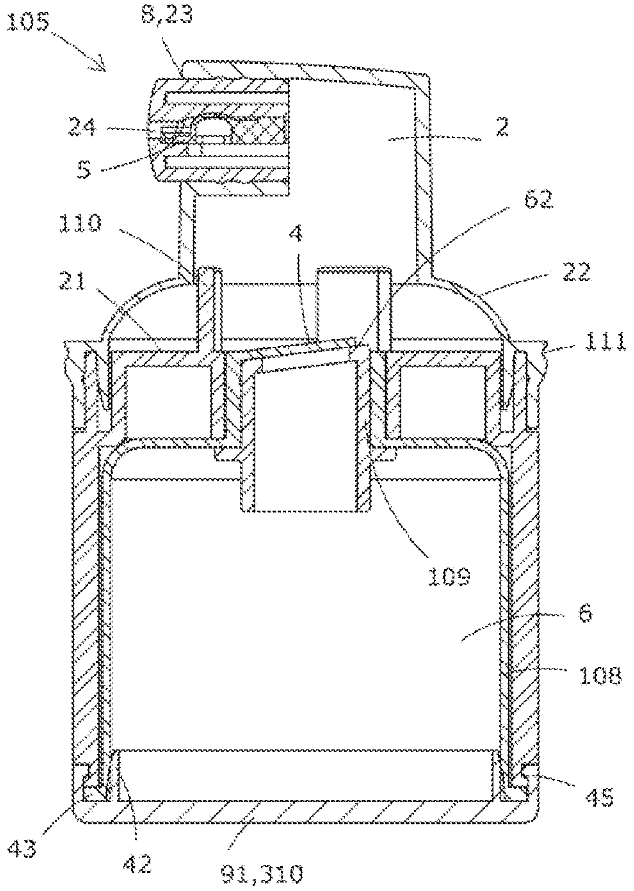
[Fig. 17]
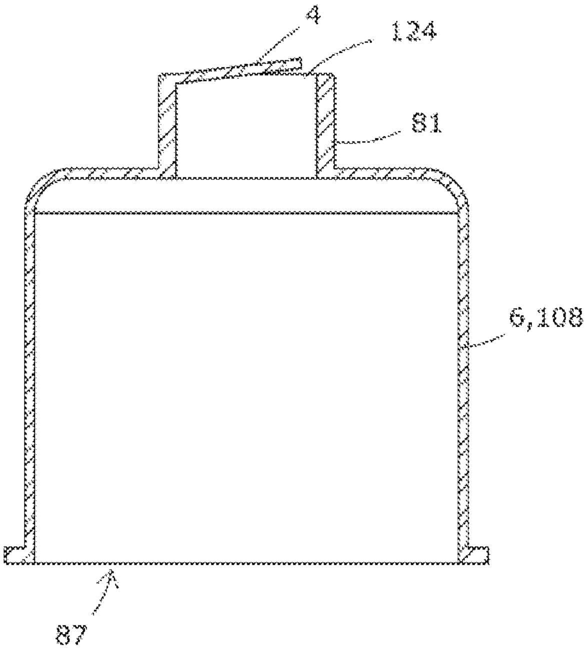

[Fig. 18]
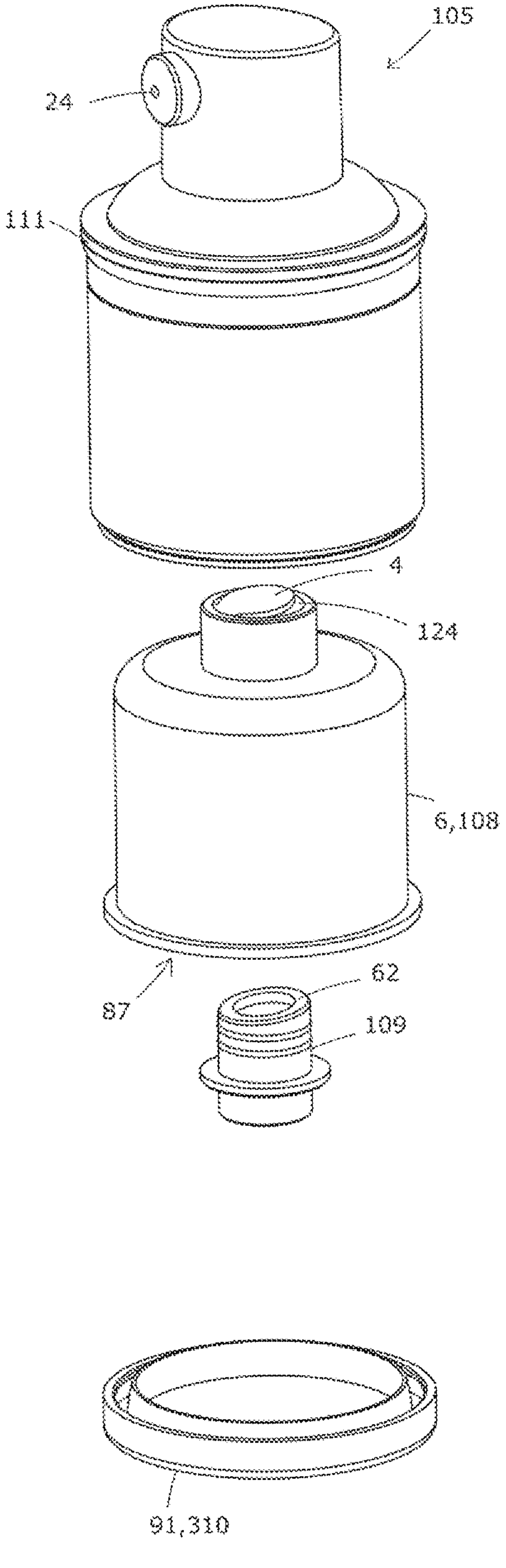

[Fig. 19]
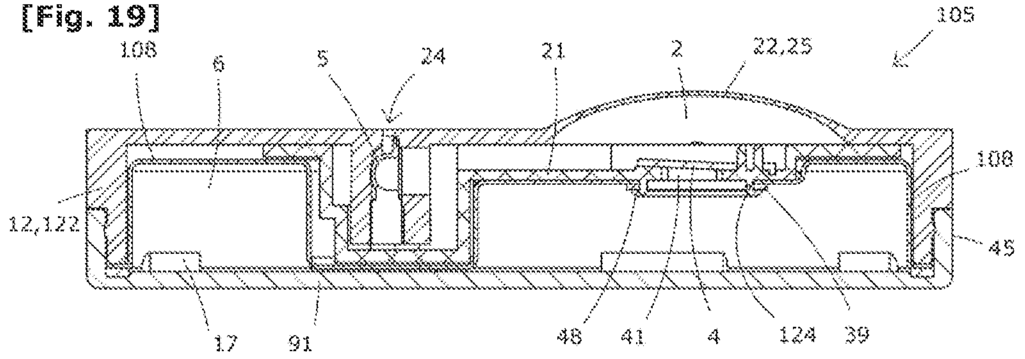
[Fig. 20]
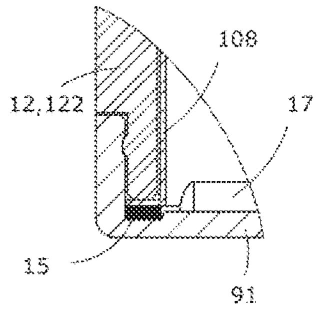
[Fig. 21]
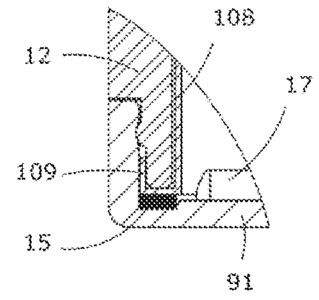
[Fig. 22]
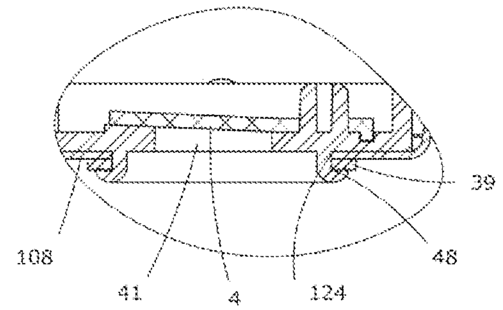

[Fig. 23]
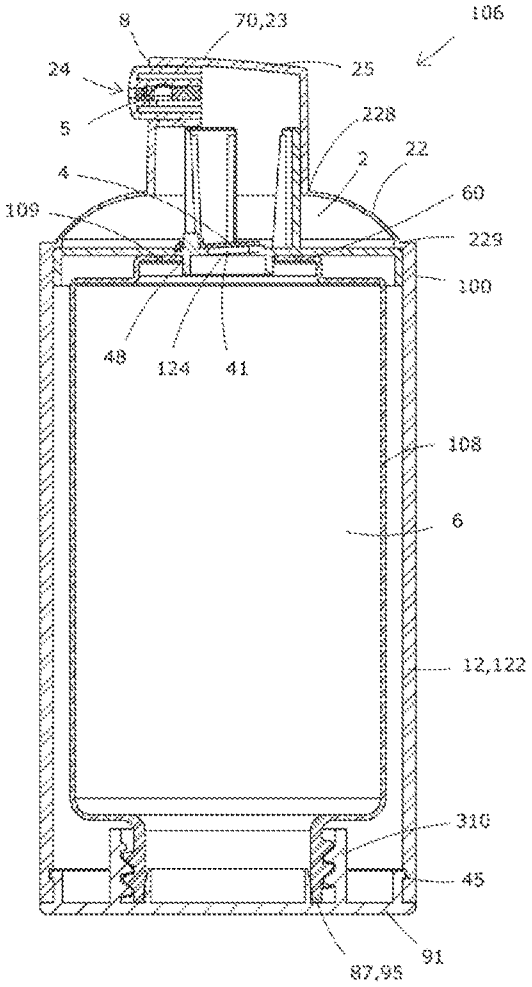

[Fig. 24]
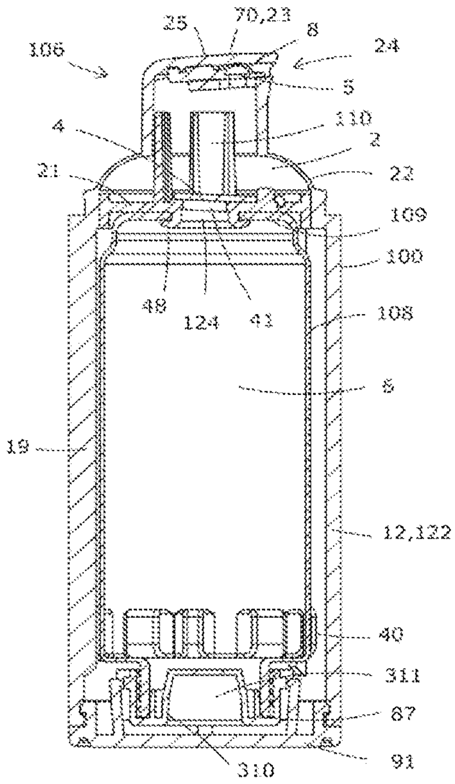
[Fig. 25]
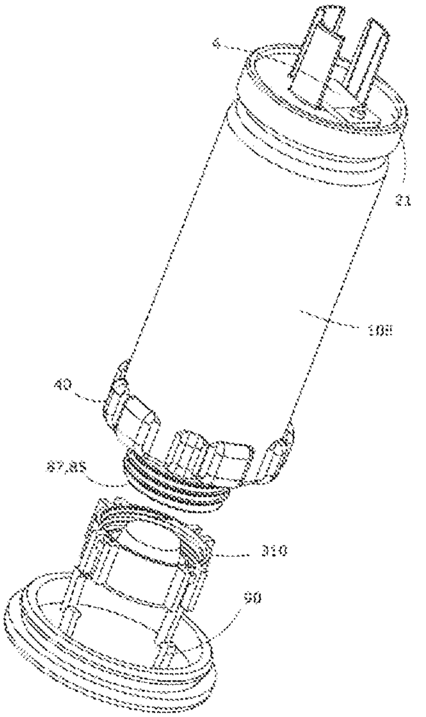

[Fig. 26]
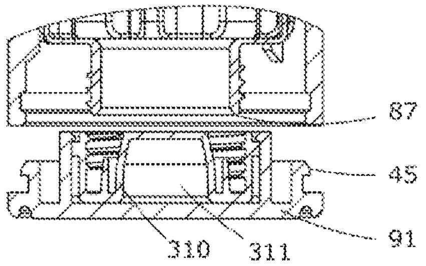
[Fig. 27]
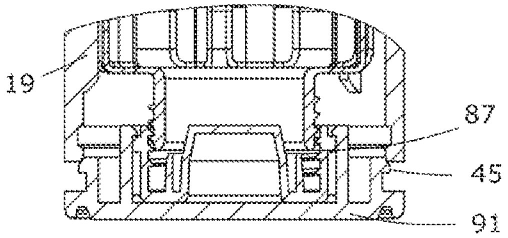
[Fig. 28]
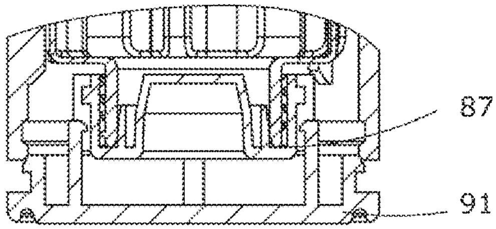
[Fig. 29]
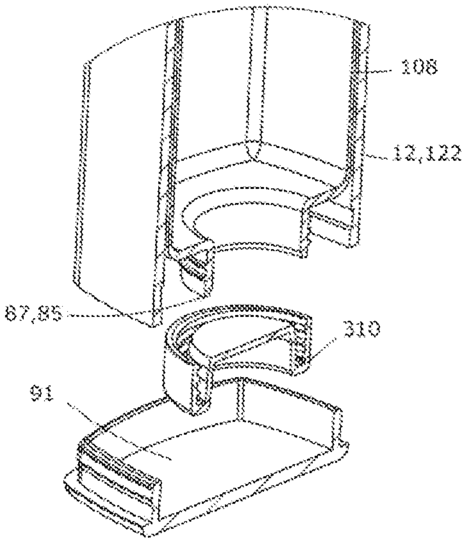

[Fig. 30]
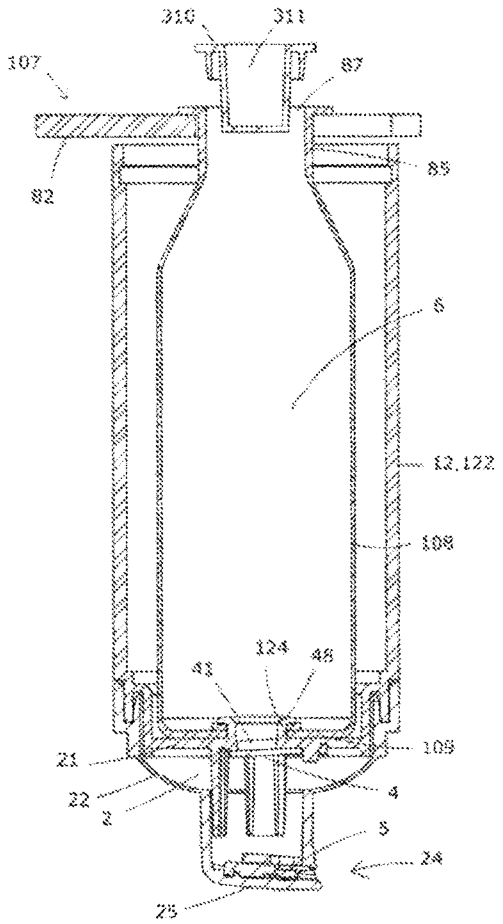
[Fig. 31]
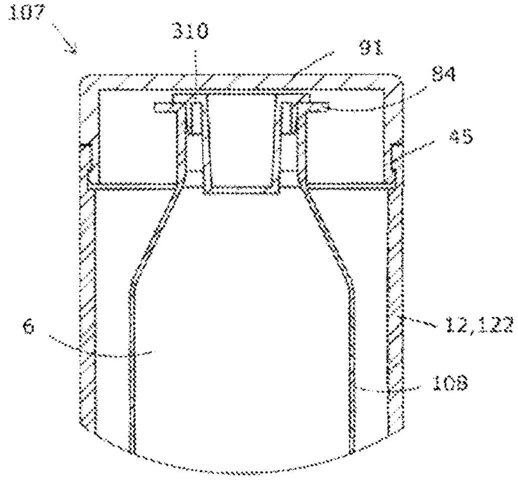

[Fig. 32]
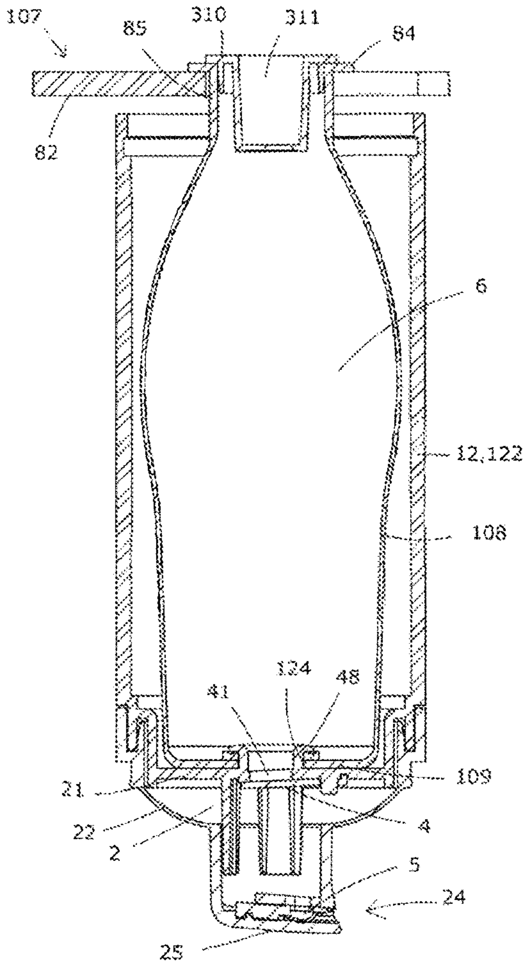
[Fig. 33]
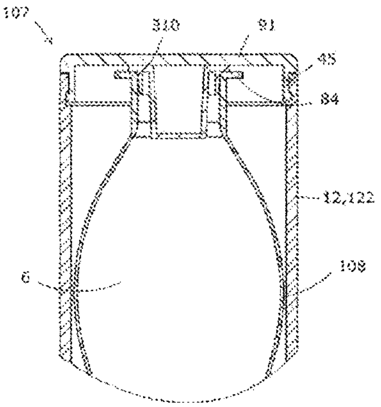

[Fig. 34]
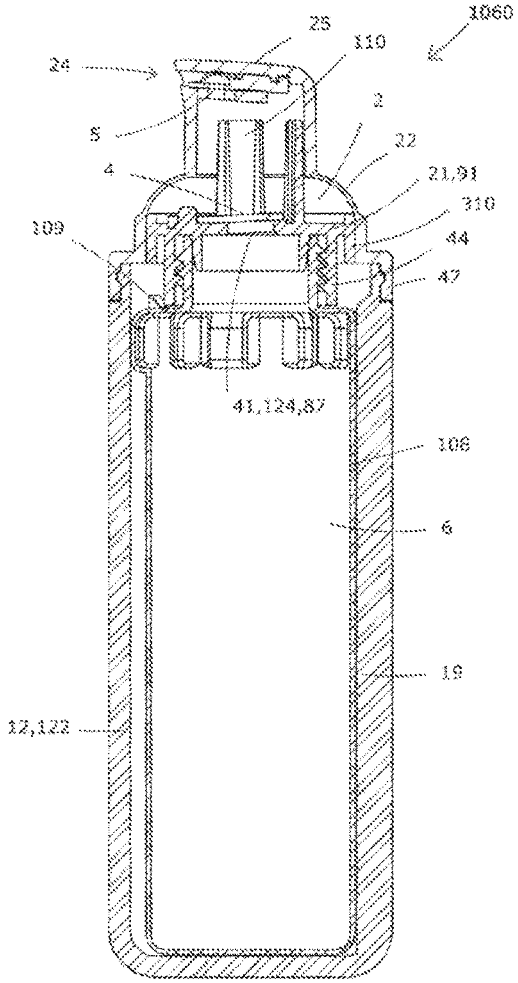

[Fig. 35]
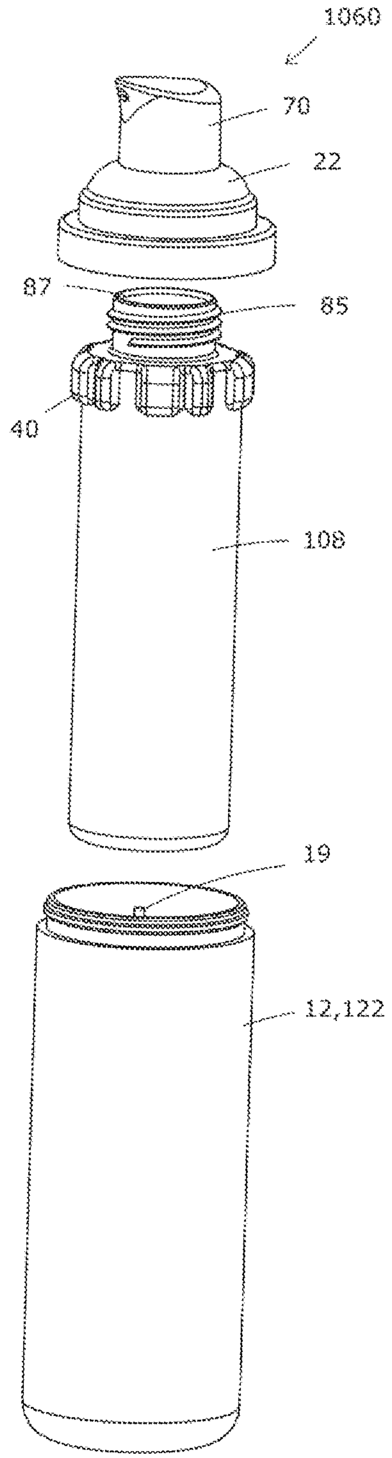

[Fig. 36]
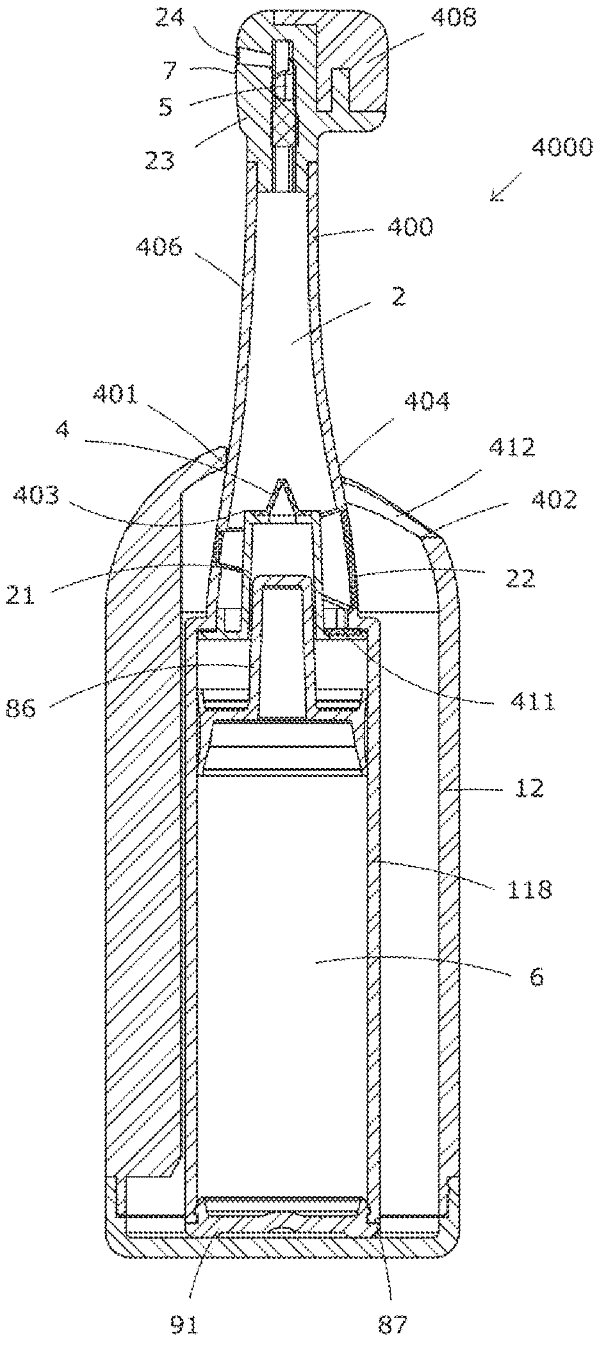

[Fig. 37]
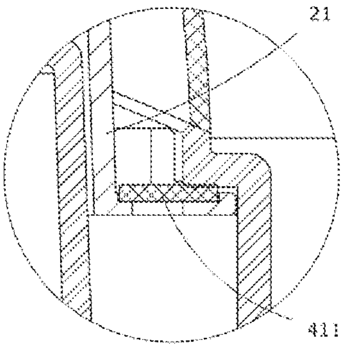
[Fig. 38]
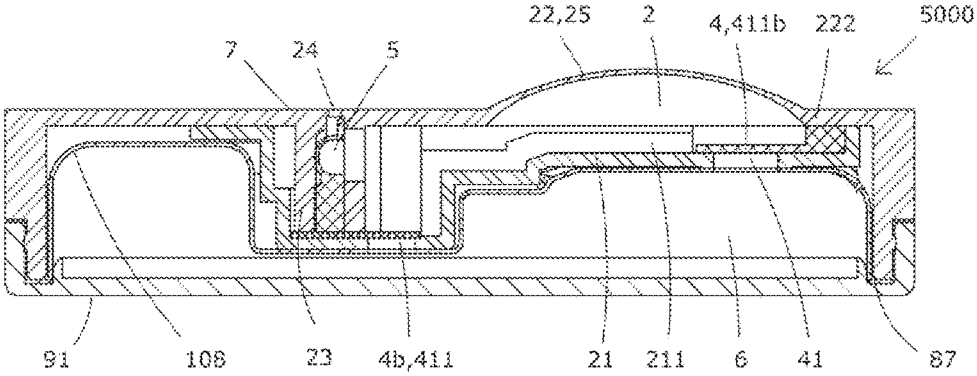
[Fig. 39]
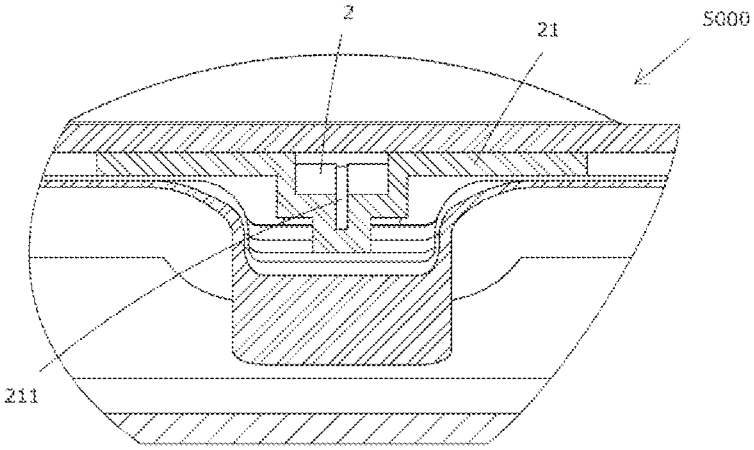

[Fig. 40]
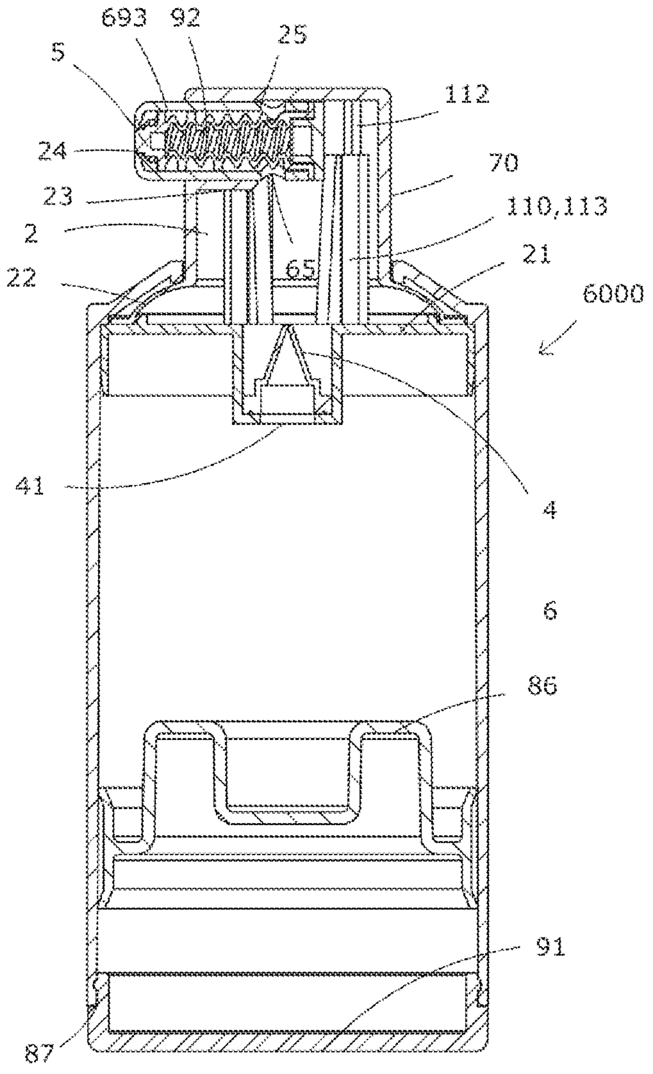
[Fig. 41]
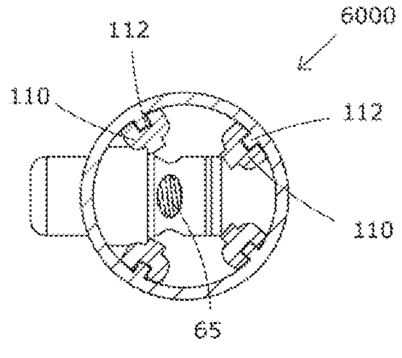

[Fig. 42]
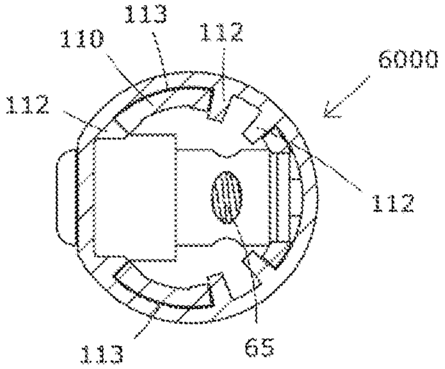
[Fig. 43]
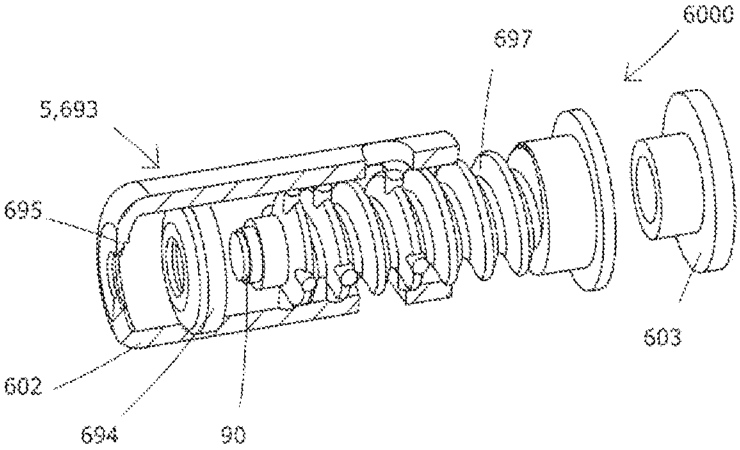
[Fig. 44]
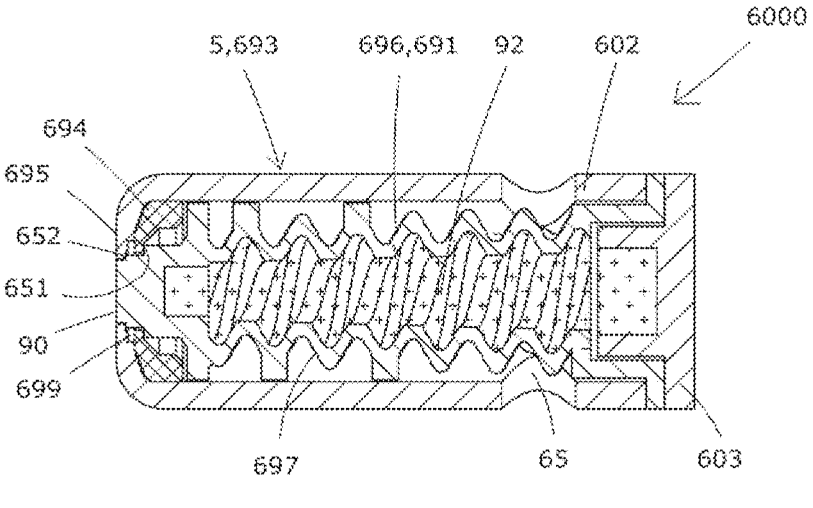

[Fig. 45]
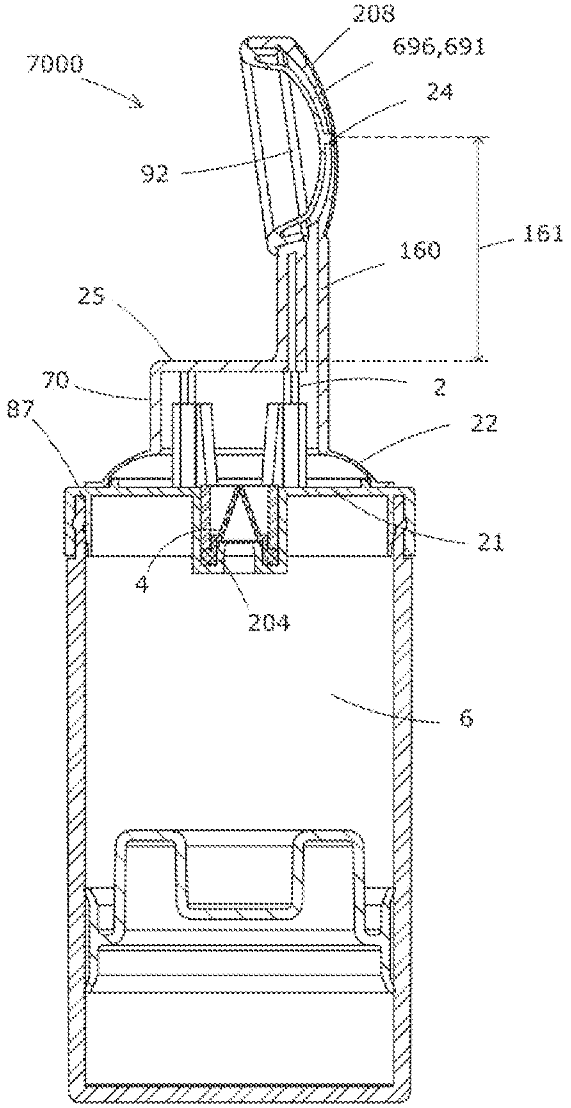

[Fig. 46]
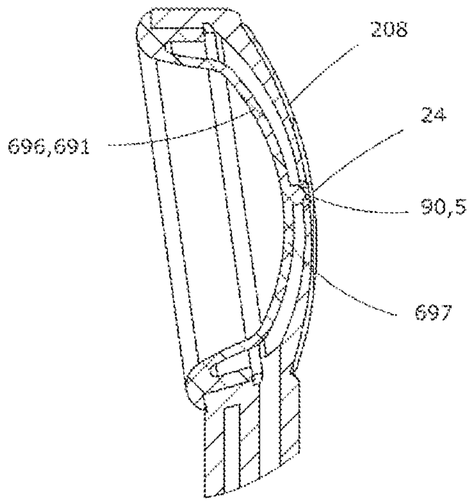
[Fig. 47]
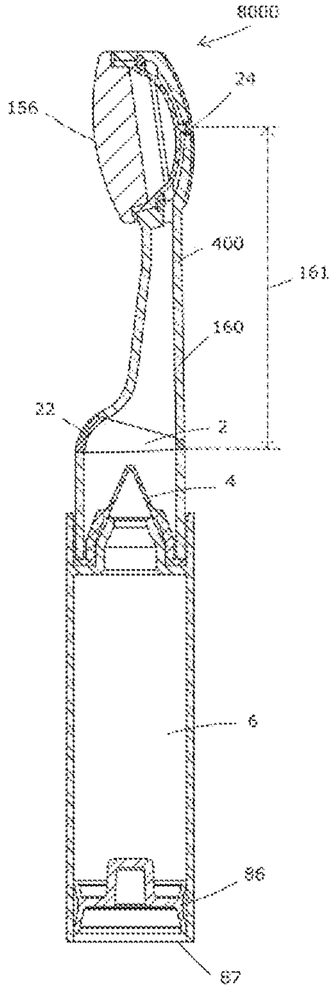

[Fig. 48]
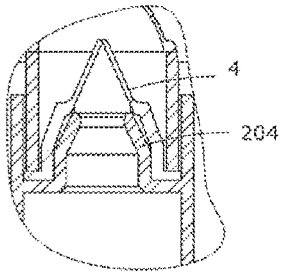
[Fig. 49]
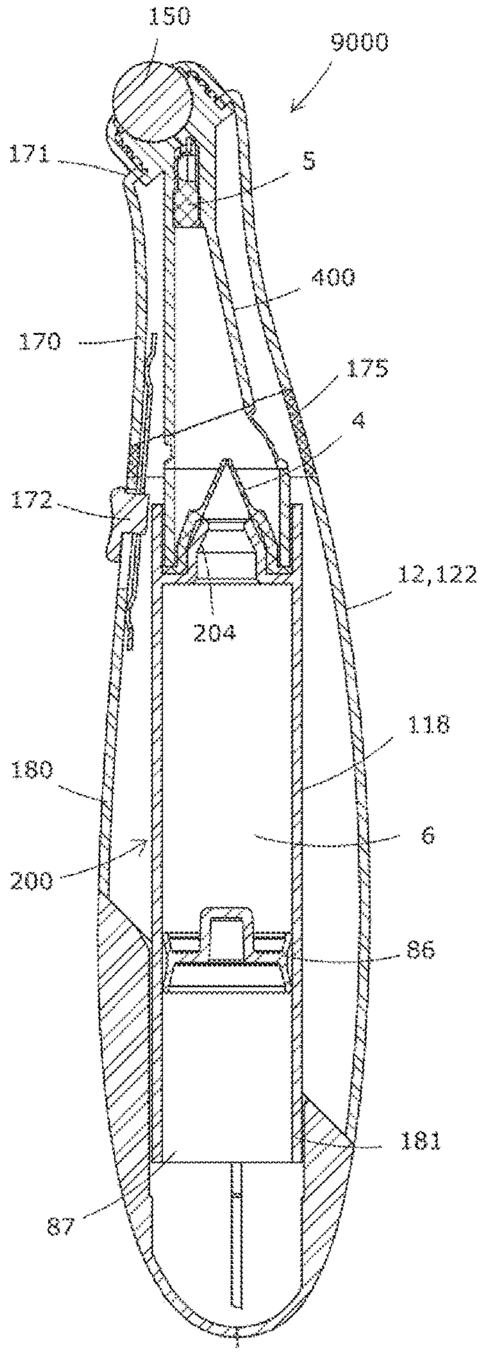

[Fig. 50]
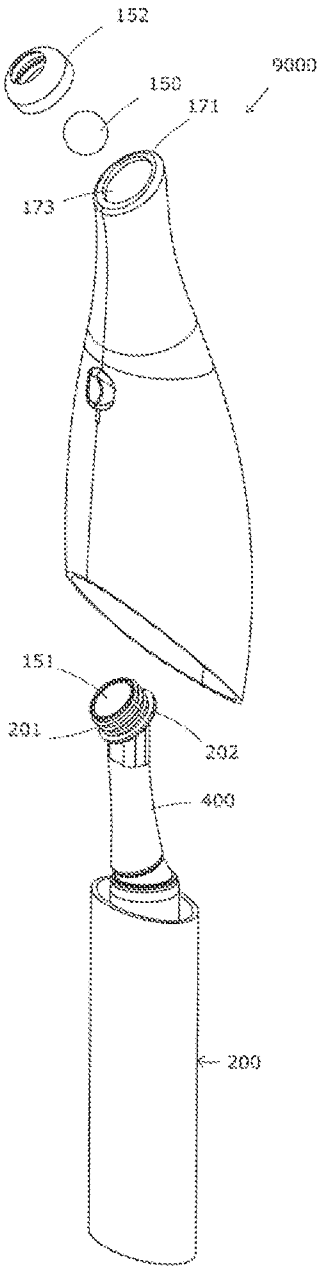

[Fig. 51]
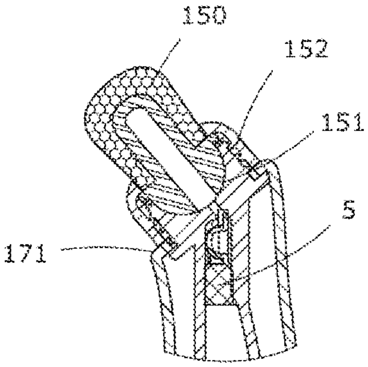
[Fig. 52]
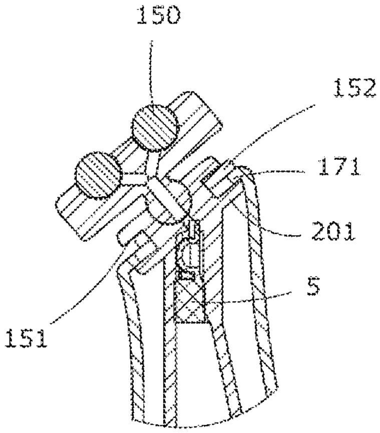

[Fig. 53]
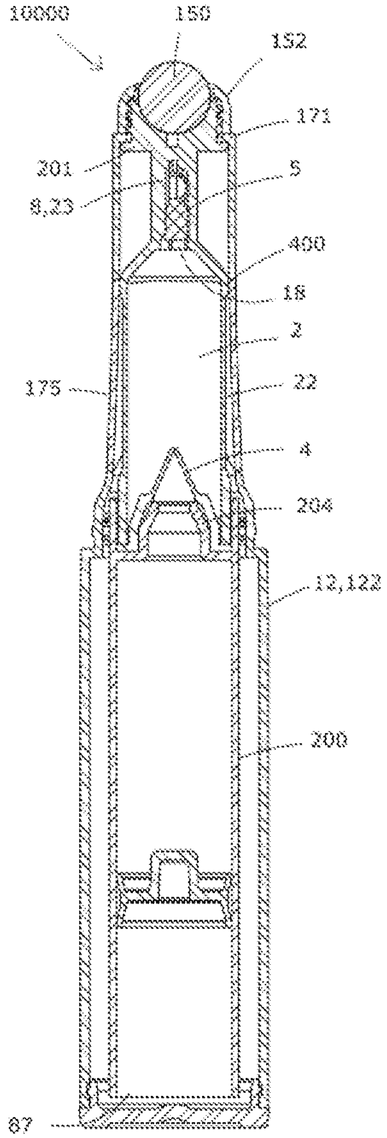

[Fig. 54]
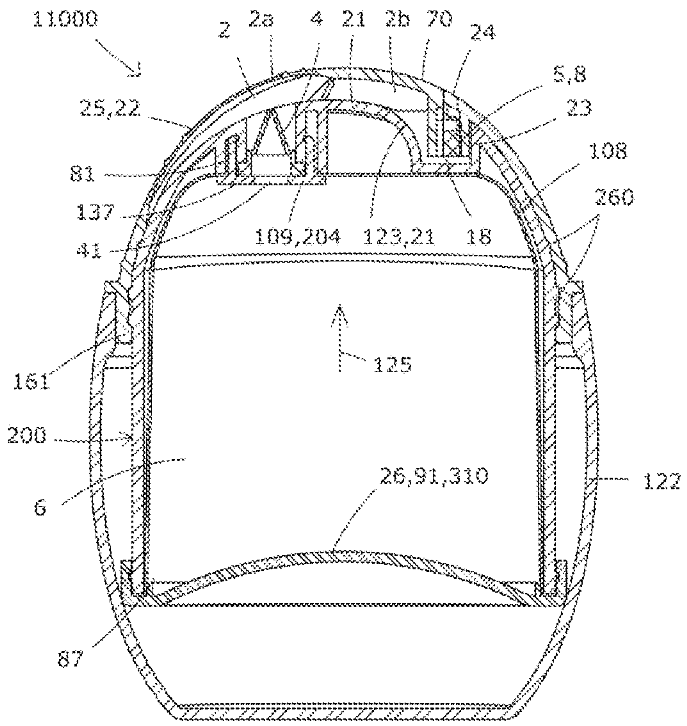

[Fig. 55]
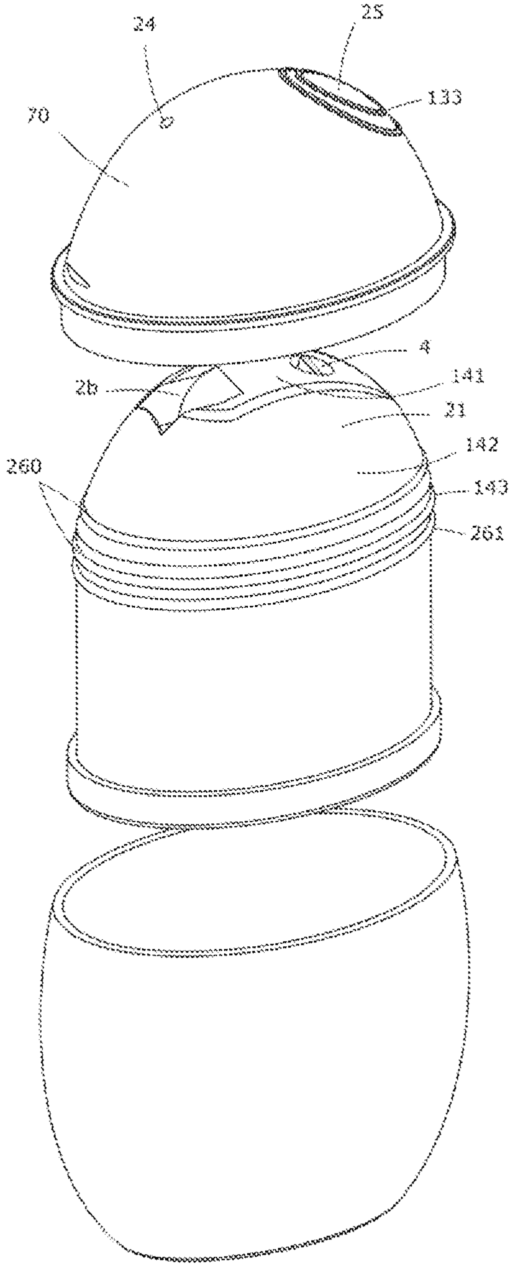

[Fig. 56]
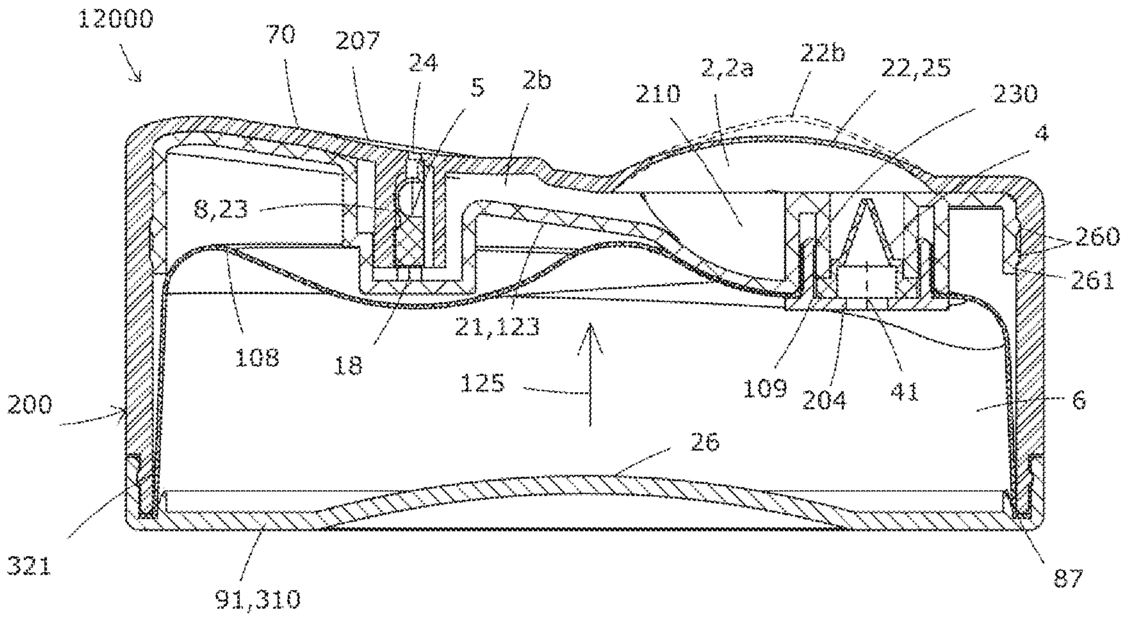
[Fig. 57]
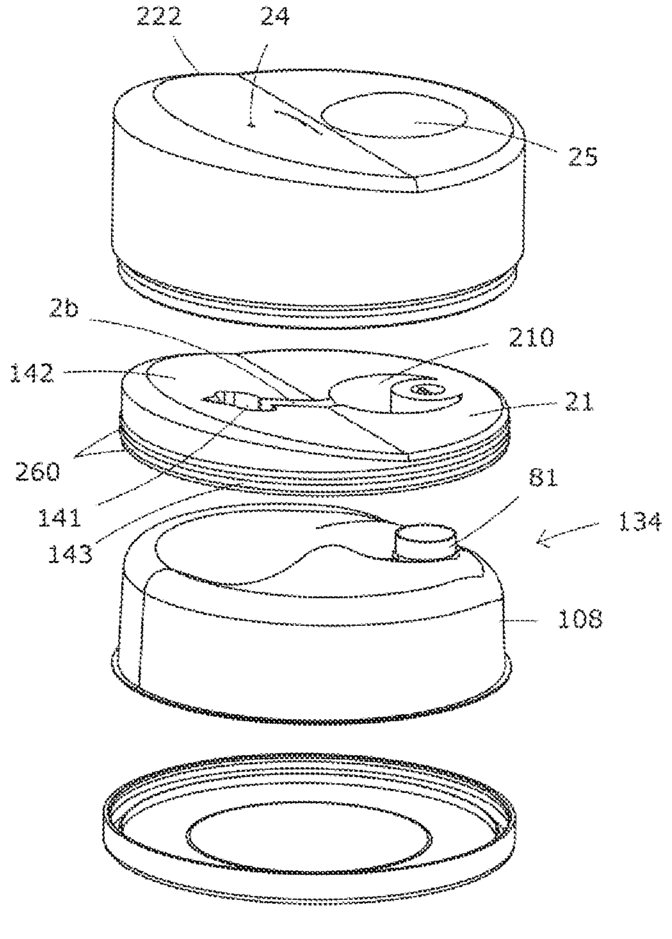

[Fig. 58]
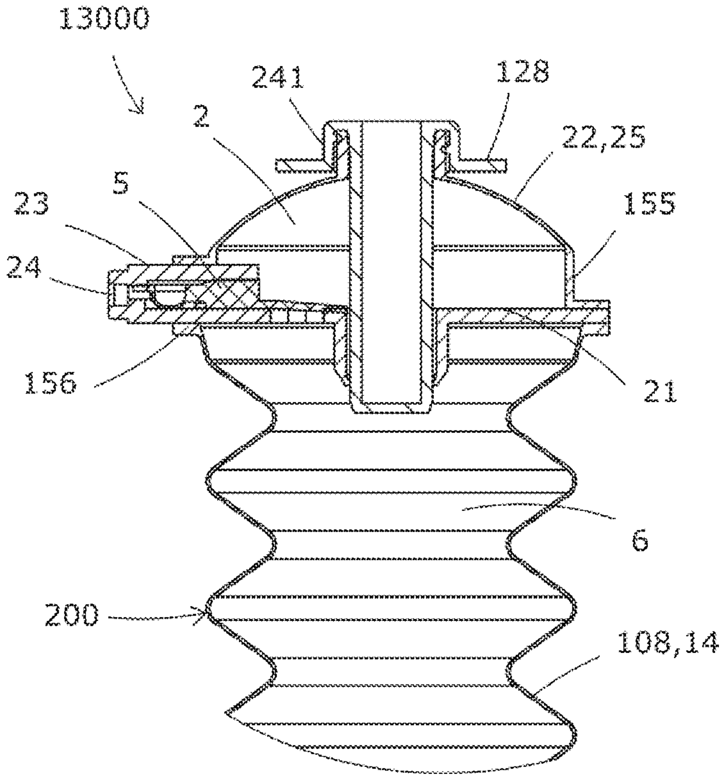
[Fig. 59]
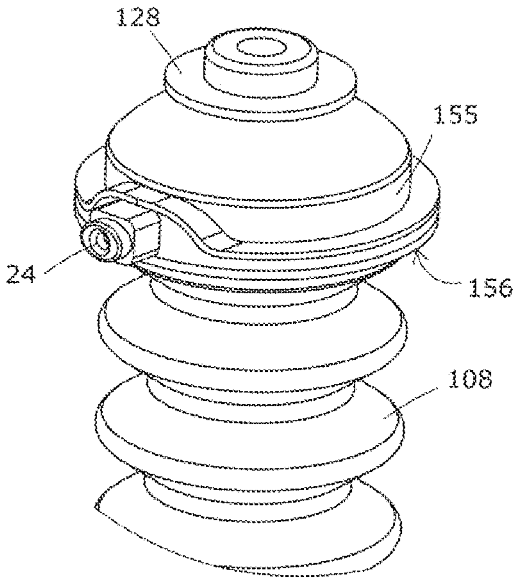

[Fig. 60]
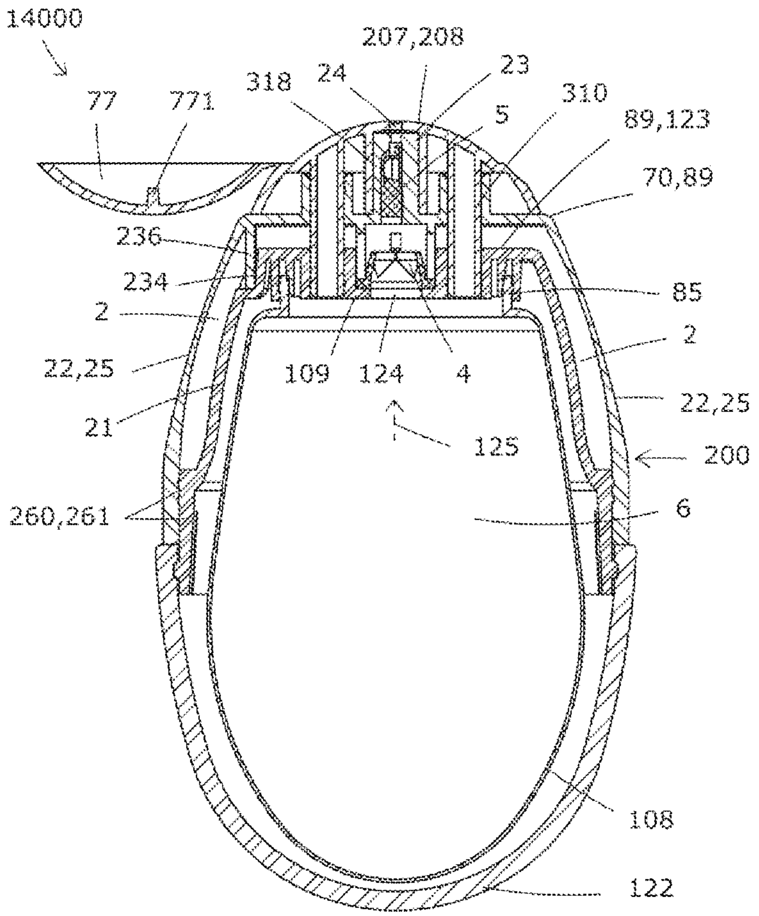
[Fig. 61]
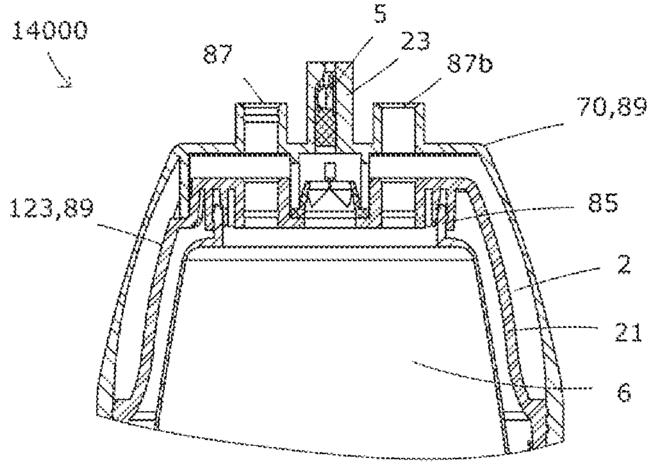

[Fig. 62]
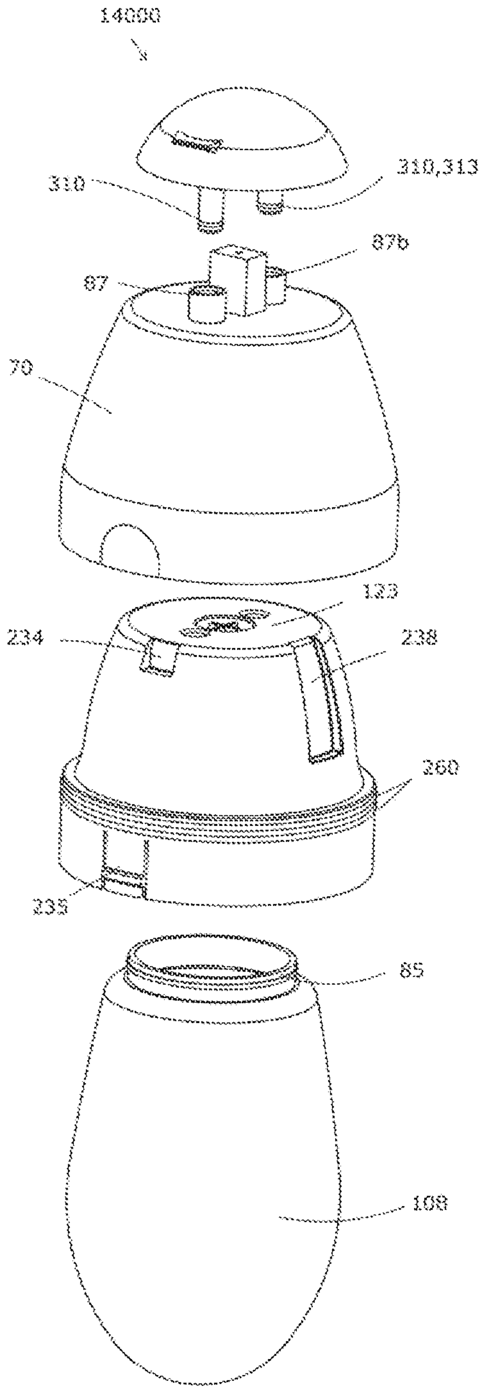

[Fig. 63]
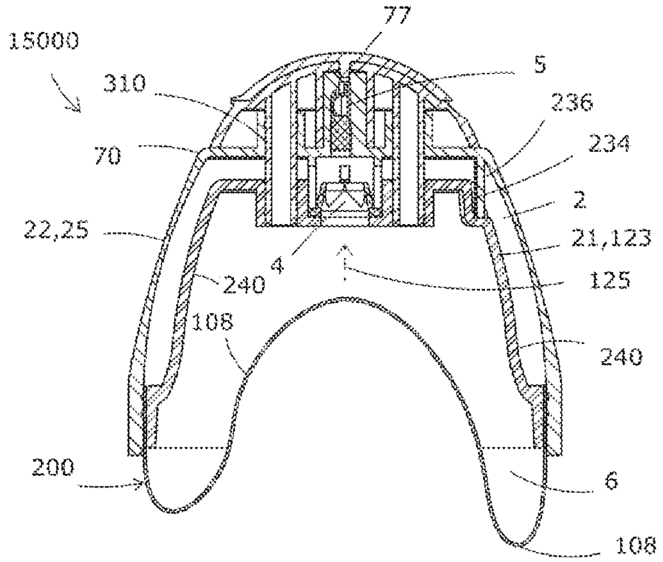
[Fig. 64]
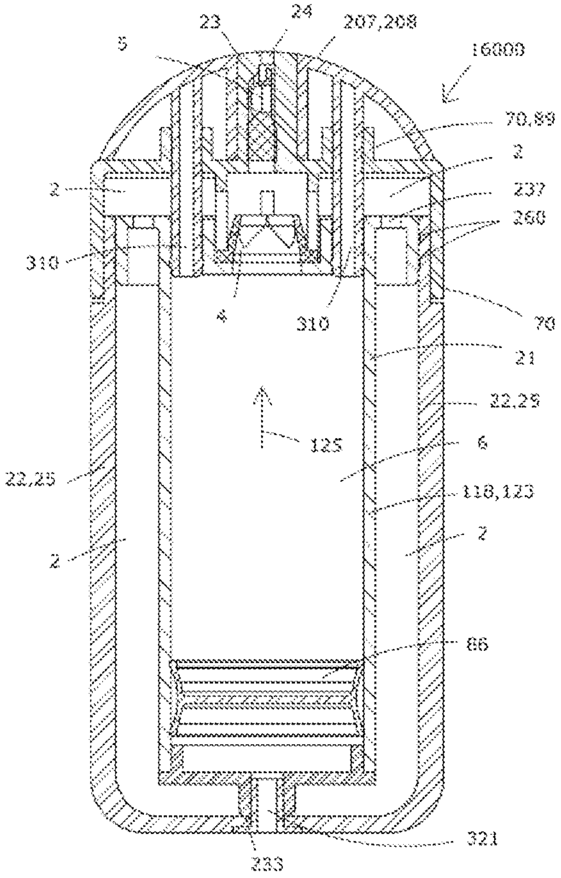

[Fig. 65]
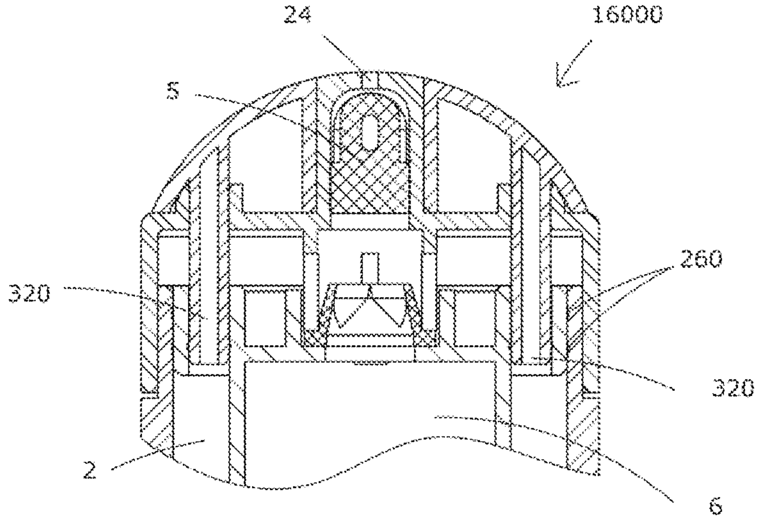
[Fig. 66]
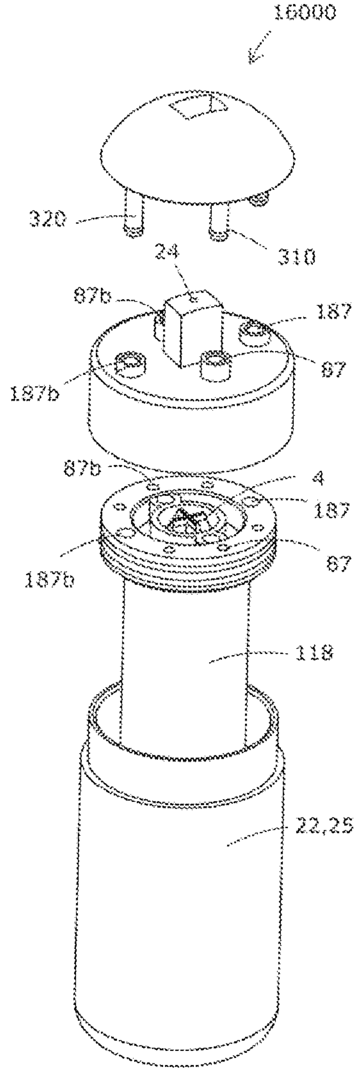

[Fig. 67a]
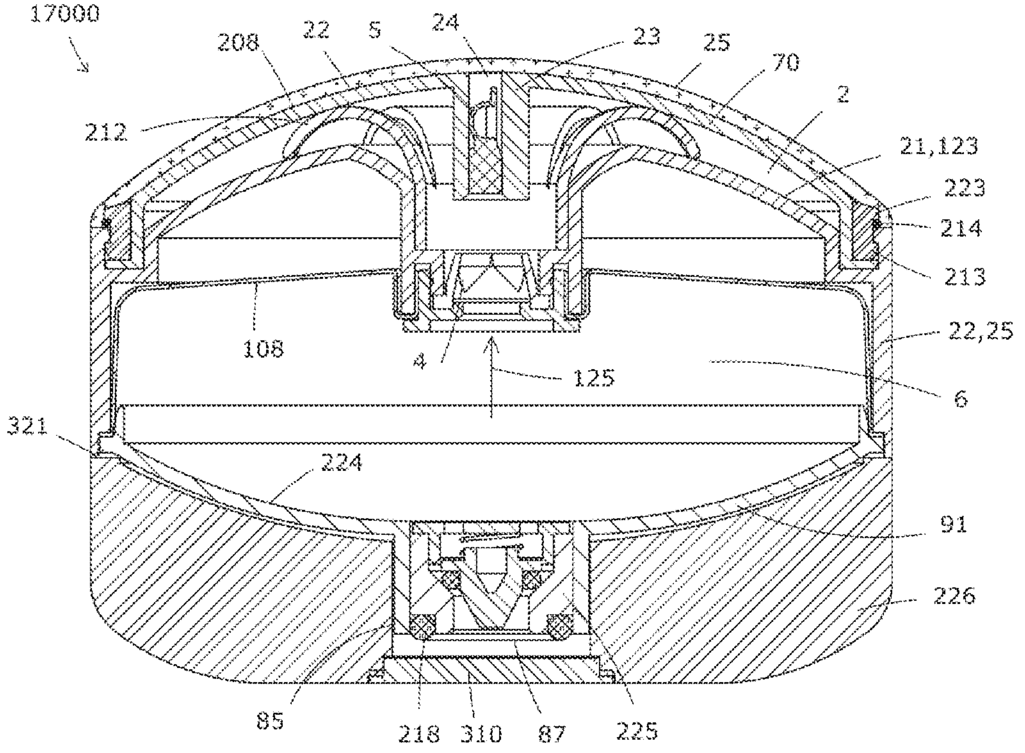
[Fig. 67b]
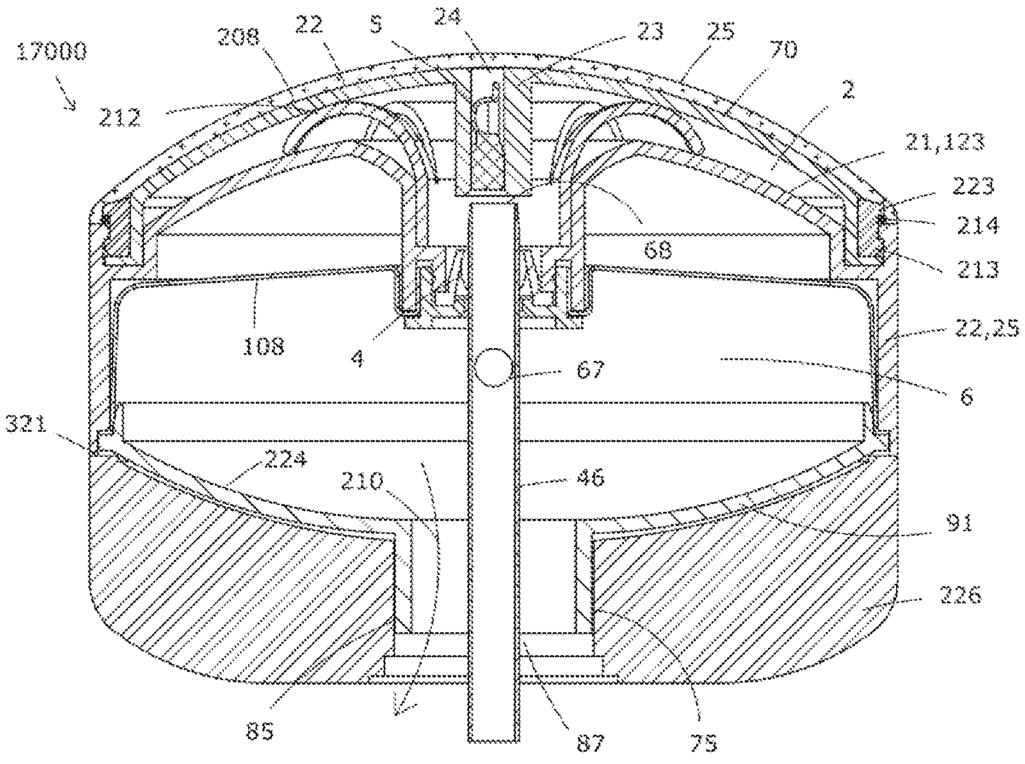

[Fig. 67c]
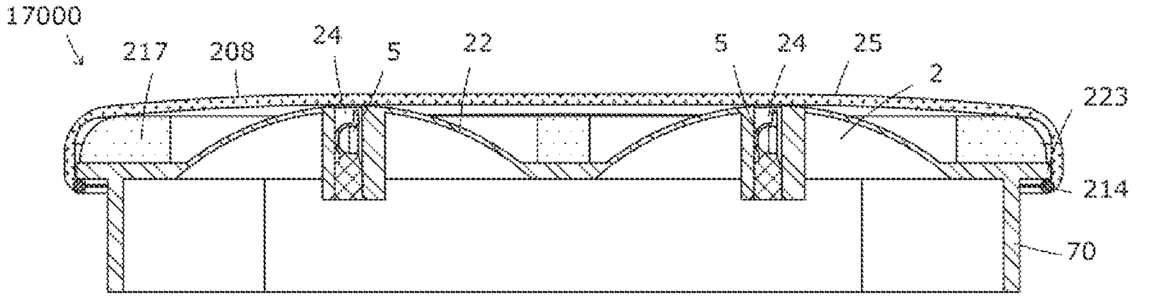
[Fig. 67d]
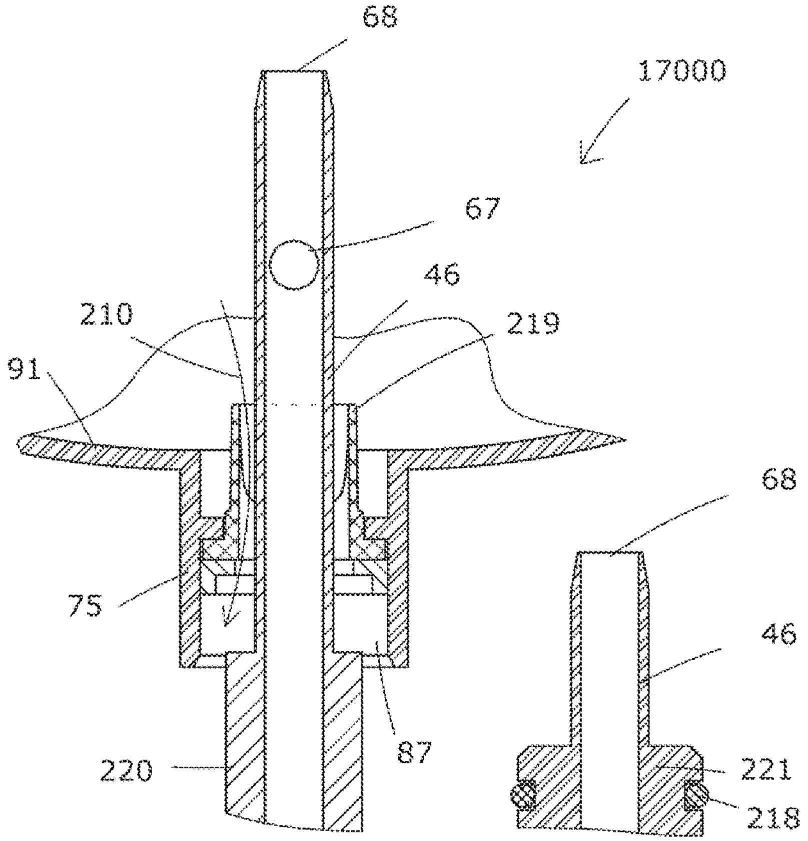

[Fig. 68a]
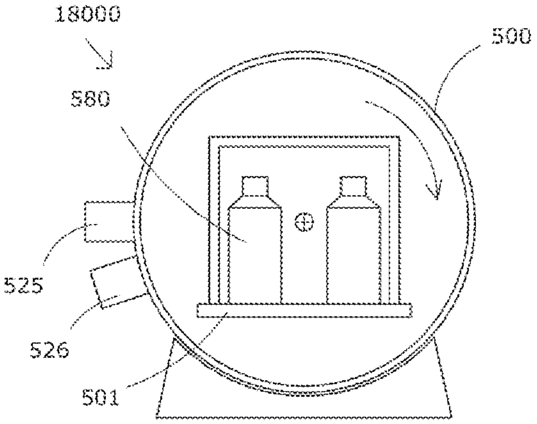
[Fig. 68b]
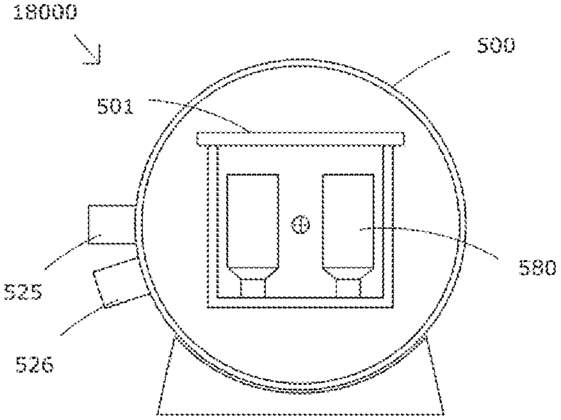

[Fig. 69a]
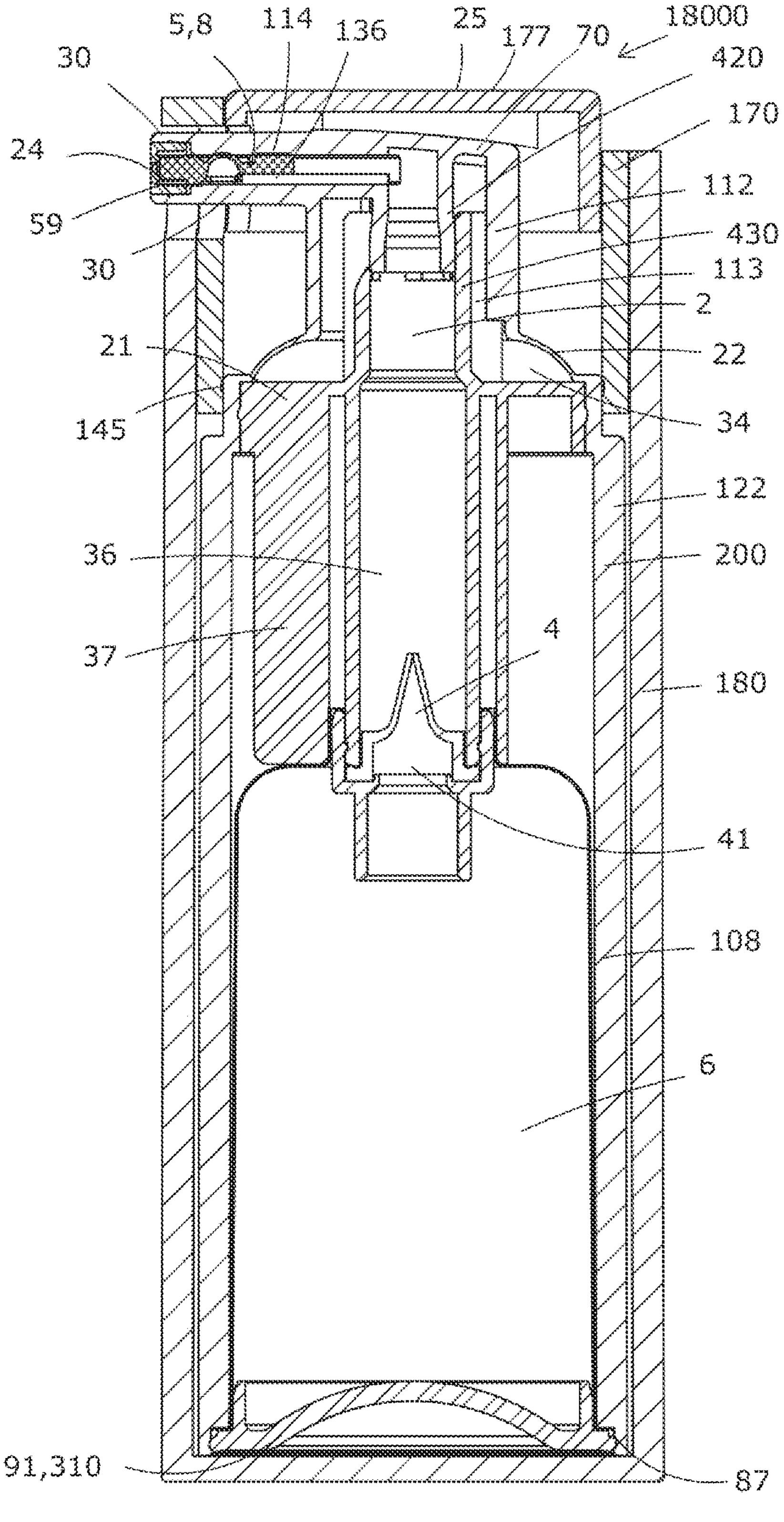

[Fig. 69b]
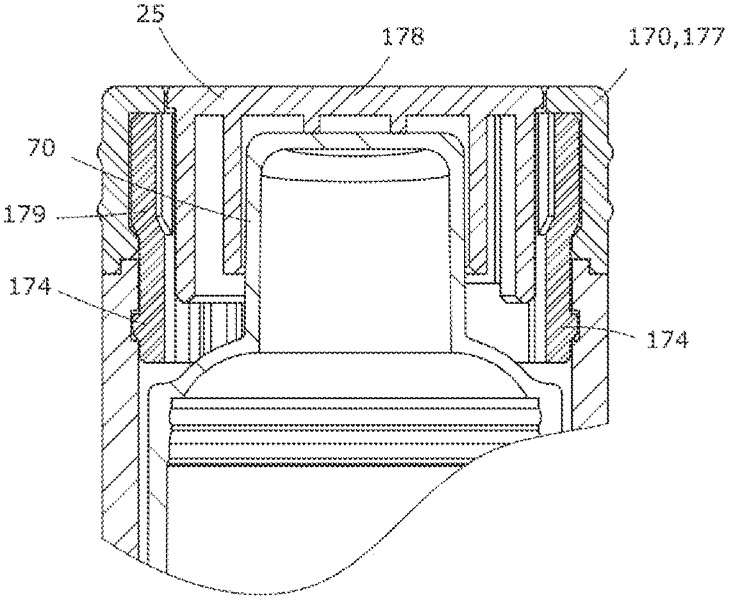
[Fig. 69c]
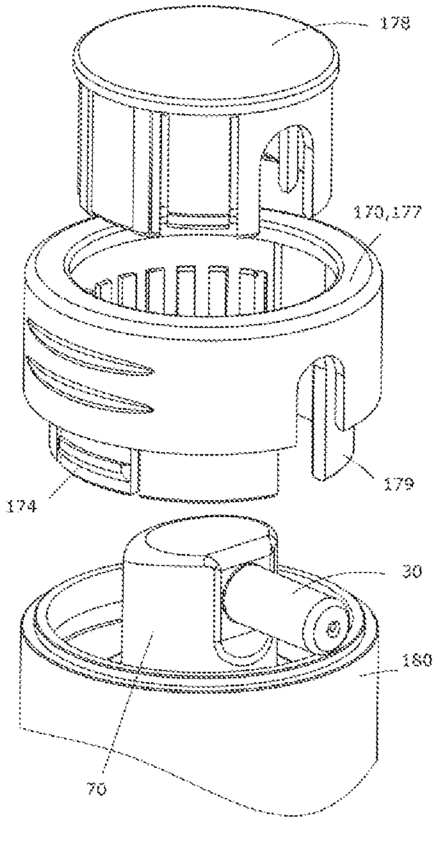

[Fig. 70a]
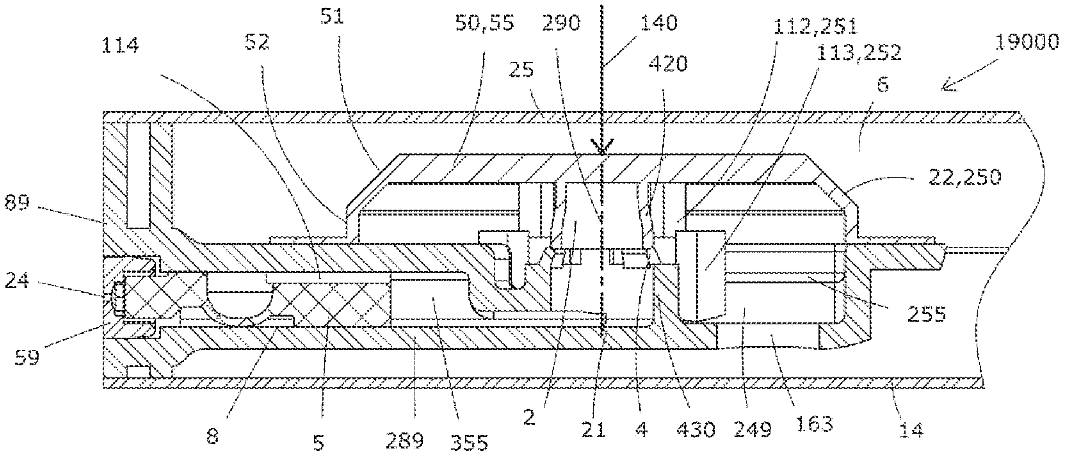
[Fig. 70b]
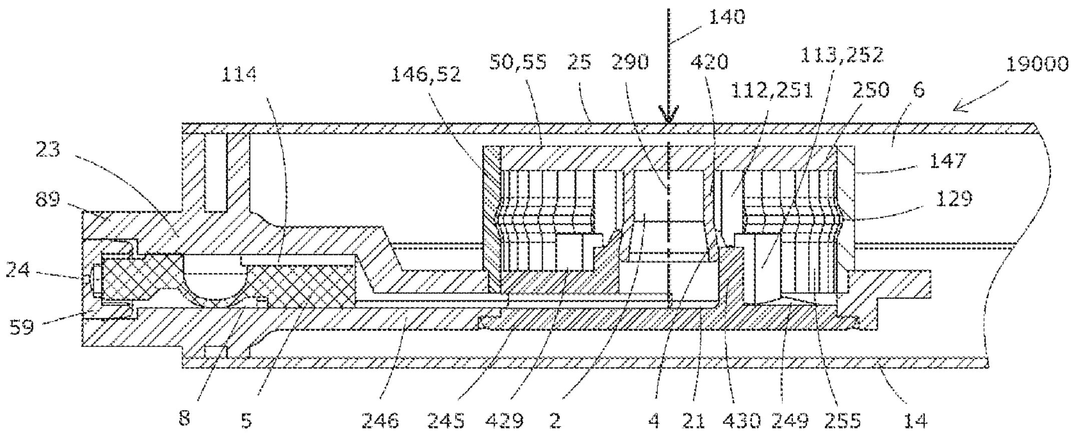
[Fig. 70c]
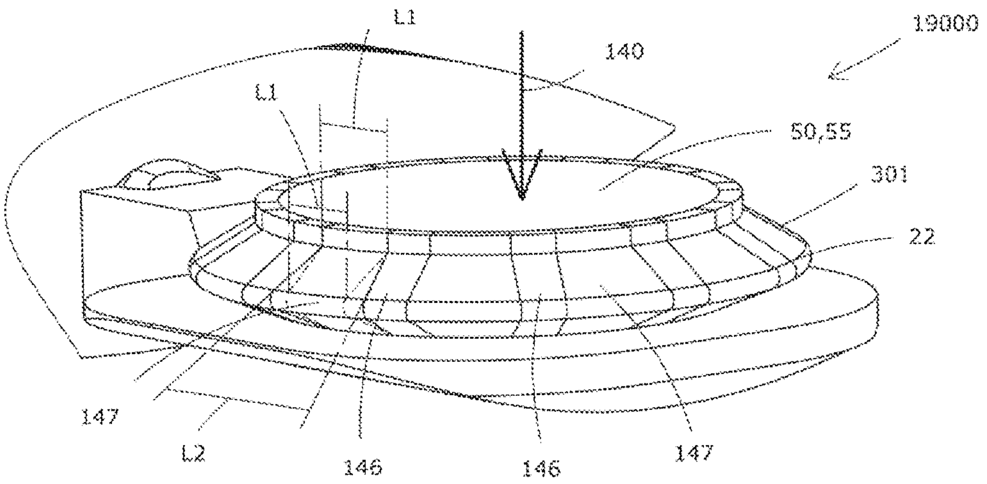

[Fig. 70d]
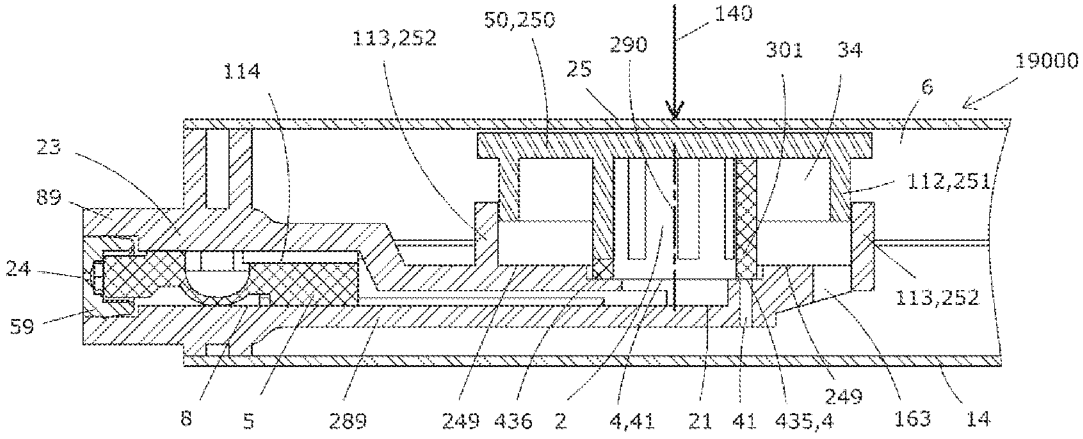
[Fig. 70e]
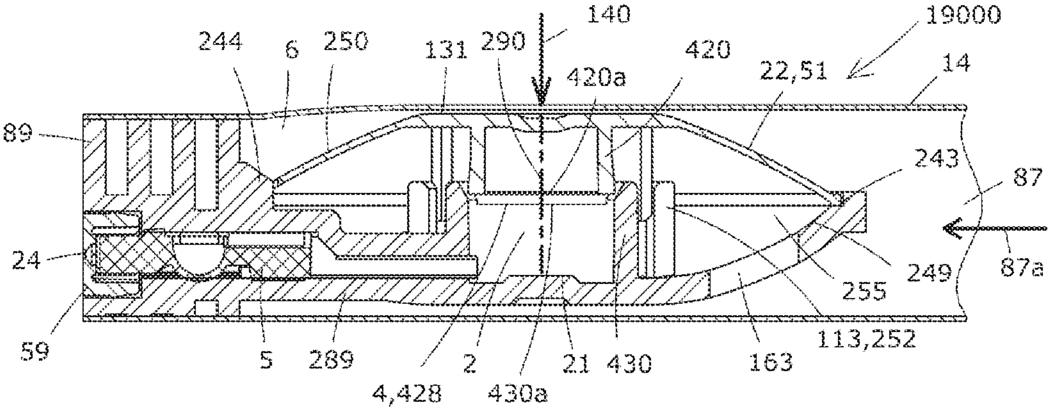
[Fig. 70f]
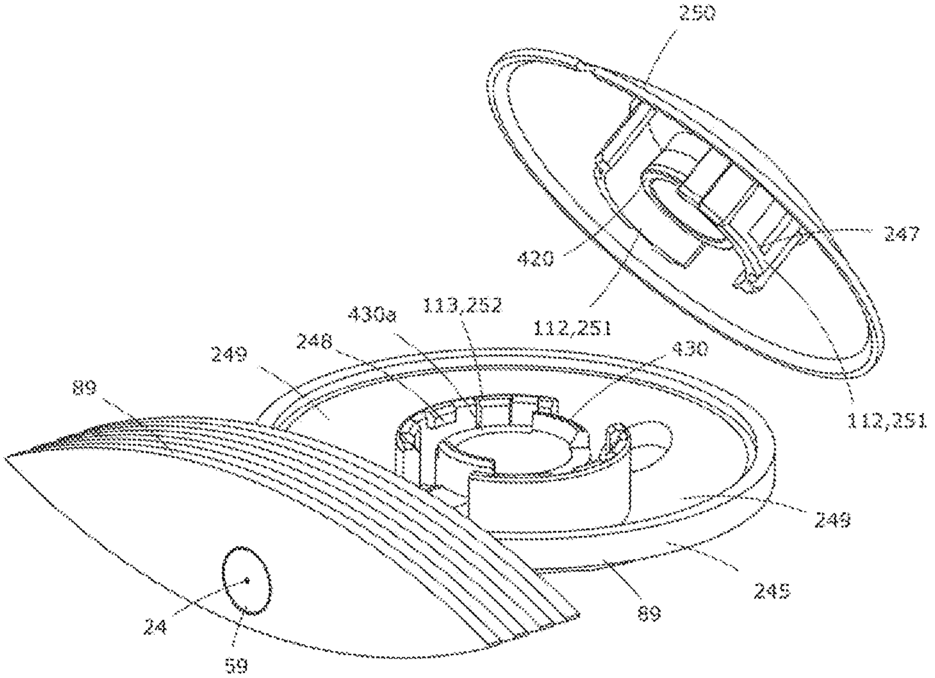

[Fig. 70g]
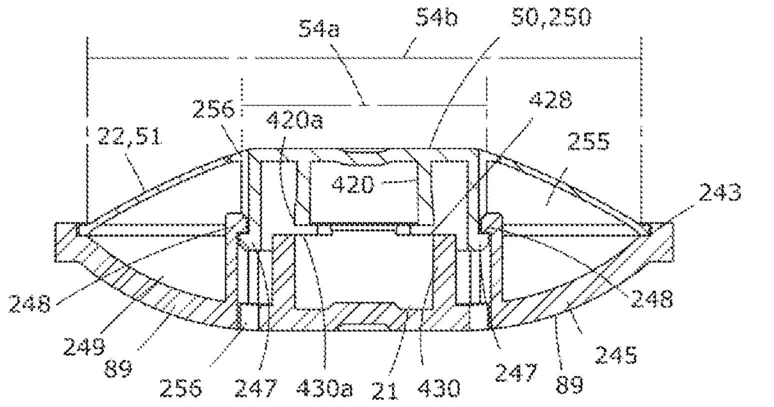
[Fig. 70h]
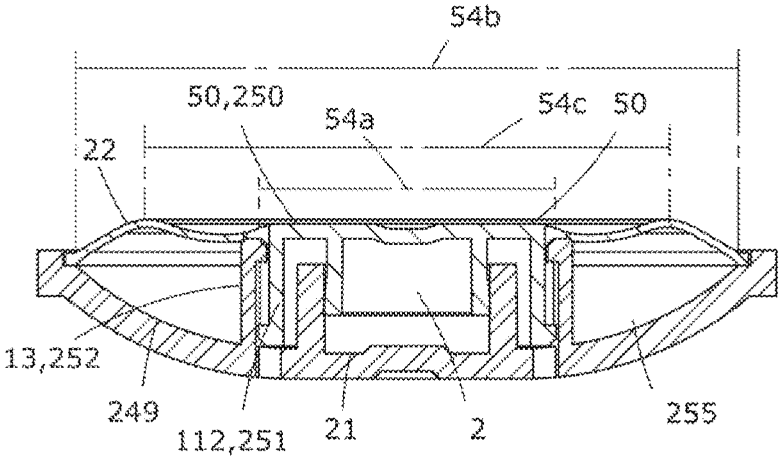
[Fig. 70i]
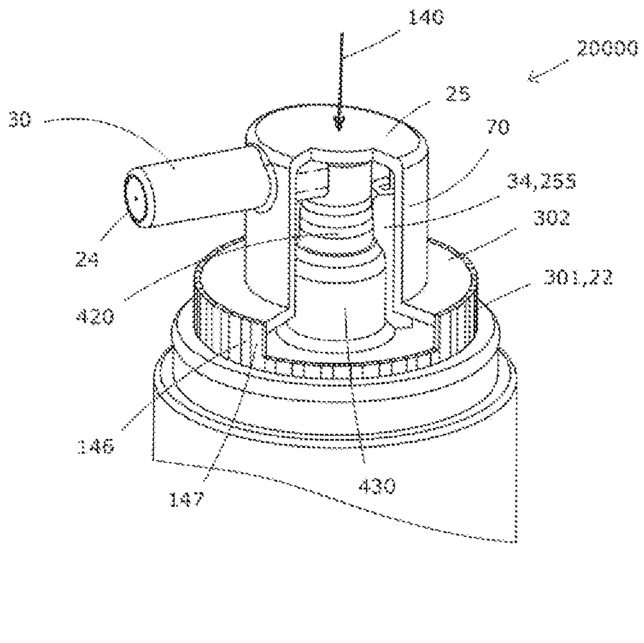

[Fig. 71]
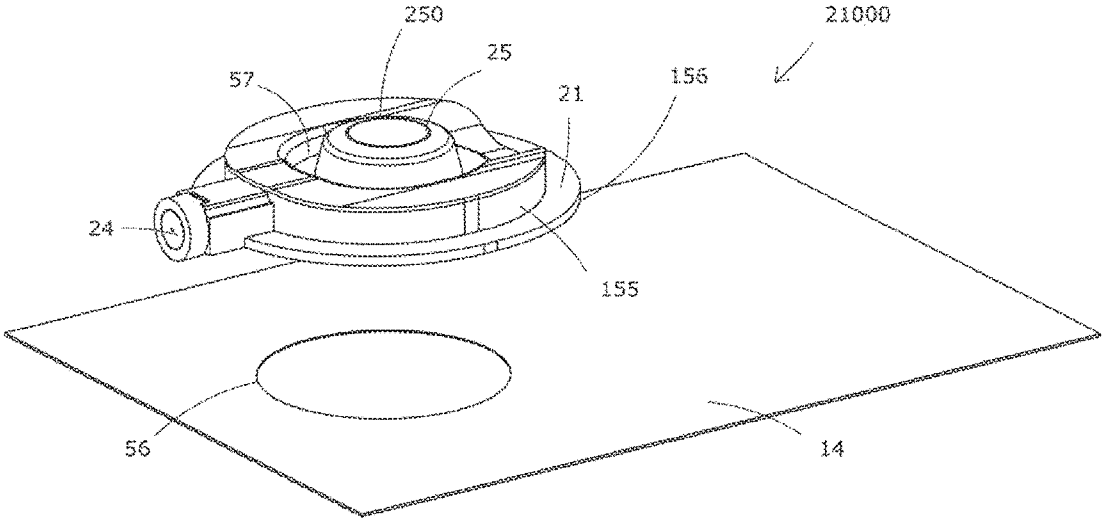
[Fig. 72]
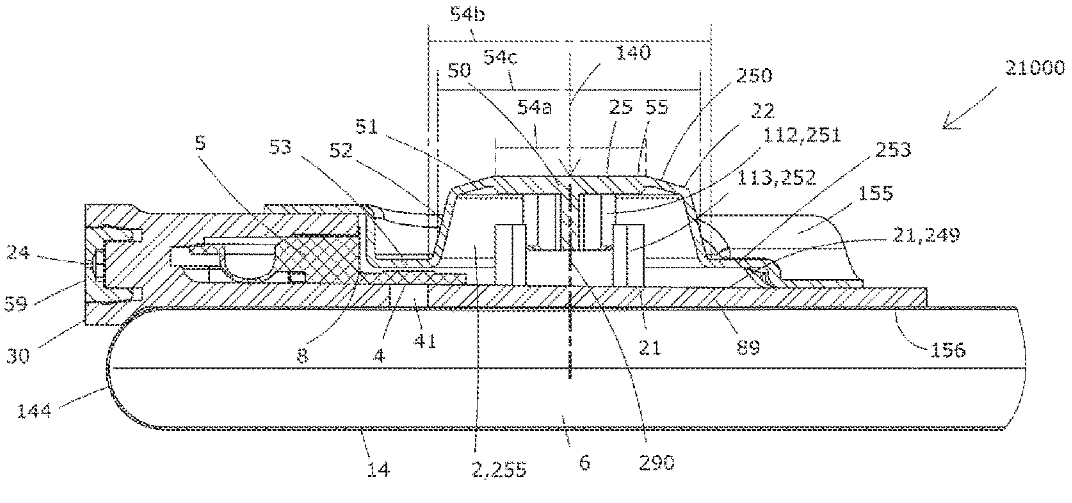

[Fig. 73]
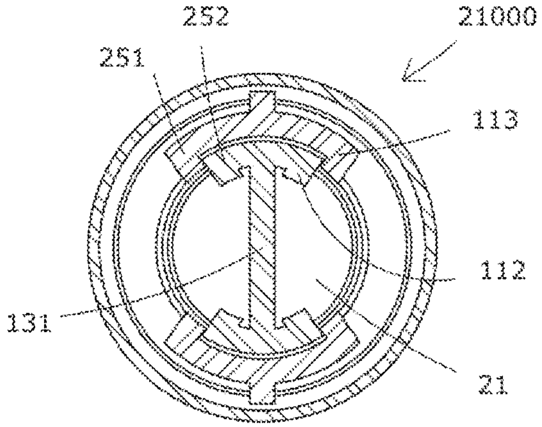
[Fig. 73a]
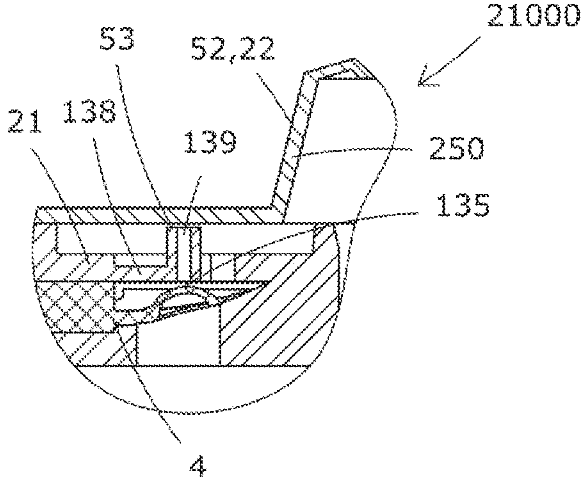

[Fig. 74]
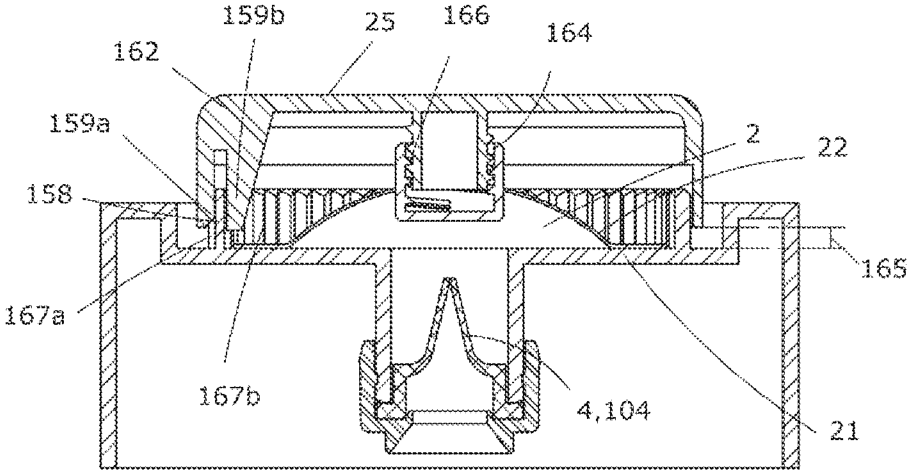
[Fig. 75]
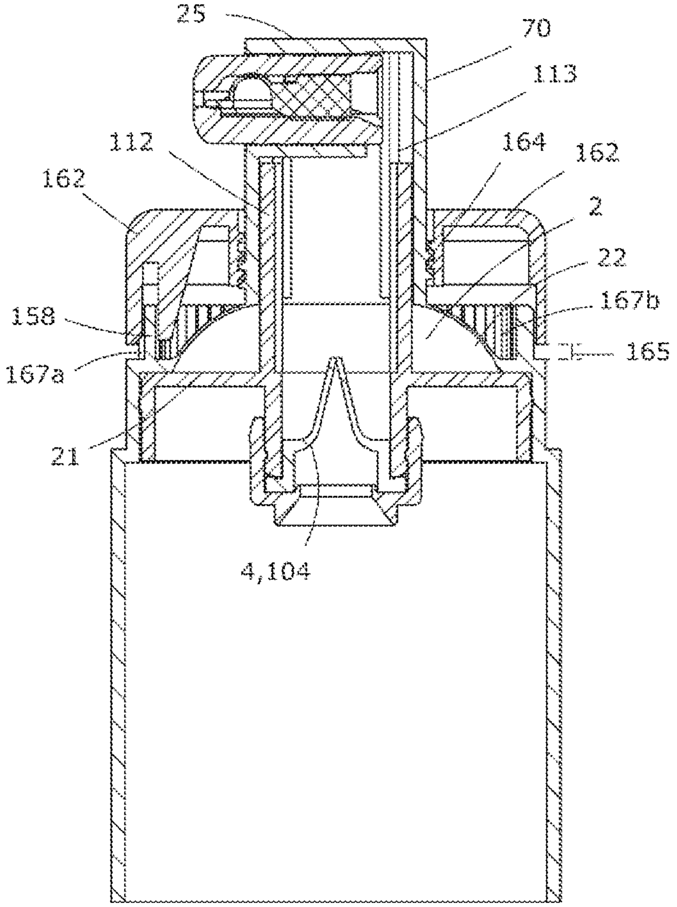

[Fig. 76]
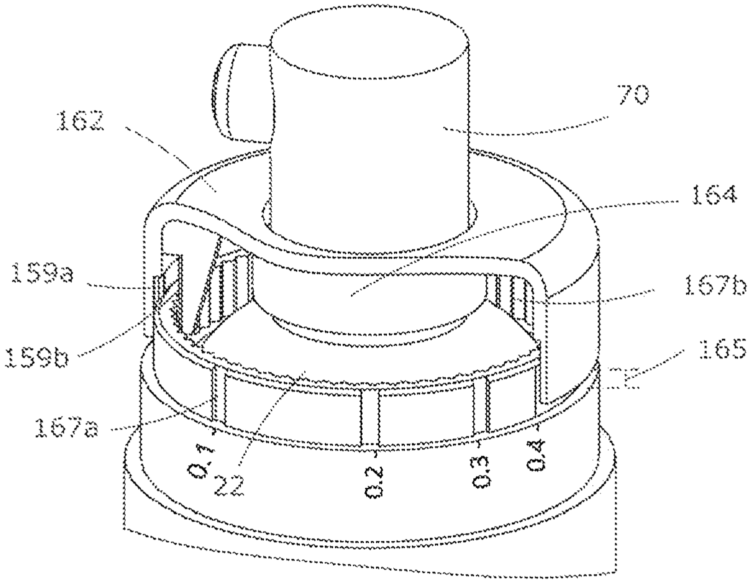
[Fig. 77]
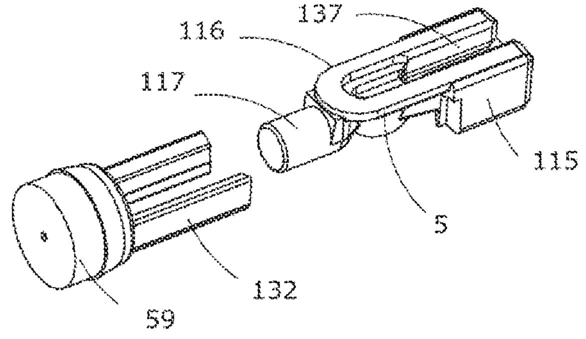
[Fig. 78]
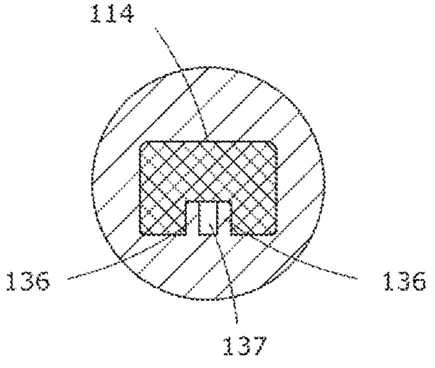

[Fig. 79]
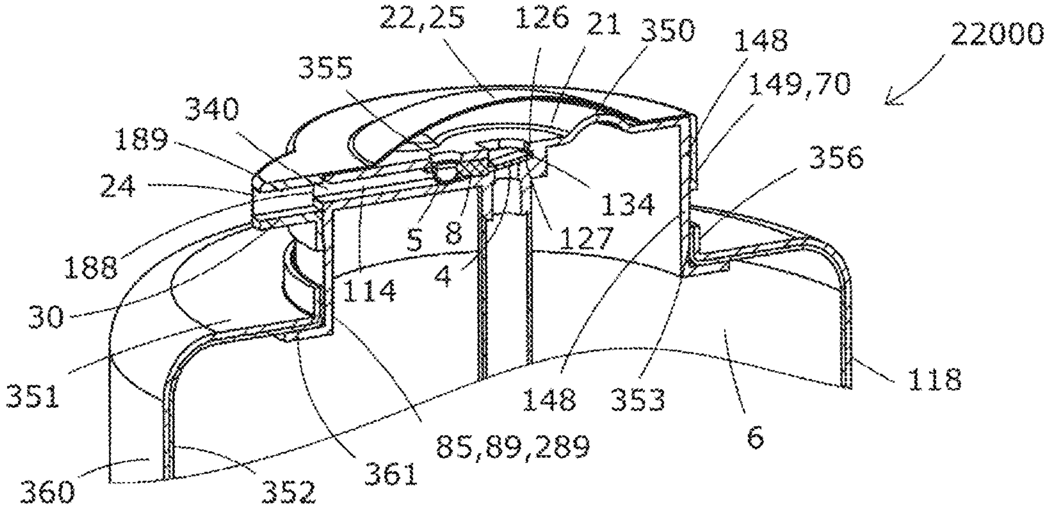
[Fig. 80]
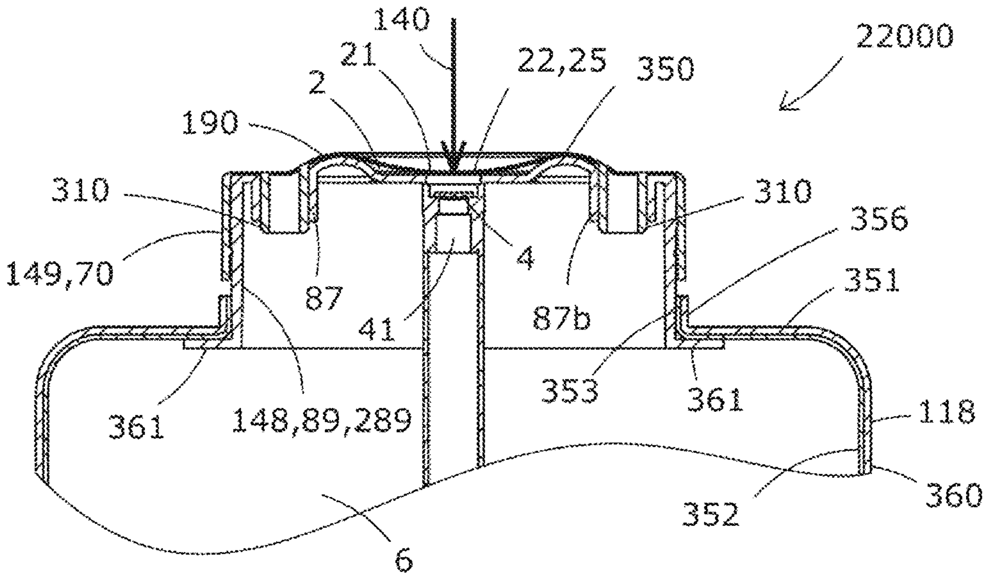

[Fig. 81]
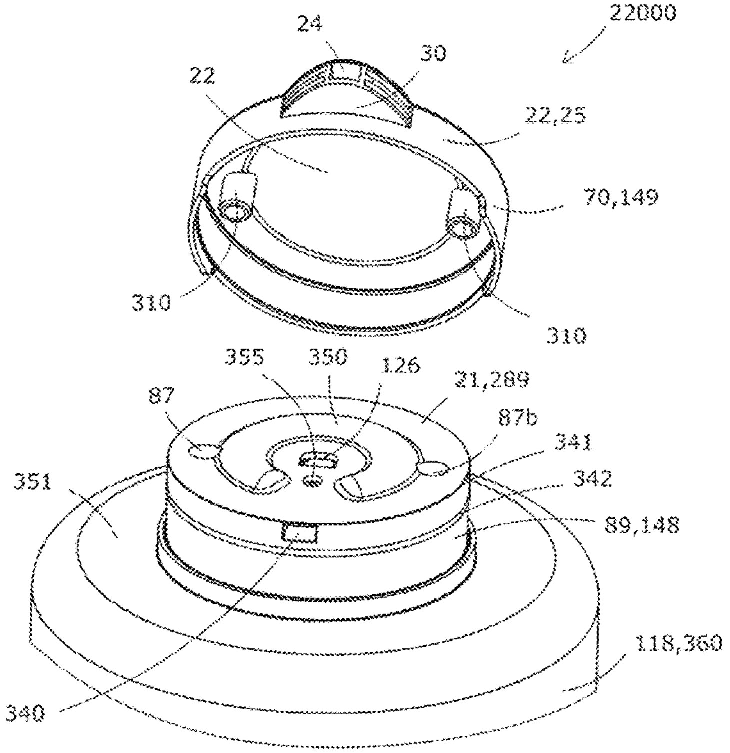
[Fig. 82]
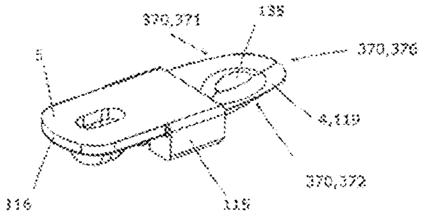
[Fig. 83]
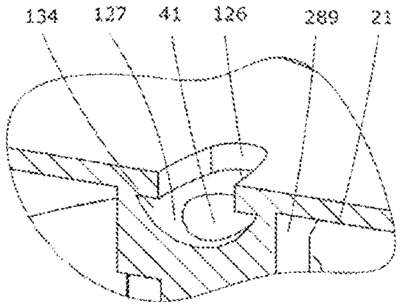

[Fig. 84]
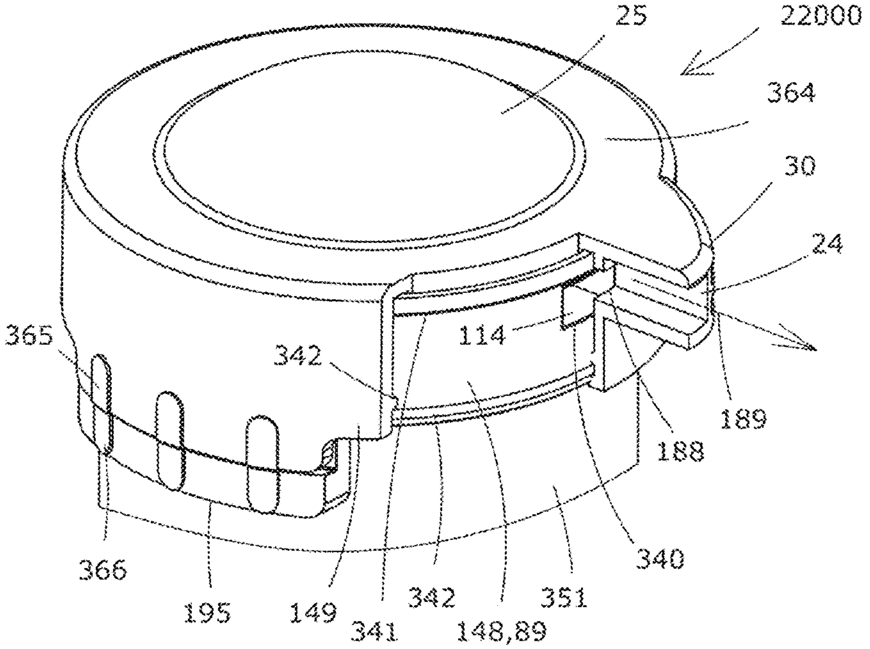
[Fig. 85]
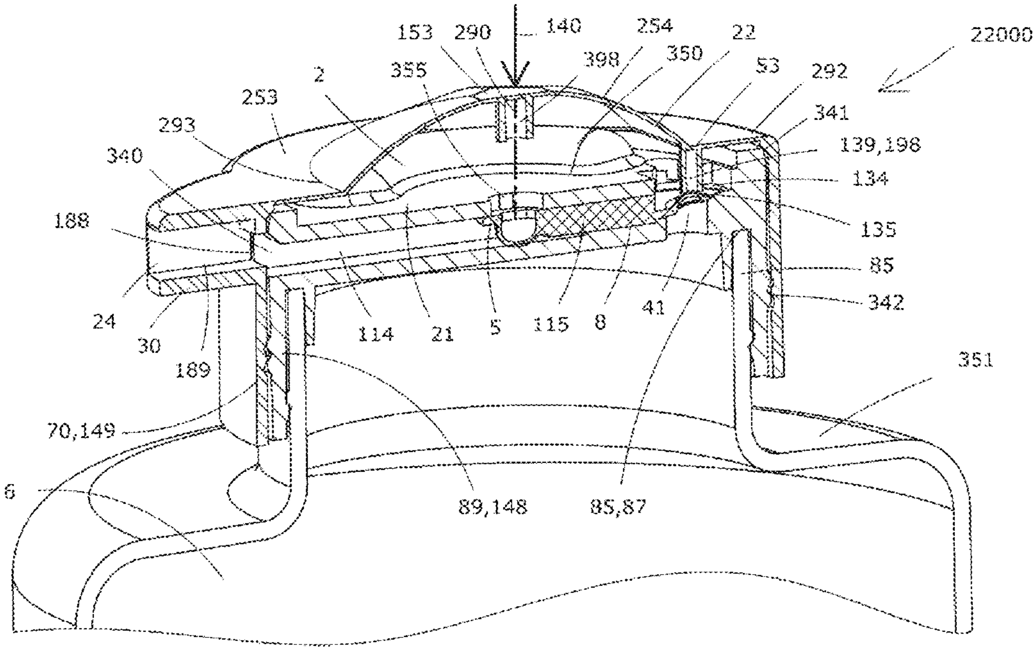

[Fig. 85a]
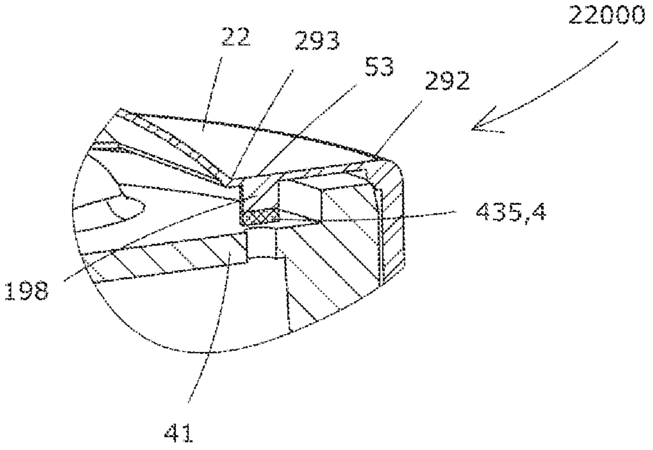
[Fig. 86]
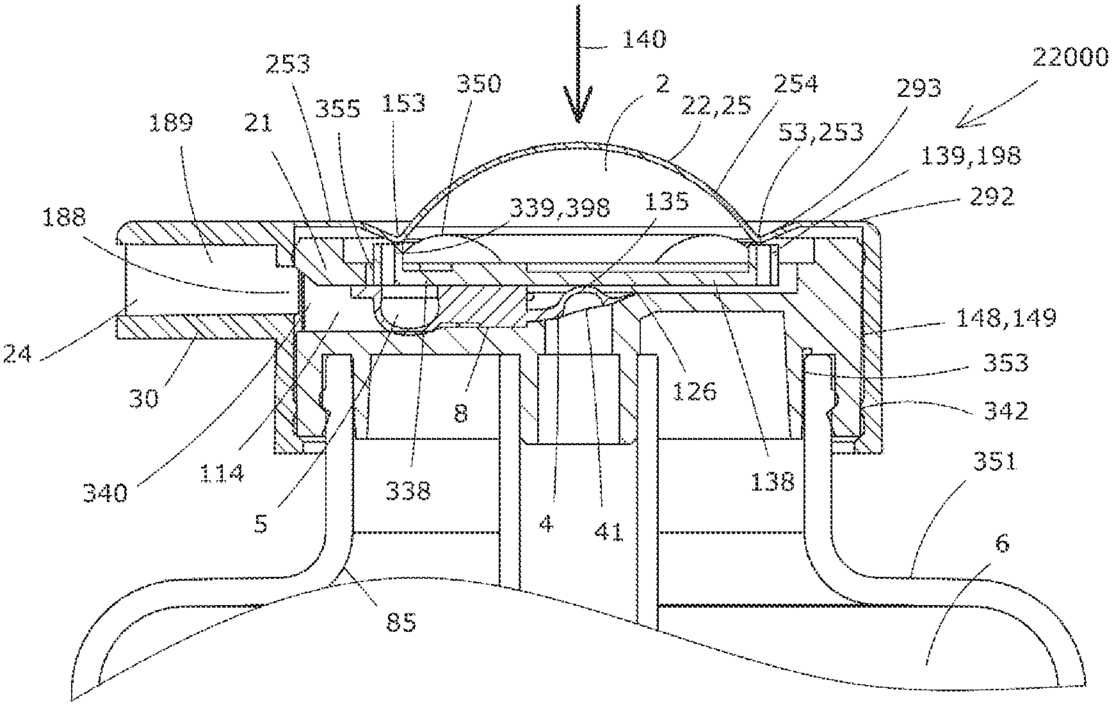

FLUID DISPENSER WITH PRIMING MEANS

TECHNICAL FIELD

The present invention relates to a device for dispensing a fluid.

Such a device allows a user to dispense a fluid or product. The field of the invention is more particularly that of the dispensing of products such as liquids, gels or creams, for example for the pharmaceutical or cosmetic or agro-food industry.

STATE OF THE ART

Fluid dispensers are known, as disclosed for example by the document WO2015155318.

In this area, manufacturers are making constant efforts to try to improve and/or simplify the compactness, use, ergonomics, manufacture and refilling of such fluid dispenser devices, to improve hygiene, recycling.

The object of the present invention is to solve at least one of these problems.

Disclosure of Invention

According to a first aspect of the invention, there is proposed a device for dispensing a fluid, comprising:

- a pocket having an interior volume arranged to contain the fluid, the interior volume being delimited at least partly by a deformable or movable wall,
- a pressing surface arranged to, under the exertion of pressure, reduce the interior volume of the pocket by deforming the deformable wall or by moving the movable wall,
- an outlet,
- a dispensing valve, and which in an open state, allows a passage of fluid from the interior of the pocket towards the outlet, and, in a closed state, does not allow a passage of fluid from the interior of the pocket towards the outlet,
- a reservoir,
- a feed orifice connecting the reservoir to the interior volume of the pocket,
- at least one orifice or filling hole each opening onto the inside of the reservoir, and at least one plug blocking this at least one orifice.

The filling holes may be two in number and are located on either side of the outlet.

Each filling hole may pass through an end piece.

The end piece may be inserted into a wall of the reservoir so that the pocket is inserted into the reservoir.

A single plug may be arranged to simultaneously:

- plug the filling hole(s), and
- plug and/or protect the outlet.

The cap may be removable by means of a hinge.

The filling holes may be two in number and be formed in an end piece and be located on either side of the outlet.

Each filling hole may pass through the end piece.

The end piece may be inserted into a wall of the reservoir so that the pocket is inserted into the reservoir.

The end piece may sink into the plug, a fluid dispensing surface being able to be formed by the plug and the end piece.

The end piece may comprise two notches arranged to hold the device during filling and/or closing.

The cap may comprise two pins arranged to be positioned with the end piece during assembly.

The device according to the invention may further comprise:

- a dispensing part comprising a dispensing cavity
- a dispensing orifice connecting the pocket to the dispensing cavity
- the cap may include a cavity arranged to receive or fit with the dispensing part.

The cavity may include the plug between the pins.

A single plug may be arranged for simultaneously:

- plug the filling hole(s),
- and/or plug and/or protect the outlet,
- and/or form an applicator.

The cap may be removable by means of a hinge or a flexible link.

The outlet may include small shapes (typically grooves, bumps and/or depressions) in its inner perimeter so that when a plug is inserted into the outlet, the space of the small shapes (typically grooves, bumps and/or hollow) between the inner perimeter of the outlet and the cap prevents the passage of the fluid to be dispensed but allows an air passage through the outlet.

The plug may comprise a deformable wall delimiting at least partly the interior volume of the pocket.

The invention also relates to a method implemented in a device according to the invention, characterized in that:

- the reservoir is filled with product to be dispensed, then once the reservoir is filled with product, the at least one opening is closed, then
- the device is placed with the head upwards in a vacuum chamber with a depression, preferably of at least 0.3 bar or at least 0.5 bar relative to a pressure of one atmosphere, so that the air leaves the device, then
- still in the enclosure still under vacuum, the device is tilted in a new position by tilting it by at least 30 degrees or at least 90 degrees with respect to the vertical, and
- while the device according to the invention is in this new position and/or while the device according to the invention is being used in this new position, the pressure is increased in the enclosure, preferably up to one atmosphere.

According to another aspect of the invention, a system is proposed for implementing this method of priming a device according to the invention, this system comprising:

- an enclosure arranged to accommodate a device according to the invention in an initial position with the head upwards (i.e. preferably the outlet located above (relative to the earth's attraction) at least part of the reservoir)
- a means for placing the enclosure under vacuum (preferably with a depression of at least 0.3 bar or even 0.5 bar relative to a pressure of one atmosphere) so that the air leaves the device according to the invention (for example by its dispensing valve); such a vacuum means preferably comprise a suction means, then
- a means for tilting a device according to the invention located in the enclosure into a new position by tilting it by at least 30 degrees and even preferably by at least 90 degrees (preferably by 180 degrees) with respect to the vertical (in relation to its initial position); these tilting means typically comprise means for tilting the enclosure or a support located in the enclosure; and
- a means for increasing the pressure in the enclosure (typically comprising a means for bringing air into the enclosure via an air inlet).

According to a second aspect of the invention, there is proposed a device for dispensing a fluid comprising:

an outlet, a pocket having an interior volume to contain a fluid, the interior volume of the pocket being delimited at least partly by a movable wall, a reservoir arranged to contain the fluid and comprising two openings including an upper opening oriented towards the pocket and a lower opening, a dispensing valve which, in an open state, allows a passage of the fluid to pass from the pocket to the outlet, and, in a closed state, does not allow it, a feed valve which, in an open state, allows the passage of the fluid contained in the reservoir towards the pocket, and which, in a closed state, does not allow it, said lower opening being arranged to allow a passage of the fluid, so as to fill the reservoir at least partially with fluid.

The reservoir may be delimited by:

a flexible wall comprising two openings, the upper opening facing the pocket and the lower opening, and, a bottom wall, arranged to block the lower opening.

The reservoir may be provided with a neck for filling the reservoir.

The reservoir may be placed in a container, the wall may include:

a plug arranged to block the lower opening a means for fixing the container.

The plug, the bottom wall and its fixing means may be made in one part.

The plug may slide with the bottom wall during the screwing of the plug on the neck. The device may comprise a bottom wall connected to side walls, preferably fitted together with the bottom wall and arranged to:

hide or hide the reservoir, and maintain the reservoir before pumping operations when the lower opening is screwed to the rigid wall.

The flexible wall can be attached to the pocket:

by welding, and/or by clipping, and/or by interlocking, and/or by compression of the flexible wall around its upper opening between, on the one hand a part forming or integral with the pocket and located outside the reservoir and, on the other hand a ring inserted inside the reservoir by compression of the flexible wall around its opening towards the bottom wall by the deformation of a ring of material of the bottom wall.

The area of a section of the upper opening can be at least eight times smaller than the area of a section of the lower opening.

The flexible wall can be arranged to deform so as to reduce the internal volume of the reservoir when the fluid exits from the reservoir.

The device can be arranged to immobilize the reservoir in rotation and/or in translation relative to the container when the neck is closed after filling the reservoir and while the reservoir is located inside the container.

The flexible wall may be made by blowing the anti-rotation means which are at least one relief such as a bump of the flexible wall.

The device may comprise a rigid wall inside which a piston slides and at least one hole made in the piston or between the piston and the side wall, said hole is arranged to bring the air out of the reservoir 6 when inserting a part of the piston 86 into the reservoir.

The device may comprise a piston with two lips, a first upper lip of which is arranged to enter the reservoir in a non-sealed manner and a second lower lip arranged to enter the reservoir in a sealed manner.

The device may comprise a piston, a lower lip of which is attached to the bottom wall by elastic means arranged to disengage during introduction into the lower opening.

The device may comprise a deformable wall and a container arranged to contain the piston or the flexible walls, the deformable wall and the container being grouped together in a single part of the same material without material discontinuity, or, manufactured in the same part by overmolding or bi-injection.

According to a third aspect of the invention, there is proposed a device for dispensing a fluid comprising:

an outlet, a pocket having an interior volume to contain a fluid, the interior volume of the pocket being delimited at least partly by a movable wall, a reservoir arranged to contain the fluid, the reservoir being provided with a neck for filling the reservoir a dispensing valve which, in an open state, allows a passage of the fluid from the pocket to the outlet, and, in a closed state, does not allow it, a feed valve which, in an open state, allows the passage of the fluid contained in the reservoir towards the pocket, and which, in a closed state, does not allow it, a container integral with the pocket and inside which the reservoir is located.

The device may comprise means for immobilizing the reservoir in rotation and/or in translation relative to the container when the neck is closed after filling the reservoir and while the reservoir is located inside the container.

The device may comprise at least one intermediate part connecting the container to the walls of the reservoir, this intermediate part being connected to the container and to the walls of the reservoir in a removable manner, preferably by screwing.

The device may not include any other intermediate part connecting the container to the walls of the reservoir over at least half, or even preferably at least two thirds, of the elongation of the container and/or the walls of the reservoir from the neck but outside the neck.

According to another aspect of the invention, there is proposed a device for dispensing a fluid comprising:

an outlet, a pocket having an interior volume to contain a fluid, the interior volume of the pocket being delimited at least partly by a movable wall arranged to tilt and/or translate by deformation, a dispensing valve which, in an open state, allows a passage of the fluid from the pocket to the outlet, and, in a closed state, does not allow it, a feed valve which, in an open state, allows the passage of the fluid contained in the reservoir towards the pocket, and which, in a closed state, does not allow it, a reservoir provided with a wall arranged to contain the fluid, characterized in that the movable wall is in continuity of material or overmolding or bi-injection with the wall of the reservoir and/or with a wall surrounding a wall delimiting an internal volume of the reservoir.

The dispensing valve may be located inside a part carried by the movable wall.

The movable wall can be in continuity of material or overmolded or bi-injection with the part in which the dispensing valve is located.

According to another aspect of the invention, there is proposed a device for dispensing a fluid comprising:

an outlet, a pocket having an interior volume to contain a fluid, the interior volume of the pocket being delimited:

partly by a cap comprising a movable wall arranged to tilt and/or translate and/or deform by pressing on a pressing surface so as to modify the interior volume of the pocket, partly by a bottom wall inserted in the cap a dispensing valve which, in an open state, allows a passage of the fluid from the pocket to the outlet, and, in a closed state, does not allow it, a reservoir provided with a wall arranged to contain the fluid, a feed valve which, in an open state, allows the passage of the fluid contained in the reservoir towards the pocket, and which, in a closed state, does not allow it, characterized in that the bottom wall comprises three distinct parts:

a central part partly delimiting the interior volume of the pocket and spaced from the cap so that this space defines at least partly this interior volume between the cap and this central part of the bottom wall an intermediate part, surrounding the central part of the bottom wall, and arranged to be pressed against the cap, with an intermediate space between the cap and the bottom wall of less than two millimeters, and a peripheral part, surrounding the intermediate part of the bottom wall, and arranged to form with the cap at least one closed loop sealing line between the cap and the bottom wall the intermediate part having an area greater than or equal to 400 square millimeters and/or greater than the area of the central part of the bottom wall.

The cap and the bottom wall may be arranged so that the bottom wall is mounted in the cap according to an assembly by insertion into the cap from the side of the at least one sealing line and according to an insertion direction, the pressing surface and the outlet preferably both being located on top of the cap so that:

the device is arranged so that the fluid to be dispensed exits through the outlet with a component along the direction of insertion representing at least 30% of the exit direction vector of the fluid to be dispensed, and the pressing surface is arranged to be moved by a force having a component opposite to the direction of insertion and representing at least 20% of the vector of this force.

The bottom wall may have a convex domed shape on the side of the interior volume of the pocket.

The cap may have a concave convex shape on the side of the interior volume of the pocket.

The majority of the interior volume of the pocket may be located in at least one cavity extending into the bottom wall towards the inside of the bottom wall.

The device according to the invention may not include a weld between the bottom wall and the cap.

The pressing surface may comprise structures making it possible to visualize this pressing surface.

According to another aspect of the invention, there is provided a device for dispensing a fluid, comprising:

a pocket having an interior volume arranged to contain the fluid.

a pressing surface arranged to, under the exertion of pressure, reduce the interior volume of the pocket, an outlet, a dispensing valve, and which in an open state allows a passage of fluid from the interior of the pocket towards the outlet, and, in a closed state, does not allow a passage of fluid from the interior of the pocket towards the outlet a reservoir a feed orifice connecting the reservoir to the interior volume of the pocket, a cap an insert the insert being inserted into the cap along a direction of insertion such that the interior volume of the pocket is delimited at least partly between the cap and the insert the reservoir being contained at least partly in the insert.

At least 20% of the internal volume of the reservoir may be contained in the insert.

The interior volume of the reservoir may sink at least 20 mm or 25 mm or 30 mm or even 35 mm inside the insert.

The feed valve may be carried by the insert.

The dispensing valve may be carried by the cap.

The output may be carried by the cap.

The outlet may carry an applicator and/or a dispensing surface.

The internal volume of the reservoir may be delimited at least partly by the insert.

The internal volume of the reservoir may be delimited at least partly by a flexible wall contained at least partly in the insert.

The pocket may surround the reservoir 360° around the reservoir.

The tightness of the interlocking of the insert in the cap may be ensured by at least one sealing contact line, the interior volume of the pocket preferably being at least twice as small as the interior volume of the cap delimited by a plane passing through the at least one line.

The pocket:

may be distributed over at least 30% of the height of the device along the direction of insertion, and/or may be at least 30 or 40 mm high along the direction of insertion.

The insert may extend outside of the cap.

The device according to the invention may comprise a vent connecting the exterior of the device to the interior of the insert.

According to another aspect of the invention, there is provided a device for dispensing a fluid, comprising:

a pocket having an interior volume arranged to contain the fluid, a pressing surface arranged to, under the exertion of pressure, reduce the interior volume of the pocket by displacement of a deformable or movable wall, an outlet, a dispensing valve, and which in an open state, allows a passage of fluid from the inside of the pocket to the outlet, and, in a closed state, does not allow a passage of fluid from the inside of the pocket towards the outlet a reservoir a feed orifice connecting the reservoir to the interior volume of the pocket, the device according to the invention further comprises a button equipped with a screw thread and screwed to an element integral with the deformable or movable wall, said screw thread being arranged to adjust a maximum possible amplitude of the movement of the button on the wall, and therefore set a maximum quantity of product delivered through the outlet of the device according to the invention when pressing on the pressing surface.

According to another aspect of the invention, there is provided a device for dispensing a fluid, comprising:

a button delimiting, with a bottom part, an elastic pocket comprising at least one deformable wall integral with a central wall, a surface arranged to, under the exertion of pressure, reduce the interior volume of the pocket, a dispensing valve, and which in an open state, allows a passage of fluid from the interior of the pocket towards the outlet, and, in a closed state, does not allow a passage of fluid from the interior of the pocket towards the outlet, Preferably the button comprises at least one guide means which cooperates with the bottom part or a fixed element of the bottom part, being arranged to translate the central wall towards the bottom part.

The pressing force may be arranged to decrease by at least 30% or at least 40% at the beginning of the displacement of the central part (from its rest position).

The central wall can have a width of at least 8 mm and/or an area of at least 50 mm2.

According to another aspect of the invention, there is provided a device for dispensing a fluid, comprising:

a pocket having an interior volume arranged to contain the fluid, the interior volume being delimited at least partly by a deformable or movable wall, a pressing surface arranged to, under the exertion of pressure, reduce the interior volume of the pocket by deforming the deformable wall or by moving the movable wall, an outlet, a dispensing valve, and which in an open state, allows a passage of fluid from the inside of the pocket to the outlet, and, in a closed state, does not allow a passage of fluid from the inside of the pocket towards the outlet Preferably, the movable wall is arranged to translate, preferably inside a conduit or cylinder or outside a piston, and has a translation movement guided by a rail which is coupled to a slide, each rail and/or slide thus being arranged to guide the pressing surface.

Preferably the translational movement of the junction wall or of the cap is guided by a rail which is coupled to a slide, each rail and/or slide thus being arranged to guide the pressing surface. According to another aspect of the invention, there is provided a device for dispensing a fluid, comprising:

a pocket being delimited at least partly by a deformable wall, a pressing surface arranged to, under the exertion of pressure, reduce the interior volume of the pocket, a dispensing valve, and which in an open state, allows a passage of fluid from the interior of the pocket towards the outlet, and, in a closed state, does not allow a passage of fluid from the interior of the pocket towards the outlet.

Preferably, the deformable wall of the pocket can be formed at least partly by a folding wall comprising an assembly of strips or parts.

A first kind of part or strip can be arranged to be able to buckle or deform under the action of a force exerted on the pressing surface. A second kind of part or band may be formed by flexible material and/or passages.

According to another aspect of the invention, there is provided a device for dispensing a fluid, comprising:

a bottom part comprising a bottom wall a pocket having an interior volume arranged to contain the fluid, a pressing surface arranged to, under the exertion of pressure, reduce the interior volume of the pocket, a feed orifice arranged to let the fluid pass to the inside of the pocket, an outlet, a dispensing valve, and which in an open state, allows a passage of fluid from the inside of the pocket to the outlet, and, in a closed state, does not allow a passage of fluid from the inside of the pocket towards the outlet, Preferably, the device comprises a cap or a button, said cap or the button being placed above the bottom wall.

The device may comprise a cap formed in one part comprising:

the pressing surface, a skirt extending from the pressing wall, the outlet orifice passing through the skirt.

The bottom part may comprise a skirt extending from the bottom wall arranged to be fixed on a reservoir.

The cap may comprise a movable or deformable wall partly delimiting the pocket.

The bottom part may include at least one orifice or filling hole opening onto the inside of the reservoir.

The cap may comprise at least one plug arranged to block the at least one orifice.

The device may comprise a dispensing orifice passing through the bottom part and arranged to let fluid out from inside the pocket, the cap being arranged to rotate between the open position and a closed position of the cap for which the cap blocks a fluid outlet through the dispensing orifice to the outside of the device, the outlet orifice communicating with the dispensing orifice without passing through the pocket.

The bottom wall may comprise one or more bumps arranged to reduce the volume of air in the pocket during the compression of the pocket during the priming of the device, and/or, a member of the bottom wall may partly cover the feed valve with respect to a direction perpendicular to the bottom wall.

The device may comprise a flexible edge arranged so that, during an exercise of the pressing force on the pressing surface from the outside of the pocket, transmitting at least part of this pressing force to the feed valve by pressing on the feed valve and/or transmitting at least part of this pressing force to the dispensing valve by pressing on the dispensing valve.

The device may comprise a concave part of the deformable wall surrounded by a flexible edge forming with the concave part a junction line, this junction line being arranged to move before at least 10% compression of the pocket.

All the preceding technical characteristics may be claimed independently of each other.

DESCRIPTION OF THE FIGURES AND EMBODIMENTS

Other advantages and particularities of the invention will appear on reading the detailed description of implementations and non-limiting embodiments, and of the following appended drawings:

FIG. 1 is a side sectional view of the first embodiment of a device 101 according to the invention, the reservoir being reduced in its length, cap open, FIG. 2 is a perspective view of the first embodiment of the device 101 according to the invention, the plug being disassembled, FIG. 3 is a side sectional view of the first embodiment of the production of a device 101 according to the invention, the reservoir being reduced in its length, plug dislocated, open, FIG. 3*a* is a partial profile sectional view of the first embodiment of a device 101 in a first variant of plug, FIG. 3*b* is a partial side sectional view of the first embodiment of a device 101 in a second variant of plug, FIG. 3*c* is a partial sectional view in perspective of the first embodiment of a device 101 with its filling pipe and its plug 310 disassembled in a third variant, FIG. 3*d* is a perspective view of the end piece 89 of the variant of the first embodiment of a device 101 of FIG. 3*c,*

FIG. 4 is a side sectional view of a second embodiment of a device 102 according to the invention, FIG. 5 is a side section of the second embodiment of a device 103, FIG. 6 is a side sectional view of part of the second embodiment 103 of the device according to the invention, FIG. 7 is a side sectional view of part of the second embodiment of the device 103 according to the invention, FIG. 8 is a side sectional view of part of the second embodiment of the device 103 according to the invention, FIG. 8 is a side sectional view of part of the second embodiment of the device 103 according to the invention, FIG. 9 is a side sectional view of part of the second embodiment of the device 103 according to the invention, FIG. 10 is an exploded perspective view of the second embodiment of the device 103 of the invention without the dispensing part, FIG. 11 is a side sectional view of the second embodiment of a device 104 according to the invention, FIG. 12 is a zoom of a profile section of part of the second embodiment of the device 104 according to the invention, FIG. 12*a* is a zoom of a profile section of part of the second embodiment of the device 104 according to the invention in a modified piston variant 86, FIG. 12*b* is a perspective view of the piston 86 of the variant of FIG. 12*a,*

FIG. 13 is a side sectional view of the second embodiment of a device 105 according to the invention, FIG. 14 is a side sectional view of the second embodiment of the device 105 according to the invention in a variant of the bottom wall, FIG. 15 is a perspective view of the second embodiment of the flexible wall of the device 105 according to the invention, FIG. 16 is a side sectional view of the second embodiment in a reservoir variant of the device 105 according to the invention, FIG. 17 is a side sectional view of the second embodiment of the reservoir of the device 105 according to the invention, FIG. 18 is an exploded perspective view of the second embodiment of device 105, FIG. 19 is a profile section view of the second embodiment of the device 105 according to the invention in its flat version, FIG. 20 is a zoom of a profile section of the second embodiment of part of the device 105 FIG. 20 according to the invention, FIG. 21 is a zoom of a profile section of the second embodiment of part of the device 105 FIG. 20 according to the invention, FIG. 22 is a zoom of a profile section of the second embodiment of part of the device 105 FIG. 20 according to the invention, FIG. 23 is a side sectional view of the second embodiment of a device 106 according to the invention, FIG. 24 is a side sectional view of the second embodiment of a device 106 according to the invention, FIG. 25 is an exploded perspective view of the second embodiment of device 106, FIG. 26 is a zoom of a profile section of the second embodiment of part of the device 106 FIG. 24 according to the invention, FIG. 27 is a zoom of a section profile of the second embodiment of a part of the device 106 FIG. 24 according to the invention, FIG. 28 is a zoom of a profile section of the second embodiment of a part of the device 106 FIG. 24 according to the invention, FIG. 29 is an exploded perspective view of the second embodiment of part of the device 106 in a non-cylindrical version, FIG. 30 is a side sectional view of the second embodiment of a device 107 according to the invention, FIG. 31 is a side sectional view of the second embodiment of part of the device 107 FIG. 30 according to the invention, FIG. 32 is a side sectional view of the second embodiment of the device 107 according to the invention, FIG. 33 is a side sectional view of the second embodiment of part of the device 107 FIG. 32 according to the invention, FIG. 34 is a side sectional view of a third embodiment of a device 1060 according to the invention, FIG. 35 is an exploded perspective view of the third embodiment of the device 1060 according to the invention, FIG. 36 is a side sectional view of a fourth embodiment of a device 4000 according to the invention, FIG. 37 is a profile sectional view of a detail of part of the fourth embodiment of the device 4000 according to the invention, FIG. 38 is a side sectional view of a fifth embodiment of a device 5000 according to the invention, FIG. 39 is a front sectional view of a detail of part of the fifth embodiment of the device 5000 according to the invention, FIG. 40 is a side sectional view of a sixth embodiment of the device 6000 according to the invention, FIG. 41 is a top sectional view of a detail of part of the sixth embodiment of the device 6000 according to the invention, FIG. 42 is a top sectional view of a detail of part of the sixth embodiment of the device 6000 in a variant according to the invention, FIG. 43 is an exploded view of a detail of part of the sixth embodiment of the device 6000 according to the invention, FIG. 44 is a view of a detail of part of the sixth embodiment of the device 6000 according to the invention, FIG. 45 is a side sectional view of a seventh embodiment of the device 7000 according to the invention, FIG. 46 is a zoom of part of the profile section of the device 7000 according to the invention, FIG. 47 is a side sectional view of an eighth embodiment of the device 8000 according to the invention, FIG. 48 is a zoom of part of the profile section of the device 8000 according to the invention, FIG. 49 is a side sectional view of a ninth embodiment of the device 9000 according to the invention, FIG. 50 is an exploded view of part of the device 9000 according to the invention, FIG. 51 is a side view of an applicator variant of the device 9000 according to the invention, FIG. 52 is a side view of another applicator variant of the device 9000 according to the invention, FIG. 53 is a side view of a tenth embodiment of a device 10000 according to the invention, FIG. 54 is a side view of an eleventh embodiment of a device 11000 according to the invention, FIG. 55 is an exploded view of part of the device 11000 according to the invention, FIG. 56 is a side view of a twelfth embodiment of a device 12000 according to the invention, FIG. 57 is an exploded view of part of the device 12000 according to the invention, FIG. 58 is a partial side view of a thirteenth embodiment of a 13000 device according to the invention, FIG. 59 is a perspective view of part of the device 13000 according to the invention, FIG. 60 is a side sectional view of an embodiment 14000 of a device according to the invention, FIG. 61 is a side sectional view of part of embodiment 14000 of device according to the invention, FIG. 62 is an exploded perspective view of the different parts of embodiment 14000 of the device according to the invention, FIG. 63 is a side sectional view of an embodiment 15000 of a device according to the invention, FIG. 64 is a side sectional view of an embodiment 16000 of a device according to the invention, FIG. 65 is a side sectional view of part of embodiment 16000 of device according to the invention, FIG. 66 is an exploded perspective view of the different parts of embodiment 16000 of the device according to the invention, FIG. 67*a* is a side sectional view of an embodiment 17000 of a device according to the invention, FIG. 67*b* is a side sectional view of embodiment 17000 without charging connector 225, FIG. 67*c* is a partial side sectional view of a variation of embodiment 17000 at wall 22, FIG. 67*d* is a partial side sectional view of a variant of embodiment 17000 at the position of the filling pipe, FIG. 68*a* illustrates the implementation of a method according to the invention in one embodiment of a device according to the invention, FIG. 68*b* illustrates the implementation of a method according to the invention in one embodiment of a device according to the invention, FIG. 69*a* is a side sectional view of another embodiment of a device 18000 according to the invention, FIG. 69*b* is a partial side sectional view of an alternative embodiment of the device 18000 of FIG. 69*a* according to the invention, FIG. 69*c* is a perspective view of the embodiment of the device 18000 according to the invention, FIG. 70*a* is a side sectional view of another embodiment of a device 19000 according to the invention, FIG. 70*b* is a profile sectional view of a variant of the embodiment FIG. 70*a* of the device 19000 according to the invention, FIG. 70*c* is a perspective view of a part of the device 19000 in the variant with a compressed folding wall, FIG. 70*d* is a profile sectional view of a variant of the folding wall of the embodiment FIG. 70*a* of the device 19000 according to the invention, FIG. 70*e* is a side sectional view of a variant with clip of a 19000 device according to the invention, FIG. 70*f* is an exploded perspective view of the clip variant of the 19000 device, FIG. 70*g* is a side sectional view at the clips of part of device 19000, FIG. 70*h* is a sectional view in profile at the position of the clips but in a compressed position of the pocket, FIG. 70*i* is a partial perspective view of another embodiment of a device 20000 with a folding wall according to the invention, FIG. 71 is a perspective view of another embodiment of a device 21000 according to the invention disassembled, FIG. 72 is a side sectional view of the embodiment of the device 21000 according to the invention of FIG. 71, but assembled, FIG. 73 is a transverse section of the pocket of FIG. 72 of device 21000, FIG. 73*a* is a partial section of a variant of the device 21000 according to FIG. 72 at the position of the pressing wall, FIG. 74 is a button profile sectional view 162 added to any embodiment or device variant according to the compatible invention, FIG. 75 is a profile sectional view of another variant of button 162 added to any embodiment or variant of device according to the compatible invention, FIG. 76 is a perspective view with part of button 162 of FIG. 75 cut away, FIG. 77 is a perspective view of a dispensing valve 5, FIG. 78 is a front sectional view of the valve 5 of FIG. 77 at its junction element 115, FIG. 79 is a side sectional view of another embodiment with part of the reservoir of a 22000 device according to the invention, FIG. 80 is a side sectional view of device 22000 at plugs 310, FIG. 81 is a perspective view of the cap 70 dislocated from the rest of the device 22000, FIG. 82 is a perspective view of the dispense and feed valve of device 22000, FIG. 83 is a perspective view of bottom wall 21 at cavity 134 of device 22000, FIG. 84 is a perspective view of the outside of device 22000 stripped of part of cap 70 at spout 30 in a variant without plug 310, FIG. 85 is a side sectional view of the device 22000 in a variant provided with a pressing means for the intake and dispensing valve and a pressing member for the valve of distribution, FIG. 85*a* is a side sectional view of part of the device 22000 in a variant provided with a support means comprising a valve, FIG. 86 is a profile sectional view of the device 22000 in a variant provided with another support means for the intake and dispensing valve and with a pressing member of the dispensing valve.

These embodiments being in no way limiting, variants of the invention may in particular be considered comprising only a selection of characteristics described or illustrated below isolated from the other characteristics described or illustrated (even if this selection is isolated within a sentence including these other features), if this selection of features is sufficient to confer a technical advantage or to differentiate the invention from the state of the prior art. This selection includes at least one preferably functional feature without structural details, and/or with only part of the structural details if only this part is sufficient to confer a technical advantage or to differentiate the invention from the state of the art anterior. Preferably the product to be dispensed is a fluid.

We will first describe, with reference to FIGS. 1 to 3, a first embodiment of device 101 according to the invention for dispensing a fluid.

Unless otherwise stated and in a purely illustrative manner:

- each valve of the device 101 (preferably flexible) is typically made of thermoplastic elastomer (TPE) or (TPO)
- all the other rigid parts of the device 101 are made of polypropylene or polyethylene
- the reservoir may be a multilayer film made up of different materials, or preferably materials from the polyolefin family.

The fluid comprises a liquid and/or a gas, and is preferably a liquid, cream, paste, gel or mixture thereof.

The device 101 for dispensing a fluid comprises a pocket 2 having an interior volume arranged to contain the fluid, the interior volume being delimited at least partly by a deformable wall 22. The deformable wall is optional. In general, we speak of a movable wall 22, because it is the pocket which is deformable, whether by a deformable wall or by rigid walls having a relative movement such as a piston.

The pocket 2 is formed by a bottom wall 21 (also called pocket wall 21) and by the flexible deformable wall 22.

The pocket walls 21 and the deformable wall 22 face each other.

The deformable wall 22 has a concave shape oriented towards the bottom wall 21.

The deformable wall 22 is fixed or welded to the bottom wall 21.

The bottom wall 21 is a rigid wall, that is to say more rigid than the wall 22.

The walls 21 and 22 are for example made of polypropylene or polyethylene.

The device 101 comprises a dispensing part 23 comprising a dispensing cavity 8. The pocket 2 is connected to the dispensing cavity 8.

The device 101 comprises a pressing surface 25 arranged to, under the exertion of pressure, reduce the interior volume of the pocket 2 by deforming the deformable wall 22.

The device 101 includes an outlet 24.

The outlet 24 leads to the outside of the device 101.

The outlet 24 is preferably located on the dispensing part 23.

The device 101 comprises a dispensing orifice 18 or 355 connecting the pocket 2 to the dispensing cavity 8.

The device 101 comprises a dispensing valve 5 located in the dispensing cavity 8, and which in an open state, allows a passage of fluid from the interior of the pocket 2 to the outlet 24 passing through the dispensing orifice 18 and through the dispensing cavity 8, and, in a closed state, does not allow a passage of fluid from the inside of the pocket 2 towards the outlet and through the dispensing cavity 8.

The pressing surface 25 is arranged to, under the exertion of pressure, reduce the interior volume of the pocket 2 by deforming the deformable wall 22, more precisely by crushing it in the direction of the pocket wall 21.

The dispensing part 23 is arranged to, by exerting pressure on the pressing surface 25, move at least according to a translational movement.

The deformable wall 22 has a shape memory. When this wall 22 is not subjected to any external constraint, it resumes or remains in its shape (preferably concave) which maximizes the volume of the pocket 2.

The device 101 comprises a feed orifice 41 connected with a reservoir 6 of fluid.

The reservoir 6 is delimited at least partly by a flexible wall 108 or a flexible bag 14, typically a multilayer film.

The device 101 comprises a feed orifice 41 connecting the reservoir 6 to the interior volume of the pocket 2. The orifice 41 coincides with an opening 124 of the reservoir 6 connecting it to the pocket 2.

The device 101 comprises a feed valve 4 which, in an open state, allows a passage of fluid from the reservoir 6 towards the interior of the pocket 2 passing through the feed orifice 41, and, in a closed state, does not allow a passage of fluid towards the interior of the pocket 2 passing through the feed orifice 41.

The feed valve 4 is located inside the pocket 2 and is arranged to:

- in its closed state, press against the feed orifice 41, and
- in its open state, move away from the feed orifice 41.

The feed valve 4 (movable between its closed and open positions) is, in its closed state, held pressed against a part stationary (called feed seat, which at least partially surrounds the periphery of the feed orifice 41 associated) and "rigid" (i.e. not made of flexible material) of an internal wall of the pocket 2. More precisely, the feed valve 4 comprises a membrane which, in the closed state of the feed valve 4, is held pressed against the feed seat, and moves away from this feed seat in its open state.

The feed seat is located inside pocket 2, on pocket wall 21.

At rest, that is to say without the device 101 undergoing stress or external force, the valve 5 is in its closed state.

Preferably, even if it is less essential, at rest, that is to say without the device 101 undergoing stress or external force, the valve 4 is also in its closed state.

When the pocket 2 is filled with fluid to be dispensed and the volume of the pocket 2 decreases (for example due to an increase in pressure on the pressing surface 25):

- the dispensing valve 5 moves away from the dispensing seat 13 and the valve 5 is in its open state; fluid exits through the outlet 24 and the pocket 2 empties at least partially,
- the feed valve 4 is pressed against the feed orifice 41 and the valve 4 is in its closed state; fluid cannot (or almost cannot) escape from the pocket 2 to the reservoir 6.

When pocket 2 is filled with fluid to be dispensed and the volume of the pocket 2 increases (for example by releasing pressure on the pressing surface 25):

- the dispensing valve 5 presses against the dispensing seat 105 and the valve 5 is in its closed state; fluid cannot pass from the pocket 2 to the outlet 24
- the feed valve 4 is "sucked in" and moves away from the feed orifice 41 and the valve 4 is in its open state; fluid can pass from the conduit 6 to the pocket 2 so as to fill the pocket 2.

A dispensing channel connects the outlet 24 inside the pocket 2. This dispensing channel includes the cavity 8.

The bottom wall 21 is integral with an end piece 89 also called "eye" 89.

The device 101 comprises the reservoir 6 delimited by the walls 14, 108 which are fixed to the end piece 89, or more precisely a flexible bag 14, 108 welded to the end piece 89.

The pocket 2 is located inside the reservoir 6 or bag 14.

The outlet 24 is arranged to dispense fluid in a direction substantially parallel to the pressing surface 25.

A plug 77 to block the outlet 24 is arranged to pass between two positions:

a closed position in which a part 771 (stud) of the plug 77 is inserted into the outlet 24 so as to block or protect the outlet 24 from dirt, the distance between the closure of the dispensing valve 5 is at a distance of less of 6 mm or even less than 4 mm from the outlet 24. Grooves in the inner perimeter of the outlet 24 allow, when the part 771 (stud) of the plug 77 (or in general any valve or plug 77) is inserted into the outlet 24 so as to block or protect the outlet 24 from dirt, prevent the passage of the fluid (liquid, cream or gel) to be dispensed but leave an air passage through the outlet 24;

an open position (illustrated in FIG. 1) in which this part 771 of the plug 77 is no longer inserted into the outlet 24.

The pocket 2 is located inside the reservoir 6.

The device 101 comprises the feed valve 4 which, in an open state, allows a passage of fluid from the feed conduit towards the inside of the pocket 2 passing through the feed orifice 41, and, in a closed state, does not allow a passage of fluid from the feed conduit to the inside of the pocket 2 through the feed orifice.

The feed valve 4 is integral with the dispensing valve 5.

The feed valve 4 and the dispensing valve 5 are in a single part of a single material.

The part 23 and the pocket wall 21 are in one and the same part with no material discontinuity.

The end piece 89 and the part 23 are in one and the same part without material discontinuity.

There are one or two filling holes 87, 87*b* each opening onto the inside of the reservoir 6.

Preferably, these filling holes are two in number and are located on either side of the outlet 24.

These filling holes go through the piece 89.

A single plug 310 is arranged to simultaneously:

plug the filling hole(s), and plug and/or protect outlet 24.

The plug 310 includes a plug 77 which is removable by means of a hinge.

The plug 310 comprises 2 cylindrical pins 313 which fit together with a slight tightening (preferably with a snap) in the end piece 89 at the position of the filling holes 87 and 87*b* in order to adjust and precisely maintain the plug 310 with the end piece 89 during assembly. This is the preponderant fixing means in the assembly of the plug 310 on the end piece 89, complementary independent clips make it possible to maintain the fitting assembled. The diameter of the pins 313 is preferably more than 3 mm and even more than 4 mm. Preferably the two holes 87, 87*b* are open, however in a version not shown one of the holes 87 or 87*b* is not open, this non-open hole is called adjustment or positioning hole.

The end piece 89 comprises 2 lateral notches 130 arranged to hold the device during filling and/or closing by fitting the plug 310 into this end piece 89. Typically the end piece 89 is arranged to slide in rails of a device for conditioning. The notches are located on the side ends of the end piece 89 towards the side edges of the reservoir 14.

The plug 310 comprises a cavity 312 arranged to receive the end of the dispensing part 23 provided with the outlet 24. The dispensing part 23 passes through the plug 310.

FIGS. 3*a* and 3*b* are two variants of the plug 310 of the device 101. In these variants the plug 310 comprises an applicator 208 formed in the plug (at least partly) with a domed shape 308 or with a spout shape 309. The cavity 312 is located in the applicator 208 and is arranged to receive or fit together with the dispensing part 23. The cavity 312 at least partially surrounds the dispensing valve 5 and/or the dispensing cavity 8.

The bag 14 is welded to the eye 89 more precisely on fins. In another variant, the eye comprises a welding wall extending along the axis of the dispensing channel 114, the cavity formed between the welding wall and the dispensing part 23 is hidden by the plug 310.

Referring to FIG. 3*a*, the applicator 208 comprises a domed shape 308 at least 4 mm thick and even at least 8 mm thick allowing the product or fluid to be dispensed to be spread and/or massaging a part of a body with the product or fluid to be dispensed. A removable cover, not shown, makes it possible to protect the applicator 208. This applicator may comprise at the position of the outlet 24 or of the orifice 24 a layer 315 which may be a metal layer, a layer of foam or else a layer of fabric. This layer 315 covers the orifice 24 if for example it is made of foam or fabric. The device may comprise several orifices 24. The at least one orifice 24 may be covered by this layer of foam or fabric. This layer may be glued, ultrasonically welded or even maintained by an ultrasonically welded frame. The pins 313, the applicator 208 (without the layer 315) and the cavity 312 are made in a single part by injection molding PE (Polyethylene) or PP (Polypropylene).

Referring to FIG. 3*b* the applicator 208 of the plug 310 forms a spout 309 arranged to precisely dispense product. The end of the spout carries a pad 316 which can be made of foam or fibers to dispense, for example, a gloss or lipstick. The outlet 24 is at the end of a rod in the pad 316. Several small holes can be made in this rod so as to homogenize the distribution of product on the pad. In a version without pad 316, the outlet 24 is located at the end of the spout 309. The dispensing part does not pass through the plug. The plug 310 further comprises a plug 77 to plug the outlet 24, this plug 77 is removable by means of a flexible link connected to the foot of the spout 309. The pins 313, the applicator 208 (without the pad), the cavity 312, the plug 77, and the flexible link are made in one part by injection of PE (Polyethylene) or PP (Polypropylene).

The device according to the invention may include an air pocket, and this air pocket may include an extraction hole 11 arranged to extract the air from this pocket. This extraction hole is located at a distance of less than 3 cm from at least one of the filling holes, so that the fluid to be dispensed does not come out through the filling hole when placing the device under vacuum.

The wall 22 is provided with a skirt 155 having a height at minimum at least as high, in the same direction of measurement, as the height at the entrance to the cavity 8 on the side of the pocket 2 (i.e. minimum of 2 or 3 mm).

This skirt 155 allows the insertion of the valve 5 into the cavity 8 from inside the pocket 2 perpendicular or substantially perpendicular to the direction of measurement of the height of this skirt 155.

The end piece 89 sinks into the plug 310. The dispensing surface 207 is formed by the plug 310 and the end piece 89.

The cavity 312 includes plug 310 between pins 313.

FIGS. 3*c* and 3*d* describe another variant of device 101 which will only be described for its differences with respect to the variant of FIGS. 2 and 3.

In this variant, the end piece 89 comprises three parts:

an outer crown, a central part (also part of the dispensing part 23) which carries the outlet 24, at least one (preferably at least two, typically three) connecting walls 9 connecting the outer crown of the end piece 89 to the central part of the end piece 89, these connecting walls 9 being arranged to leave at least one empty space 15 between the outer crown of the end piece 89 and the central part of the end piece 89, this at least one empty space 15 being arranged to allow passage of a filling pipe 46 which, passing through this at least one empty space 15, penetrates to the inside of the reservoir 6 (typically along the outside of the pocket 22).

It is thus noted that the pocket 22 does not have a form of symmetry of revolution around the longitudinal axis of the device 101 to allow the passage of the pipe 46.

Thus, a method according to the invention typically comprises, while the plug 310 is dismantled from the rest of the device 101, a filling of the reservoir 6 by the filling pipe 46 which passes through this at least one empty space 15 and penetrates up to inside the reservoir 6 (typically along the outside of the pocket 22), and thus performs a filling of the reservoir 6 by a fluid coming from the outside of the device 101 passes through the pipe 46 into the reservoir 6.

After this filling, the plug 310 can be reassembled on the neck 85. For this, the neck 85 comprises an external screw thread 16, which is advantageous compared to an internal screw thread which would push the end piece 89 and the outlet 24 inside the device 101 and would make the latter less compact.

The neck 85 is integral (and in the extension) of the walls of the reservoir 6.

We also note that this space 15 allowing the passage of the pipe 46 for filling the reservoir 6 is also present in FIG. 3.

FIGS. 4 to 33 illustrate a second embodiment of six devices 102, 103, 104, 105, 106, 107. Unless stated otherwise or more specifically, only the differences with the device 101 of FIG. 1 will be described.

Each of the embodiments of the device 102, 104, 105, 106, 107 for dispensing a fluid comprises:

the outlet 24, the pocket 2 having an interior volume to contain a fluid, the interior volume of the pocket 2 being delimited at least partly by the movable wall 22, the reservoir 6 arranged to contain the fluid and comprising two openings, namely the upper opening 124 oriented towards the pocket 2 and a lower opening 87, said reservoir 6 being arranged to reduce its internal volume when the fluid exits from the reservoir, the dispensing valve 5 which, in an open state, allows a passage of the fluid from the pocket 2 to the outlet 24, and, in a closed state, does not allow it, the feed valve 4 which, in an open state, allows the passage of the fluid contained in the reservoir 6 to the pocket 2, and which, in a closed state, does not allow it.

The lower opening 87 is arranged to allow a passage of the fluid, preferably a passage of a cannula (or filling pipe) transporting the fluid, so as to fill the reservoir 6 with fluid at least partly at least up to the feed valve 4 so that the fluid is in contact with the feed valve 4 and preferably so as to also fill the interior volume of the pocket 2 with at least part of the fluid.

The feed valve is arranged to allow the pipe or cannula to pass, for example by bending.

Referring to FIG. 4, the dispensing part 23 (also called dispensing head 23) comprises:

a cap 70, and optionally an insert 71.

Note that the deformable wall 22 is not movable in the cap 70. There is no part of the movable pocket function in the cap 70. The cap 70 is mounted superimposed on the flexible wall 22. The wall 22 is a bellows or the base of a dome with an upper edge 228 connected to the cap 70 in continuity of material or overmolding or bi-injection, and a lower edge 229 connected to the wall 118 of reservoir 6 in continuity of material or overmolding or bi-injection.

The junctions and/or connection with the edges 229 and 228 are sealed.

The deformable wall 22 is mounted superimposed on the wall 118 of the reservoir 6.

The dispensing part 23 comprises a cap 70, the pressing surface 25 forms part of the dispensing part 23, the cavity 8 is located inside the cap 70, the cap 70 is mounted superposed on the deformable wall 22.

The deformable wall 22 and the cap 70 are:

grouped together in a single part of the same material without material discontinuity, or, manufactured in the same part by overmolding or bi-injection.

The dispensing valve 5 is in a cavity located inside the at least one part 70 (of the dispensing part 23) having a continuity of material with the wall 22, this cavity is lateral and is positioned between the pocket 22 and the outlet 24. The connection between the cap 70 and the insert is sealed so as to have a pocket 38 of air or gas sealed.

The reservoir 6 arranged to contain the fluid and comprising two openings, the upper opening 124 of which is oriented towards the pocket 2 and a lower opening 87, said reservoir 6 being arranged to reduce its internal volume when fluid exits from the reservoir during pressing on the wall 25 once the device has been initiated, this phase is subsequently called the pumping operation.

The reservoir 6 comprises a rigid wall 99 inside which a piston 86 slides.

The piston 86 is between the reservoir 6 and a bottom wall 91. The piston 86 is inserted into the opening 87 after filling the reservoir 6 through the opening 87, it forms a plug 310. The reservoir 6 has a cylindrical shape and elongated Reservoir 6 includes a side wall 118 or container 118 between bottom wall 91 and pocket wall 21.

The side wall 118 is part of a part 10 arranged to:

contain the piston 86, maintain the pocket wall 21 by tightening, form the wall 22 by continuity of the same material or in two different materials by bi-injection at the position of the junction 229.

The deformable wall 22 and the wall 10 are:

grouped together in a single part of the same material without material discontinuity, or, manufactured in the same part by overmolding or bi-injection.

At least one hole 95 made in the piston 86 or between the piston and the wall 99 allows the air to come out of the reservoir 6 when inserting a part of the piston 86 (more precisely the upper part) into the reservoir. Thus the piston 86 comprises two lips of which a first upper lip 88 (oriented towards 124) is arranged to enter the reservoir in a non-sealed manner since it is provided with at least one hole 95, and a second lower lip 28 (oriented towards the bottom 91) arranged to enter the reservoir 6 in a sealed manner. Note that the piston 86 consists of a single part, it is not provided with a valve.

In order to reduce the air, the piston preferably comprises a domed wall 26. The dome shape 26 makes it possible to reduce the air between the piston and the product and to expel the cream or product to be dispensed on the sides against the wall 99 during inserting the piston into the reservoir.

As long as the lower lip 28 of the piston is not fitted into the internal walls 99 of the reservoir 6, the air contained in the reservoir can escape from the device.

The at least one hole 95 is arranged to also allow passage of the fluid between the reservoir 6 and a sealing zone 97 between the piston 86 and the wall 99.

Typically there are several holes 95. The openings 95 may be slots around upper lip 88.

With reference to FIGS. 5 to 10, the reservoir 6 is delimited at least partly by a movable piston 86 arranged to move so as to reduce the internal volume of the reservoir 6 when the fluid exits from the reservoir 6, this piston 86 being provided with the lower opening 87, the lower opening 87 being closed by a removable plug 310.

The removable plug 310 is screwed onto the piston 86.

The piston 86 is between the reservoir 6 and a bottom wall 91, said preferably rigid bottom wall 91 being provided with means 93 to block the rotation of the piston 86 during the screwing of the plug 310 on the piston 86 when the piston 86 is in contact with the bottom wall 91.

The bottom wall 91 is provided with fastening means 45 to fit together preferably by snap-fastening with the rigid wall 118 of the reservoir.

Different variants of this embodiment can be combined with each other:

- in the variant illustrated in FIG. 6, the means 93 typically comprise, for example, a slot into which a part of the piston 86 is inserted, and/or
- in the variant illustrated in FIG. 7, the means 93 typically comprise, for example, clipping means, and/or
- the piston can have a curved shape (disc, ellipse, or other) or a polygon. In the variant illustrated in FIG. 10, the piston 86 has, in a cross-sectional view perpendicular to a direction of displacement of the piston 86 along a wall 99, a shape of a polygon comprising several sides connected by angles, the device further comprising a force distribution part 33 arranged to press the piston 86 against the wall 99 at several (preferably all) sides of the polygon but outside the corners of the polygon. In another variant, the distribution part 33 can be replaced by a variable thickness of the walls of the piston 86.

FIGS. 11 and 12 illustrate one embodiment of a device 104 for dispensing fluid. Only its differences with the device 103 of FIGS. 5 to 10 will be described.

Referring to FIGS. 11 to 12, the piston 86 is not drilled and does not include a filling opening, the filling opening 87 is formed by the lower edge of the walls 118 (more precisely the opening 87 is cylindrical).

After the reservoir has been filled, the piston 86 is placed therein, more precisely it is placed by sliding in the cylinder 87, 118, preferably during this step the bottom wall 91 is fixed to the piston.

The lower lip 28 is attached to the bottom wall 91 by elastic means 32 at least before the introduction into the opening 87.

During the introduction into the opening 87 the lip 28 provided with the elastic means 32 is deformed which has the effect of the displacement of the elastic means 32 towards the axis of the piston. This movement has the effect of separating the elastic means 32 from the bottom wall 91.

In order to accentuate this deformation, it is advantageous to add a local surplus of material to the internal walls 99 of the reservoir 6, such as a ring material 29. The elastic means 32 are arranged to detach easily from the bottom 91 from the first pumping operations (before the first 10 pumping operations), that is to say when the wall 22 is crushed once the device started.

Projecting walls 31 of the bottom 91 are arranged to hook with the elastic means 32 and raise the piston 86 relative to the bottom wall 91. At least a part of the projecting walls 31 are introduced between the elastic means 32 and the lip 28. The elastic means 32 can be clipped onto the projecting wall 31.

FIGS. 12*a* and 12*b* illustrate part of the second embodiment of the device 104 according to the invention in a variant of modified piston 86; this variant will only be described for its differences with respect to the description of FIGS. 11 and 12.

The piston 86 includes lips.

The upper part 88 of these lips (or "upper lips") is the first to enter the reservoir 6 when the piston 86 is inserted through the opening 87.

The lower part 96 of these lips (or "lower lips") is the second (or last) to enter the reservoir 6 when the piston 86 is inserted through the opening 87.

The upper lips 88 are provided with reliefs or ribs or studs 197 which separate the upper lips 88 from the internal walls 99 in order to allow air or product to be dispensed to escape from the reservoir 6 through the opening 87 passing between reliefs or ribs or studs 197 during the insertion of the piston 86 through the opening 87.

The lower lips 96 are arranged to seal the opening 87 between the inside of the reservoir 6 and the outside of the device once these lower lips 96 enter between the walls 118 by the opening 87.

Side openings 94 inside piston 86 allow air to escape and prevent an air bubble from forming in piston 86 when inserting piston 86 through the opening 87

The piston 86 comprises means 98 for holding the piston 86 to the wall 91. There is no outer wall of the part 91 which surrounds the outside of the piston, even partially. In order to improve the holding of the piston, a wall of part 91 (not shown) can fit inside the piston 86. These holding means 98 typically comprise:

- a rod or other means, integral with the piston 86, and which fits or clips or attaches to the wall 91, or
- reception means in which fit together or clip or attach a rod or other means, integral with the wall 91
- the piston 26 and the wall 91 being integral during the insertion of the piston 86 into the opening 87, the piston 26 and the wall 91 being arranged to separate during the progression of the piston 86 between the walls 118 in the reservoir 6 (the wall 91 it remaining fixed) and/or by a mechanical action when closing the device.

FIGS. 13 to 22 illustrate another embodiment of a device 105 for dispensing fluid. Only its differences with the device 104 of FIGS. 11 to 12 will be described.

The wall 108 is flexible or mainly comprises flexible walls (hereinafter referred to as "flexible wall 108" or "wall 108").

The reservoir 6 arranged to contain the fluid is delimited by:

- a flexible wall 108 comprising the two openings, the upper opening 124 facing the pocket 2 and the lower opening 87, and
- a bottom wall 91, 310 preferably removable, arranged to block the lower opening 87.

The plug 310 is integrated into the wall 91.

The flexible wall can for example be injected or thermoformed.

The area of a section of the upper opening 124 (this section being chosen to minimize the area of the upper opening 124) is at least six times (and even at least eight times) smaller than the area of a section of the lower opening 87 (this section being chosen to minimize the area of the lower opening 87).

The flexible wall 108 is arranged to deform so as to reduce the internal volume of the reservoir 6 when fluid exits from the reservoir 6.

The edge 43 and/or the skirt 42 is arranged to seal between the inside of the reservoir and the outside of the device.

The device 105, more precisely the rigid wall 91, is arranged to keep the position of the lower opening 87 in the device 105 fixed with respect to the position of the upper opening 124 in the device 105.

The flexible wall 108 is fixed to the pocket 2 according to a hermetic junction.

The flexible wall 108 comprises a cylinder 81 above the reservoir 6 allowing sealing. To have the tightness, either this cylinder 81 is compressed (case of FIGS. 14 and 16), or it is fitted (case of FIG. 13). It is preferable to have a second cylinder concentric with the first cylinder 81.

The device 105 comprises means 110 (optional) for internal guiding of the cap 70 (which is the part forming the internal volume of the pocket 2 and further containing the dispensing valve 5). The means 110 are arranged to guide a movement of the cap. The means 110 take the form of a small wall 110 emerging from the bottom wall 21.

Different variants of this embodiment 105 can be combined with each other:

- the flexible wall 108 is fixed to the pocket 2 according to a tight junction:
  - by welding, and/or
  - by clipping (by a clip 83), and/or by interlocking, as illustrated in the variant of FIG. 13 and/or
  - by compression of the flexible wall 108 around its upper opening 124 between on the one hand a part forming or integral with the pocket 2 and located outside the reservoir 6 and on the other hand a ring 109 (and whose upper edge forms the feed seat 62 as previously described) inserted inside the reservoir 6, as illustrated in the variants of FIGS. 14 and 16, 18. In the variant of FIG. 14, the ring 109 is integral with the rigid wall 91 and the ring 109 and the wall 91 form the same part with continuity of material, while in the variant of FIGS. 16 and 18 the ring 109 and the wall 91 form two separate parts without continuity of material; and or
- the flexible wall 108 and the feed valve 4 are formed in the same part with continuity of material (as illustrated in FIGS. 16 to 18) or in two distinct parts without continuity of material (as illustrated in FIGS. 13 to 15).

Referring to FIGS. 19 to 22, the device 105 is “flat”. In order to reduce the air trapped during closing, a retaining element 17 makes it possible to maintain the walls of the reservoir on the sides, but does not seal. Indeed, sealing is achieved by axial crushing instead of lateral crushing. If the reservoir is injected into a flexible material, there is no need for an additional seal, but if the reservoir is thermoformed, it is preferable to add a gasket 39 if the precision of the injected parts 93 and 122 is not sufficient. The gasket 39 comprises at least one flexible face in contact with the wall 108 in order to provide a gasket between the reservoir 6 and the outside.

In the case of a flexible wall 108 obtained by thermoforming in order to refine its thickness, typically around 0.2 mm, it is proposed a deformation of the raw material (typically a sheet or a film) of a thickness deeper than the thickness of the reservoir thus forming a “thick part” (for example a deformation 1.5 or 2 times deeper) then a partial cutting of this “thick part” to extract the pocket 108.

Note that the bottom wall 21 includes a ring 48 at the position of the opening 124, this ring is deformed (in a direction opposite to the center of the hole 41) preferably by ultrasound and is arranged to compress the wall 108 of the reservoir.

FIGS. 23 to 29 illustrate another embodiment of a device 106 for dispensing fluid according to the second aspect. Only its differences with the device 105 of FIGS. 13 to 22 will be described. Referring to FIG. 23, the wall 91 is screwed onto a neck 87 of the reservoir 6.

The lower opening 87 takes the form of a neck referenced 85 or 87.

This neck 87 of reservoir 6 forms an inlet orifice to fill reservoir 6 when this neck is not screwed to wall 91.

The wall 91 therefore forms a plug for this neck 87. The wall 91 integrates in a single part, preferably in the same material, the plug 310 arranged to be screwed onto the neck 87 and fixing means 45 arranged to fit together with the wall 12, preferably by snap-fastening.

The wall 91 is connected to side walls 12 arranged to, when this neck is screwed to the wall 91:

- hide the reservoir 6, and
- maintain the reservoir 6.

The wall 12 surrounds a wall 108 delimiting an internal volume of the reservoir 6 (delimiting at least 50% and even at least 75% of the internal volume of the reservoir 6).

These side walls 12 are nested or snapped with the wall 91. The wall 91 comprises snap-fastening means 45.

The reservoir is blown in PE (Polyethylene) or PP (Polypropylene).

Reservoir 6 includes a bump 60 arranged to be welded to bottom wall 21.

The wall 12 and the wall 21 form a container 122 arranged to contain the reservoir 6.

The side wall 12 is part of a part 100 or wall 100 arranged to:

- contain the flexible walls 108,
- maintain the pocket wall 21 by tightening
- form the wall 22 by continuity of the same material or in two different materials by bi-injection at the position of the junction 229.

The deformable wall 22 and the wall 100 are:

- grouped together in a single part of the same material without material discontinuity, or,
- manufactured in the same part by overmolding or bi-injection.

The wall 91 comprises screwing means 310 making it possible to close or plug the reservoir 6 in a leaktight manner. During the screwing operation, the reservoir can lift (translate towards the wall 91) and/or deform by extending towards the bottom wall 91. Only the bottom wall 91 is rotated by an external tool (not shown) in order to close the neck of the reservoir 6.

Once the screwing operation is complete, an axial force on the wall 91 towards the reservoir makes it possible to fix the wall 91 with the wall 12.

The wall 91 comprises fixing means 45 to the container 122. The fixing means may preferably comprise interlocking, and more preferably an interlocking with snap-fastening of the wall 91 with the container 122, more precisely with the wall 12.

The wall 91 makes it possible to close or block the container 122, preferably in a non-airtight manner.

The deformable wall 22 and the wall 12 of the container 122 are:
- grouped together in a single part of the same material without material discontinuity, or,
- manufactured in the same part by overmolding or bi-injection.

With reference to FIGS. 24 to 29, the device 106 of FIGS. 24 to 29 is distinguished by the following elements.

The flexible wall 108 of the reservoir 6 is itself enclosed in a wall 12 of a container 122.

First of all, it includes an anti-rotation system of the reservoir 6:
- in the case of the embodiment common to FIGS. 24 to 28, this anti-rotation system takes the form of:
  - at least one relief 40 of the wall 108 of the reservoir 6, preferably several reliefs 40 (typically hollows or bumps respectively)
  - at least one relief, preferably several reliefs (typically bumps or hollows respectively) on the wall 12 and/or 21 and/or 91 arranged to block the rotation of the reliefs of the wall 108 and therefore block the rotation of the reservoir 6 (from preferably, the relief of the wall 12 comprises at least one fin 19 which extends in the axis of elongation of the container 122),
- in the case of the embodiment of FIG. 29, this anti-rotation system comprises the square or polygon or more generally non-cylindrical shape of the wall 108, and the square or polygon or more generally non-cylindrical shape of the wall 12.

The walls 108 and the reliefs 40 are preferably made by injection blow molding or extrusion blow molding. It is noted that the relief(s) 40 are made on a side wall 108 of the reservoir (relative to the axis of elongation of the reservoir).

The neck 87 and the bump 60 are more rigid than the side walls of the reservoir 6.

The flexible side walls of the reservoir 6 are typically around 0.15 to 0.4 mm in order to optimize its emptying. These thin walls pose a problem of rigidity when closing the reservoir. Contrary to the device of FIG. 23, this anti-rotation device avoids excessive twisting of the reservoir (typically less than 20 degrees).

The wall 91 and the plug 310 are two separate parts.

The rails 90 allow the plug 310 to slide with the bottom wall 91. These rails make it possible to drive the plug 310 in rotation when the wall 91 is turned, this sliding prevents the reservoir from lifting when screwing, the plug 310 can translate even if the bottom wall 91 comes into contact with the end of the side wall 12 before interlocking, in particular at the position of the interlocking or snap-fastening means 45. The plug is arranged to slide with the bottom wall 21 at least at the end of tightening.

The plug 310 is held in the part 91 (for example by clipping means with a clearance allowing axial sliding) and can slide in the part 91.

The plug is held with the wall 91 at the start of the pumping operations but can detach from the bottom 91 after a certain number of pumping operations.

The walls 108 of the reservoir 6 include a neck 85.

The neck 85 of the walls 108 of the reservoir 6 comprises threads arranged to cooperate with the plug 310.

The walls 108 are pierced opposite the neck 85 so as to form the opening 124 fixed to the bottom wall 21.

The plug 310 includes a hollow 311 so as to reduce the air in the reservoir 6 after closure.

The container 122 is closed by pressing on the part 91 after the screwing phase of the plug 310 with the neck 85.

A rib or fin 19 in the container 122 is arranged to block the walls 108 of the reservoir 6.

Referring to FIG. 25, initially the pocket wall 21 is assembled with the flexible wall 108. Then, optionally, the valve 4 is inserted, the at least assembly 21 and 108 is inserted into the container 122 until at the foot of the wall 22, the assembly being held by clamping the part 100 with a side part of the pocket wall 21.

Note that the elements 91 and/or 310, connected to the neck 85, is an intermediate part between the walls 12 and 108. The part 91 and/or 310 is located at one of the ends of the device 106. Apart from the intermediate part(s) 91, 310 connected to the neck 85, there is no other intermediate part connecting the walls 12 and 108 over at least one half (or even at least two thirds) of the elongation of the walls 12, 108 from neck 85 but outside neck 85.

It is further noted that this or these intermediate parts 91 and/or 310 are connected to the walls 12, 108 without gluing or welding or coextrusion, which is advantageous for the recycling of the device.

This or these intermediate parts 91 and/or 310 are therefore removable (by screwing, disengagement) with respect to the walls 12, 108.

The dispensing valve 5 is located inside the rigid part 70 carried by the movable wall 22 so that this rigid part 70 is arranged to translate by deformation of the movable wall 22.

The wall 22 is in continuity of material or overmolding or bi-injection with the part 70.

FIGS. 30 to 33 illustrate another embodiment of a device 107 for dispensing a fluid according to the invention. Only its differences with the device 106 will be described.

Referring to FIGS. 30 to 33, the neck 85 has no screw thread. Means 84 hold reservoir 6 during insertion of plug 310.

The means 84 are a border or a hollow at the position of the neck 85.

A tool 82 keeps the means 84 immobile (attached to the neck 85) during the insertion of the plug 310.

In the embodiment of FIGS. 32 and 33, the reservoir can be compressed, which allows a lower junction height between parts 12 and 91.

Conversely, in the embodiment of FIGS. 30 and 31, the junction height between the parts 12 and 91 must be higher because the reservoir is not compressible but the height of the part 91 must allow the use of tool 82.

FIGS. 34 and 35 illustrate another embodiment of a device 1060 for dispensing a fluid according to the invention. Only its differences with the device 106 will be described.

Referring to FIGS. 34 to 35, in this embodiment, the anti-rotation system of the reservoir 6 comprises:
- as shown in FIGS. 34 and 35
  - one or more reliefs 40 (typically respectively hollows or bumps) of the wall 108 of the reservoir 6
  - one or more reliefs (typically respectively bumps or hollows) on the wall 12 and/or 21 arranged to block the rotation of the reliefs of the wall 108 and therefore block the rotation of the reservoir 6, (preferably these reliefs are arranged on the wall 12 and include at least one fin 19 which extends along the elongation axis of the device), in a variant not shown, it comprises the form of square or polygonal or more generally non-cylindrical shape of the wall 108, and the form of square or polygonal or more generally non-cylindrical shape of the wall 12.

Unlike the previous embodiments for which the openings 87, 124 were distinct and located on either side of the reservoir 6 at two different locations (preferably opposite) of the reservoir 6, the device 1060 comprises orifices 87 and 124 coincident at the same position. The bottom wall 21 acts as a rigid wall 91 is provided with screwing means 310. These screwing means 310 may be arranged to slide in the bottom wall 21 in a sealed manner, this prevents the reservoir 6 from lifting when screwing the bottom wall 21 (more precisely the wall 44). Once the screwing operation is complete (the skirt of the plug allowing sealing), an axial force towards the reservoir at the foot of the deformable wall 22 allows the snap-fastening of the head of the device 1060 (more particularly of the dispensing head) thanks to the snap-fastening means 47.

FIGS. 36 and 37 illustrate a fourth embodiment of a device 4000 according to the invention for dispensing a fluid according to the invention. Only its differences with the device 102 of FIG. 4 will be described.

Referring to FIGS. 36 to 37, in this embodiment, the pocket 2 is delimited:

partly by the deformable wall 22, and partly by rigid walls of a dispensing head 400 fixed to the deformable wall 22 of the pocket 2 so that the dispensing head 400 is carried by the deformable wall 22 according to different possible positions relative to the reservoir 6 including at least:

a stable position (as shown in FIG. 36) in the absence of external force exerted on the head 400 and an inclined position at an angle of inclination relative to the stable position during the exercise of an external force on the head 400, so as to deform the deformable wall 22 and thus reduce the interior volume of the pocket 2 by relative to the stable position. This external force is typically applied to the head 400 by a user's face and/or cheek and/or lips and/or eye contour.

The head 400 comprises a dispensing surface 7 which borders or surrounds the outlet 24 preferably with a surface of at least 50 mm2 and even of at least 70 mm2. The dispensing part 23 comprises the dispensing surface 7 and is fitted or screwed to one end of the hollow member 406, the other end of the hollow member 406 being connected to the wall 22 by continuity of material or overmolding or bi-injection. This dispensing surface 7 is arranged for the massage and to exert the tilting force on the device.

The intake valve 4 is of the "duck-bill" type, which is particularly leaktight and allows the introduction of a needle through the valve 4. In the present description, the "duck-bill" may be single-slit or cross-slit valve.

The valve 4 can be made by overmolding on the bottom wall 21.

The bottom wall 21 forms a plug or insert for insertion into the pocket 2.

A degassing element 411 is arranged to allow gas to pass from pocket 2 to reservoir 6 when filling pocket 2 with a liquid and/or gel by means of a needle passing through the valve 4 (or filling valve) inserted from the side of the reservoir 6 whose plug 91 is open and the piston 86 absent during this filling.

This element 411 typically comprises a valve or a clearance or interstice between the wall 21 and the pocket 2 or a slot in the bottom wall 21. The pocket 2 comprises degassing means 411 at the position of the bottom wall 21, the degassing means 411 are on the side of reservoir 6, oriented towards reservoir 6. With reference to FIG. 37, in this embodiment, the valve 411 is wedged between the bottom wall 21 and the head 400 at the foot of the pocket 2 or between the bottom wall 21 and the wall 118. In a version not shown the valve 4 is wedged between the bottom wall 21 and the head 400 at the foot of the pocket 2 or between the bottom wall 21 and the wall 118.

The wall 22 is connected and integral with the wall 118.

The wall 22 is in continuity of material or overmolding or bi-injection with the wall 118 of the reservoir 6 (as illustrated in FIG. 36) and/or with the wall 12 surrounding the wall 118.

The wall 118 of the reservoir 6 delimits the internal volume of the reservoir 6 (delimiting at least 50% and even at least 75% of the internal volume of the reservoir 6). The wall 12 surrounding a wall 118 delimiting an internal volume of the reservoir 6 (delimiting at least 50% and even at least 75% of the internal volume of the reservoir 6).

The rigid wall of the head 400 has its inclination limited by a passage hole 412 and/or by the wall 21 according to several contact points 401 (with the hole 412), 404 (with the hole 412), 402 (with the hole 412), 403 (with wall 21). The head 400 optionally comprises, in addition to the part 23, a massage element 408 provided with two lateral massage faces with respect to the outlet of the product, the contact points are arranged to block the inclination during the massage.

The dispensing valve 5 is located inside the rigid part 400 carried by the movable wall 22 so that this rigid part 400 is arranged to tilt and/or translate by deformation of the movable wall 22.

The wall 22 is in continuity of material or overmolding or bi-injection with the part 400. It is noted that the axis of elongation of the head 400 is substantially the same as the axis of elongation of the reservoir 6.

FIGS. 38 and 39 illustrate a fifth embodiment of a device 5000 according to the invention for dispensing a fluid according to the invention. A lid 222 includes the wall 22 and the dispensing surface 7. The pocket 2 is formed by the lid 222 fitted with the bottom wall 21 extending in the same direction to form a "flat" pocket. Hereafter only its differences with the device 105 of FIG. 19 will be described.

In this embodiment, the valve 4 (more precisely one end) is trapped or wedged between the bottom wall 21 and the periphery or the foot of the wall 22, in particular between the bottom wall 21 and the lid 222.

A degassing element 411 is arranged to allow gas to pass from the pocket 2 to the reservoir 6 when filling the pocket 2 with a liquid and/or gel by means of a needle passing through valve 4 inserted from the side of the reservoir 6 whose plug 91 is open during this filling. As illustrated in FIG. 38, there may be several feed valves 4 and 4*b* used for filling associated with several degassing elements 411 and 411*b*.

A degassing channel 211 connects the element 411 to the feed orifice 41. This element 411 typically comprises a valve or a clearance or interstice between the wall 21 and the pocket 2 or even a slot in the bottom wall.

The degassing means 411, 211 are preferably oriented towards the reservoir 6. It is preferable that the valve used for filling the pocket 2 be arranged so that its seat in the bottom wall 21 is at a position down to the reservoir 6 therefore preferably like the valve 4*b*, however at the same time it is preferable for the feed valve 4 to be closest to the deformable wall 22. In another variant not shown, the dispensing valve 5 is further away of the reservoir 6 than the feed valve 4.

FIGS. 40 to 44 illustrate a sixth embodiment of a device 6000 according to the invention for dispensing a fluid according to the invention. Only its differences with the device 105 of FIG. 13 will be described.

Referring to FIGS. 40 to 44, in this embodiment, each means (typically in the form of a small wall) for internal guide 110 of the cap 70 is coupled to at least one rail 112 and/or one slide 113, the rails 112 and/or the slide 113 being thus arranged to guide the cap 70 on the means 110. FIG. 41 represents the small walls 110 surrounding the rails 112 of the cap 70. In a variant illustrated in FIG. 42 the small walls 110 cooperate with the slides 113 of the cap 70, this slide being made by the rails 112.

Each rail 112 and/or slide 113 is integral with the cap 70.

This rail/slide pair can be replaced or supplemented by another rod/cylinder pair arranged so as not to compress the product. Preferably at least one rail/slide pair is arranged to have a transverse support in all directions as shown in FIG. 42 comprising a dovetail-type slide.

The intake valve 4 is of the "duck-bill" type, which is particularly leaktight and allows the introduction of a needle through the valve 4.

The dispensing valve 5 comprises a stud 90 (or a rod 90) secured to a movable member of the valve 5.

The stud 90 is:

- partially (in particular not the end of the stud 90) included inside the deformable chamber 2 in the closed position of the dispensing valve 5, and/or
- entirely comprised inside the deformable chamber 2 in the open position of the dispensing valve 5.

The movable member of the valve 5 is entirely included inside the deformable chamber 2.

The dispensing valve 5 is:

- partially (in particular not the end of the stud 90) included inside the deformable chamber 2 in the closed position of the dispensing valve 5, and/or
- entirely included inside the deformable chamber 2 in the open position of the dispensing valve 5.

The stud 90 has an end that:

- in the closed state of the dispensing valve 5, closes the outlet 24 of the chamber 2 and
- in the open state of the dispensing valve 5, is moved away from the outlet 24 of the chamber 2 with respect to the closed state of the dispensing valve 5.

The movable member of the valve 5 is arranged to move under the effect of an overpressure of the fluid, in the interior volume of the chamber 2, greater than a pressure threshold (depending in particular on the total stiffness of return means 696) with respect to the state of equilibrium of chamber 2, so as to move the stud 90 away from the outlet 24 of chamber 2 so as to move the dispensing valve 5 from its closed state to its open state. Such an overpressure may be caused by a reduction in the internal volume of the chamber 2 filled with fluid to be dispensed, for example when a user presses on the pressing surface 25.

The movable member of the valve 5 is also arranged, in other cases, to keep the valve 5 closed or to move so as to move the stud 90 in the direction of the outlet 24 of the chamber 2 so as to move the dispensing valve 5 from its open state to its closed state.

The movable member of the valve 5 comprises at least one movable wall 691 of at least one gas pocket 92.

Each movable wall 691 is entirely included inside the deformable chamber 2.

The at least one gas pocket 92 contains a gas (typically air) preferably without it being able to leave this pocket 92. The at least one gas pocket 92 is arranged to isolate this gas (represented by small dots in the figures) with respect to the fluid contained in the deformable chamber 2.

The gas pocket 92 is completely surrounded (along a closed loop surrounding this pocket 92 at 360° around this pocket 92) by the fluid contained in the chamber 2.

The movable wall 691 of each gas pocket 92 has a contact surface 697 arranged to be fully in contact with the fluid contained in the chamber 2.

This contact surface 697 of the pocket 92 is defined as being the surface of the wall 691 (typically less than 1 mm thick or preferably less than 500 μm) which is on a main side arranged to be in contact with the fluid contained in chamber 2 and on another side opposite the main in contact with the gas of this pocket 92; the surface of the stud 90 is therefore not counted.

The sum of the areas of the contact surfaces 697 of the gas pocket(s) 92 is at least 50 mm2 and even greater than 70 mm2 and even greater than 90 mm2.

The device 6000 comprises a movable wall 691 of a gas pocket 92 aligned along an axis of elongation of the stud 90, this axis of elongation also being an axis of displacement of the stud 90 between the open position and the closed position of the valve 5.

The pressure inside each gas pocket 92 is typically:

- greater than one atmosphere and/or
- comprised in the interval between 0.9 and 1.5 atmosphere, preferably in the interval between 0.9 and 1.1 atmosphere, preferably equal to one atmosphere The dispensing valve 5 and the at least one gas pocket 92 are part of a module 693 which is inserted into the device 6000 from outside the device 6000. The module 693 is fitted into the rest of the device 6000, more exactly to the cap 70.

The module 693 is fitted into the rest of the device 6000 in a sealed manner.

The module 693 comprises a reservoir or tube 602 comprising two diameters:

- a part of smaller diameter to receive the stud 90,
- a part of larger diameter arranged to sink into the cap 70.

The module 693 comprises a lid 603 fixed (typically welded or fitted) to the reservoir or tube 602 and delimiting the interior of the pocket 92 with the wall 691.

The stud 90 and/or the movable member of the valve 5 are arranged to be in contact with the fluid contained in the deformable chamber 2.

The stud 90 is only arranged to be partially in contact with this fluid contained in the chamber 2: indeed, in the closed position of the valve 5, the end of the stud 90 is hidden from inside the chamber 2 by the outlet 24.

The movable member of the valve 5 is arranged only to be partially in contact with this fluid contained in the chamber 2: indeed, the movable wall 691 has an internal wall in contact with the gas of its pocket 92. The movable wall 691 is a succession of bellows forming a thread.

The device 6000 comprises at least one return means 696 arranged to exert on the stud 90 a return force so as to push the stud 90 in the direction of the outlet 24 of the chamber 2 so as to return the dispensing valve 5 from its open position to its closed position.

The at least one return means 696 comprises a movable wall 691 in the form of bellows.

The movable wall 691 is arranged to deform during its movement.

Each gas pocket 92 facilitates, for a user, the passage of the valve 5 from its closed state to its open state, while ensuring good closure of the valve 5 in its closed state.

The interior volume of the deformable chamber 2 is delimited at least partly by the cap 70.

The interior volume of the deformable chamber 2 is delimited at least partly by the bottom wall 21 forming a plug inserted into the pocket 2.

The dispensing seat is formed by all of the contact points, of the module 693, between the dispensing valve 5 and the module 693 when the valve 5 is in its closed state.

Note that there is no valve on the fluid circulation path between the inlet 41 (and/or valve 4) and the dispensing valve 5.

Note that there is no mechanical connection between the cap 70 and the at least one pocket 92, the only connection between the wall 25 and the at least one pocket 92 being via the fluid to be dispensed.

Referring to FIGS. 43 and 44 the outlet 24 is delimited by a perimeter comprising:

- a so-called flexible part 694 (for example in TPO)
- a so-called rigid part 695 (for example in Polypropylene) in a more rigid or hard material than the flexible part 694 (the two hardnesses compared being measured in the same unit from Shore A or Shore D), the rigid part 695 being closer from the outside of the deformable chamber 2 than the flexible part 694.

The part 694 is an independent flexible part mounted with a clamp between the internal walls of the reservoir or tube 602.

The stud 90 is more rigid or harder than the flexible part and than the rigid part (the hardnesses compared being measured in the same unit from Shore A or Shore D).

For the stud 90:

- the hardness of the stud is greater than 30 Shore D, or even greater than 70 Shore D, and/or
- the stud 90 has a flexural modulus greater than 200 Mpa, or even greater than 500 Mpa.

The stud 90 is flush (as shown) or protrudes less than 1 mm from outlet 24.

The end of the stud 90 is less than 1 mm from the outlet 24 (in front or behind the outlet 24).

In the closed position of the dispensing valve 5 illustrated in FIG. 44, the end of the stud 90 is in contact with the flexible part 694 along a first contact line, preferably along an edge 651 of the stud 90. This first contact line is a closed contact line going around the stud 90.

The edge 651, in section view of the stud 90, forms an angle less than 150° or even 90 degrees on the side of the stud 90.

In the closed position of the dispensing valve 5 illustrated in FIG. 44, the end of the stud 90 is also in contact with the rigid part 695 along a second contact line, preferably along an edge 652 of the stud 90. This second contact line is a closed contact line going around the stud 90.

The edge 652, in sectional view of the cap 70, forms an angle less than 150° on the side of the reservoir 602.

Note on the part 694 that the face just behind the contact line 651 is not in contact with a rigid part 695, there is a space 699 between parts 695 and 694, this allows additional flexibility to more easily obtain the two contact lines 651 and 652.

The stud 90 is arranged so that, when the valve 5 passes from its open position to its closed position, the first contact line is formed before the second contact line.

The maximum distance between the first contact line and the outside of the chamber 2 on the side of the outlet 24 is less than 6 mm or even 4 mm.

Referring to FIGS. 40, 41 and 42, note that the device 6000 includes a hole 65.

More exactly, this hole 65 is located on a side wall of the module 693.

The hole 65 allows air to escape from the module 693 when filling the reservoir 6 and/or the pocket 2 and/or the valve 5 with the product to be dispensed, for example by a filling pipe passing through the opening 87 then through the opening 41.

Preferably, opening 87, opening 41, and opening 65 are aligned in that order, i.e. a straight line can pass through these three openings in that order.

FIGS. 45 and 46 illustrate one embodiment of a device 7000 for dispensing fluid. Only its differences with the device 6000 of FIGS. 40 to 44 will be described.

In this embodiment, the at least one return means 696 comprises a convex and flexible movable wall 691 forming a dome.

Referring to FIGS. 45 to 46, in the embodiment 7000, the valve 5 and the outlet 24 are along or at the end of a stem 160.

This stem 160 emerges from the surface 22 and/or 25, and therefore connects the surface 22 and/or 25 located at one of the ends of the stem 160 to the valve 5 and the outlet 24 located at the other end of the stem 160.

This stem 160 includes a channel which connects the pocket 2 to the outlet 24.

The length 161 of the stem 160 between on one side the surface 25 and the outlet 24 is at least 25 mm, preferably at least 35 mm or even at least 45 mm.

The intake valve 4 is of the "duck bill" type ("duck valve"), which is particularly leaktight and allows the introduction of a needle through the valve 4.

The valve 4 can be made by overmolding on the bottom wall 21.

The feed valve 4 is provided with a protection means 204 arranged to protect the valve 4 during the insertion of a syringe through the feed orifice 41.

This means 204 takes the form of a cone or a ring which is inserted at the foot of the valve 4 (on the side of the reservoir 6). This cone or ring 204 is either a part of the bottom wall 21 or an added part distinct from the bottom wall 21 (but which is preferably fixed to the bottom wall 21).

The wall 691 is inserted into the wall of an applicator 208 where the outlet 24 emerges.

This applicator 208 makes it possible to spread the product to be dispensed, to massage a part of a body (for example a face and/or a cheek and/or lips and/or an eye contour) with the product to be dispensed, etc.

The wall of the applicator is composed of a superposition of two layers, preferably:

- on the side of the wall 691 and/or the valve 5, a layer of plastic material, for example PP or PE.
- on the outlet side, a metal layer, for example stainless steel, or a layer of foam, or even a layer of fabric.

The applicator 208 has a dispensing surface which borders or surrounds the outlet 24 preferably with an area of at least 50 mm2 and even at least 100 mm2.

FIGS. 47 and 48 illustrate one embodiment of a device 8000 for dispensing fluid. Only its differences with the device 7000 of FIGS. 45 to 46 will be described.

In this embodiment, the stem 160 emerges from the surface 22, and therefore connects the surface 22 located at one end of the stem 160 to the valve 5 and the outlet 24 located at the other end of the stem 160. The length 161 of the stem 160 between on one side the surface 22 and the outlet 24 is at least 25 mm, preferably at least 35 mm or even at least 45 mm.

Due to the flexibility or the ability of the wall 22 to deform, the stem 160 is arranged to tilt.

In this embodiment, the pocket 2 is delimited:

partly by the deformable wall 22, and partly by internal rigid walls of the stem 160 fixed on the deformable wall 22 of the pocket 2 so that the stem 160 (which therefore forms a dispensing head 400 as described with reference to FIGS. 36 and 37) is carried by the deformable wall 22 according to different possible positions relative to the reservoir 6 including at least:

a stable position (as illustrated in FIG. 47) in the absence of external force exerted on the stem 160 and an inclined position at an angle of inclination relative to the stable position during the exercise of an external force on the stem 160, so as to deform the deformable wall 22 and thus reduce the interior volume of the pocket 2 by relative to the stable position. This external force is typically applied to the stem 160 by a user's face and/or a cheek and/or lips and/or an eye contour.

The means 204 take the form of a cone or a ring which is inserted at the foot of the valve 4 (on the side of the reservoir 6). This cone or ring 204 is either a part of the bottom wall 21 (as illustrated in FIG. 48) or an added part distinct from the bottom wall 21 (but which is preferably fixed to the bottom wall 21).

The valve 4 is wedged between the means 204 and/or the bottom wall 21 on one side and a rigid extension integral with the wall 22 on the other side.

The wall 691 and/or the valve is fixed between the massage element 408 and the outlet 24 and/or the applicator 208.

FIGS. 49 to 52 illustrate one embodiment of a device 9000 for dispensing fluid. Only its differences with the device 4000 of FIGS. 36 to 37 will be described.

The wall 12 and the wall 21 form a container 122, arranged to contain the reservoir 6 and the pocket 2.

The container includes a joint 175 between an upper part 170 of the container 122 and a lower part 180 of the container 122.

This joint 175 is:

either a joint by a flexible intermediate wall of the container 122 between the parts 170 and 180, as illustrated in FIG. 49, or a rigid joint by interlocking the two parts 170 and 180.

This joint is arranged to allow the inclination of the head 400.

The head 400 passes through a hole 173 made in the container 122, so that the head 400 comprises at least one part 152 outside the container 122 and at least one part 202, 5, 22 inside the container 122.

The part 23 includes fixing means allowing an fixation of the head 400 to the container 122, for example:

as illustrated in FIG. 50 or 51, a part 171 (also called fixing plate 171) of the container 122 is tightened between two parts of the assembled head 400, the head 400 comprises, as these two parts, a first part 151 (comprising for example a thread 201 and a stop 202) located at least partly inside the container 122 and a second part 152 (for example a rider or a ring) located at least partly outside the container 122 and at the end of the head 400 and fixed to the first part 151. These two parts 151 and 152 may for example hold between them a dispensing ball 150 (FIG. 50) free to rotate and onto which the outlet 24 opens or a dispensing foam or pad 150 (FIG. 51) onto to which the outlet 24 opens.

As illustrated in FIG. 52, by holding a part 171 (also called fixing plate 171) of the container 122 by at least a part of the head 400, the head 400 comprises, as the part, a first part 151 (comprising for example a rider holding the part 171 by jaw) of the head 400 and at least partly located partly inside the container 122 (and partly outside the container 122) and a second part 152 (comprising for example a fork fitting between the plate 171 and the part 151) of the head 400 and located at least partly outside the container 122 and at the end of the head 400. The part 151 and/or 152 may hold a dispensing roller or applicator or ball 150 free to rotate and onto which the outlet 24 opens.

The reservoir 6 and the head 400 therefore form a cartridge 200 which can be replaced within the device according to the invention 9000 by unlocking the fixing means 151, 152 and opening a cover 176 fixed to the lower part 180.

The container 122 is arranged to allow a translational movement (in a cavity 181 formed in the reference 176 and/or 180) between the reservoir 6 and the container 122 when the head 400 is tilted.

The device 9000 comprises an adjustment means 172 arranged to modify the stiffness of the joint 175. This adjustment means 172 typically comprises a tongue (metal) sliding between the parts 170 and 180 so as to have several possible positions more or less distributed on the parts 170 and 180.

FIG. 53 illustrates one embodiment of a device 10000 for dispensing fluid. Only its differences with the device 9000 of FIGS. 49 to 52 will be described.

This device 10000 differs from the device 9000 in that the head 400 and the container 122 are not tiltable.

The part 175 is then no longer a joint but a pressing surface arranged to deform the wall 22 of the head 400.

The device 10000 is shaped like a pen.

FIGS. 54 and 55 illustrate one embodiment of a device 11000 for dispensing fluid. Only its differences with the device 105 of FIG. 13 will be described.

In this embodiment, the bottom wall 21 (or forming a plug or insert 123 pressed into the cap 70) has a convex domed shape on the side of the interior volume of the pocket 2.

The cap 70 is formed in one part.

Typically, the cap 70:

is formed of only one material, without discontinuity of this material, or, is made of two materials or of at least two materials and is a part resulting from a bi-injection molding or from an overmolding of material(s) on another material.

The cap 70 has a concave curved shape on the side of the interior volume of the pocket 2 and which matches the convex shape of the bottom wall 21 while leaving an intermediate space 2*a* between these concave and convex shapes so that this intermediate space forms less partly the interior volume of pocket 2.

The majority 2*b* (at least 70%, preferably at least 80%) of the internal volume of the pocket 2 is located in at least one cavity sinking towards the inside of the bottom wall 21, and is distinct from the part 2*a*.

The total interior volume of the pocket is made up of the sum of parts 2*a* and 2*b*.

The cap 70 is fitted onto the bottom wall 21, without welding. This fitting comprises a snap 161. The tightness of this fitting is ensured by at least one sealing contact line 260 (or sealing crown) between the cap 70 and the bottom wall 21.

There may be several sealing contact lines 260 (or sealing crowns), possibly grouped together in the form of a sealing band.

The edge of the interior volume of pocket 2 is remote and offset with respect to these sealing contact lines 260.

In the bottom wall 21 is formed a hollow 2*b* delimiting at least part of the interior volume of the pocket. The sealing contact lines 260 are remote from this hollow 2*b* or even generally from the interior volume of the pocket 2, sometimes by more than 10 millimeters.

The periphery of the hollow 2*b* is smaller, at least 30% smaller or even preferably at least 50% smaller, and even 70% smaller, than the periphery of each contact line 260.

The sealing lines 260 surround but do not border the interior volume of the pocket 2.

The ring 109, in addition to compressing the flexible wall 108 in leaktight manner, has the additional function of holding the feed valve 4 more precisely by compressing the foot of the valve 4 on a skirt of the bottom wall. The ring 109 is placed between two cylinders of the bottom wall and is arranged to clip onto the outer walls of the smaller cylinder.

The feed valve 4 is provided with a protection means 204 arranged to protect the valve 4 during the insertion of a syringe through the feed orifice 41. This means 204 advantageously, formed on the ring 109, takes the form of a cone or a ring which is inserted at the foot of the valve 4 (on the side of the reservoir 6) and/or comprises an orifice 41 smaller than the orifice 137 of the foot of the valve 4 (preferably a diameter at least 15% smaller).

The valve 4 is held between ring 109 and bottom wall 21.

Above the contact lines 260, a part of the reservoir penetrates inside the bottom wall 21 which is convex on the side of the pocket 2 but concave on the side of the reservoir 6.

The volume of the pocket 2 is at least 2, 3 or 4 times smaller than the internal volume of the cap 70 delimited by a (middle) plane passing along the lines 260.

The cap 70 and the bottom wall 21 are arranged so that the wall 21 is mounted in the cap 70 according to an insertion assembly in the cap 70 from the side of the lines 260 and in an insertion direction 125.

The pressing surface 25 and the outlet 24 are not lateral i.e. are both located on top of the cap 70 so that:

- the product to be dispensed exits through the outlet 24 at least with one component (20% or more of the outflow direction vector) in the insertion direction 125 or else the angle between a tangent to the surface surrounding the outlet 24 and the direction 125 is between 20° (preferably 45°) and 90°, and
- the pressing surface 25 is arranged to be moved by a force having at least one component (20% or more of the force vector) opposite to the insertion direction 125, or else the angle between a tangent to the surface 25 and the direction 125 is between 20° (preferably 45°) and 90°.

The pressing surface 25 comprises structures 133 making it possible to visualize this surface 25.

Thus, the device 11000 for dispensing a fluid comprises:

- the outlet 24,
- the pocket 2 having an interior volume to contain a fluid, the interior volume of the pocket being delimited:
  - partly by the cap 70 comprising the movable wall 22 arranged to tilt and/or translate and/or deform by pressing on the pressing surface 25 so as to modify the interior volume of the pocket,
  - partly by the bottom wall 21 inserted into the cap 70
- the dispensing valve 5 which, in an open state, allows fluid to pass from the pocket 2 to the outlet, and, in a closed state, does not allow it,
- the reservoir 6 provided with the wall 118, 108 arranged to contain the fluid,
- the feed valve 4 which, in an open state, allows the passage of the fluid contained in the reservoir to the pocket, and which, in a closed state, does not allow it.

In addition, the bottom wall 21 comprises three distinct parts:

- a central part 141 partly delimiting the interior volume of the pocket and spaced from the cap 70 so that this space defines at least partly the interior volume of the pocket 2 between the cap 70 and this central part of the bottom wall 21
- an intermediate part 142, surrounding the central part of the bottom wall 21, and arranged to be pressed against the cap 70, this pressing however allowing a clearance between the cap 70 and the bottom wall 21 with an intermediate space between the cap 70 and the bottom wall 21 less than two millimeters on average for this space, preferably less than one millimeter on average for this space, and
- a peripheral part 143, surrounding the intermediate part of the bottom wall 21, and arranged to form with the cap 70 at least one sealing line 260 in a closed loop between the cap 70 and the bottom wall 21 the intermediate part having an area greater than or equal to 400 square millimeters (preferably greater than or equal to 800 square millimeters) and/or greater than (preferably at least twice greater than) the area of the central part 141 of the bottom wall 21.

The line 260 forms a perimeter loop of at least 200 mm, preferably more than 250 mm or even 300 mm.

FIGS. 56 and 57 illustrate one embodiment of a device 12000 for dispensing fluid. Only its differences with the device 11000 of FIGS. 54 and 55 will be described.

The pressing surface 25 and the outlet 24 are frontal, i.e. both located on the top of the cap 70 so that:

- the product to be dispensed exits, through the outlet 24, at least with a majority component (50% or more of the outflow direction vector) in the insertion direction 125, or else the angle between a tangent to the surface surrounding the outlet 24 and the direction 125 is between 20° (preferably 45°) and 90°, and
- the pressing surface 25 is arranged to be moved by a force having at least one component predominantly (50% or more of the force vector) opposite to the insertion direction 125, or else the angle between a tangent to the surface 25 and the direction 125 is between 20° (preferably 45°) and 90°.

The part 2*b* of the interior volume of pocket 2 further comprises an additional volume (typically in the shape of a crescent moon and/or which surrounds valve 4). This additional volume makes it possible to increase the internal volume of the pocket 2 and therefore to reduce the pressure in the pocket 2 when pressing on the surface 25.

The curved or dome-shaped wall 22 or 25 (or spherical cap) may be replaced by a wall 22*b* having a point-shaped apex and/or being conical in shape (basically circular, oval, elliptical, etc.) or pyramidal (possibly having more than 3 sides) and preferably slightly higher than a spherical cap which would rest on walls at the feet of this wall 22*b*, or spherical cap which would rest more towards the top at a height of 25% of the height of this wall 22*b* (which would rest on average walls if the shape is not spherical). The wall 22*b*, higher by at least 0.3 mm than the wall 22, deforms more gradually. The ratio, between the perimeter of the foot of the pocket 22*b* and the height of the pocket 22*b*, has a ratio of less than 20 and even less than 19.

The line 260 forms a perimeter loop of at least 200 mm, preferably more than 250 mm or even 300 mm.

FIGS. 58 and 59 illustrate one embodiment of a device 13000 for dispensing fluid. Only its differences with the device 101 of FIG. 1 will be described.

The wall 22 is not in the reservoir 6, the outlet 24 is lateral with respect to the axis of elongation of the device and/or the pressing surface, the device comprises a plug 241 for filling the reservoir 6 fixed or screwed onto the deformable wall 22. The device is provided with a rigid pressing wall 128 (coming from molding with the plug 241) to press the deformable wall 22. This pressing wall 128 is integral with the plug 241 and comprises a width at least equal to one third of the width of the deformable wall 22 (measured along a measurement axis parallel or substantially parallel to the bottom wall 21).

The wall 22 is provided with a skirt 155 having a height at minimum at least as high, in the same direction of measurement, as the height at the entrance to the cavity 8 on the side of the pocket 2 (i.e. a minimum 1 mm or 2 mm).

This skirt 155 allows the insertion of the valve 5 into the cavity 8 from inside the pocket 2 perpendicular or substantially perpendicular to the direction of measurement of the height of this skirt 155.

Thanks to this skirt 155, the bottom wall 21 takes the form of a flat surface 156 and facilitates the welding of the reservoir 6 or 14 or 108 to the bottom wall 21.

FIGS. 60-62 illustrate one embodiment of a device 14000 for dispensing fluid. Only its differences with the device 11000 of FIGS. 54 and 55 will be described.

In this embodiment, the pocket 2 is in lateral, i.e.:

the angle between a tangent to the surface 25 and the direction 125 is between 0° and 45° (preferably 20°).

The pocket 2 goes around the reservoir 6 and the insert 123 at 360° around the direction 125.

There are (as for the device 101) one or two filling holes 87, 87*b* each opening onto the inside of the reservoir 6.

Preferably, these filling holes are two in number and are located on either side of the outlet 24.

These filling holes pass through the cap 70 and the insert 123 which together form an end piece 89 (equivalent to the end piece 89 of the device 101).

A single plug 310 is arranged to simultaneously:

block the filling hole(s) 87, 87*b*, and plug and/or protect the outlet 24.

At least partially form an applicator 208 and/or a dispensing surface 207. The plug 310 includes a plug 77 which is removable by means of a hinge.

The plug 310 comprises 2 cylindrical pins 313 which fit together with a slight tightening in the end piece 89 at the position of the filling holes 87 and 87*b* in order to adjust and precisely maintain the plug 310 with the end piece 89 during of assembly. This is the preponderant fixing means in the assembly of the plug 310 on the end piece 89, complementary independent clips make it possible to maintain the fitting assembled. The diameter of the pins 313 is preferably more than 3 mm and even more than 4 mm. Preferably the two holes 87, 87*b* are open, however in a version not shown one of the holes 87 or 87*b* is not open, this non-open hole is called adjustment or positioning hole.

The plug 310 comprises a cavity 312 arranged to receive the end of the dispensing part 23 provided with the outlet 24. The dispensing part 23 passes through the plug 310 or not.

The device 14000 comprises a dispensing surface 207 on which the outlet 24 opens.

The dispensing surface 207 has an area of at least 80 mm2 even at least 160 mm2.

The dispensing surface 207 can be formed by the plug 310 and the end piece 89.

The plug 310 includes an applicator 208 with a domed shape 308 or with a spout shape 309 at least partly formed by 310.

The insert 123 contains or at least partly contains a deformable wall 108 which delimits at least partly the interior volume of the reservoir.

The insert contains at least 20% of the internal volume of the pocket 6. The insert contains at least 3 ml or 10 ml, and even at least 20 ml of product to be dispensed depending on the nature of the device. On the part that contains the insert at least 80% and even 90% of the reservoir 6 is deformable.

The reservoir (its internal volume) does not exceed the feed valve 4 towards the outlet, there is not a part of the reservoir between the feed valve and the dispensing valve along the axis 125.

The wall 108 is blown (typically either injected blown, or extruded blown), so as to form a reservoir 6 whose neck is fixed on the insert 123.

An indexing means 236 (typically comprising a finger) of the cap 70 relative to the insert 123 is arranged to be housed in a hollow 234 of the insert 123.

Referring to FIG. 62, at least one flow channel 238 is arranged to allow good fluid flow for good filling of pocket 2, locally increases the space between insert 123 and cap 70.

The line 260 forms a perimeter loop of at least 200 mm, preferably more than 250 mm or even 300 mm.

The container 122 has clipping means 235 on the insert 123 or on the cap 70 and which are arranged to allow dismantling of the cartridge or refill 200.

The wall 108 is deformable (including inside the insert 123) and is arranged to fold up or shrink towards the inside of the insert 123 when the reservoir 6 empties of the fluid to be dispensed. At least 10% or 20% or even 30% of the reservoir's maximum volume is within insert 123. There is at least one cross-section perpendicular to the direction 125 and passing through the pocket 2 and through the reservoir 6 (in particular by a part of the wall 108 folding back or being reduced towards the inside of the insert 123 when the reservoir 6 empties of the fluid to be dispensed), i.e. the pocket 2 and the reservoir 6 are at least partly at the same position, at least 20% or 30% or even 40% of the length of the pocket depending on the direction 125 is at the level of the reservoir 6. At least 6 mm or 15 mm or even 25 mm of the length of the pocket depending on the direction 125 is the same level of the reservoir 6.

There is at least one cross section perpendicular to the direction 125 and passing through the deformable wall 25 and through the reservoir 6, i.e. the deformable wall 25 and the reservoir 6 are at least partly at the same level. At least 15% or 25% or even 35% of the length of the deformable wall 25 along the direction 125 is at the level of the reservoir 6. At least 4 mm or 8 mm or even 15 mm of the length of the deformable wall 25 along the direction 125 is the level of the reservoir 6.

Note that the junction and/or the seal between the cap 70 and the insert 123 can be inside the cap 70 (as illustrated in FIG. 60) and/or outside the cap 70.

The pocket 2 is delimited at least partly between the insert 123 and the cap 70.

The pocket 2 surrounds the reservoir 6 at 360° around the direction 125. The pocket 2:

- is distributed over at least 20% or even 30% of the height of the device 14000 along the direction 125, and/or
- is at least 25 mm or 30 mm or even 40 mm in height along the direction 125.

FIG. 63 illustrates one embodiment of a device 15000 for dispensing fluid. Only its differences with the device 14000 of FIGS. 60 to 62 will be described.

Compared to the previous embodiment, in the device 15000 the flexible wall 108 is fixed (by clamping or other) between the cap 70 and the insert 123.

Thus, the internal volume of the reservoir is delimited:

- inside the insert 123, by a rigid wall of the reservoir, formed at least partly by the insert 123 itself. There is at least one transverse section perpendicular to the direction 125 and passing through the pocket 2 and through the reservoir 6 (and through the insert 123;
- and also through the cap 70), i.e. the pocket 2 and the reservoir 6 are at least partly at the same level.

However, when the reservoir 6 is filled to its maximum with the fluid to be dispensed, there is not at least one transverse section perpendicular to the direction 125 passing through the pocket 2 and through the flexible wall 108 folding or reducing towards the inside the insert 123 when the reservoir 6 empties of the fluid to be dispensed, there is at least one transverse section perpendicular to the direction 125 (closer to the valve 4 than the section previously described) and passing through the pocket 2 and through the reservoir 6 (in particular through a rigid part 240 of the wall of the reservoir and not not folding or reducing towards the inside of the insert 123 when the reservoir 6 empties of the fluid to be dispensed).

- On the other hand, when the reservoir 6 is emptied of a certain quantity of the fluid to be dispensed and the flexible wall 108 has folded up or is reduced towards the inside of the insert 123, there is at least one transverse section perpendicular to the direction 125 passing through the pocket 2 and through the flexible wall 108 as illustrated in FIG. 63.

Outside the insert 123, by the flexible wall 108.

The volume of reservoir 6 outside insert 123 is at least 40% larger than the volume of reservoir 6 inside insert 123.

Such an assembly is made possible thanks to the holes 87 making it possible to pull the insert 123 towards the cap 70.

FIGS. 64-66 illustrate one embodiment of a device 16000 for dispensing fluid. Only its differences with the device 14000 of FIGS. 60 to 62 will be described.

In this embodiment 16000, the insert 123 extends outside of the cap 70.

The interior volume of the reservoir 6 is no longer delimited (even partly) by a flexible deformable wall 108, but is delimited by the insert 123 and by a movable piston 86 moving in the insert 123 according to the quantity of fluid to be dispense contained in the reservoir 6.

This embodiment 16000 includes a vent 321, which makes it possible to circulate the air between the exterior of the device 16000 and the part (of variable volume depending on the position of the piston 86) located in the insert 123 but at the exterior of the reservoir 6.

The vent 321 passes through the pocket 2.

The wall 22 (preferably flexible) is wedged between the cap 70 and the insert 123.

There is at least one transverse section perpendicular to the direction 125 and passing through the pocket 2 and through the reservoir 6 (and through the insert 123 but not through the cap 70), i.e. the pocket 2 and the reservoir 6 are at least partly at the same level.

The device 16000 comprises means 233 for sealing between the insert 123 and the wall 22 at the position of the vent 321.

The pocket 2 is delimited at least partly between the insert 123 and the wall 22 held between the cap 70 and the insert 123.

The pocket 2 surrounds the reservoir 6 at 360° around the direction 125.

The pocket 2:

- is distributed over at least 30% (preferably at least 50%) of the height of the device 16000 along the direction 125, and/or
- is at least 30 mm or 40 mm or even 50 mm in height along the direction 125.

The insert 123 includes the bottom wall 21.

The interior volume of the pocket 2 is at least twice smaller (preferably at least four times smaller) than the interior volume of the reservoir 6.

Holes 237 through the insert 123 connect two parts of the pocket 2: the part located between the insert 123 and the cap 70 and the part located between the insert 123 and the deformable flexible wall 22.

The insert 123 therefore has several functions:

- maintenance of the wall 22 between the insert 123 and the cap 70
- carry the holes 237
- at least partially delimit the interior volume of the pocket 2
- at least partially delimit the interior volume of the reservoir 6
- guide the movement of the piston 86
- maintenance of the sealing means 233
- carry one end of the vent 321.

All these functions are therefore provided by one part 123 of the end piece 89. The end piece 89 (more precisely the insert 123) forms the side walls of the reservoir 6.

In this embodiment 16000, there are:

- holes 87, 87*b* for filling the reservoir 6
- holes 187, 187*b* for filling the pocket 2.

The reservoir 6 is between the valve 4 and the vent 321.

There is at least one transverse section perpendicular to the direction 125 and passing through the pocket 2 and through the reservoir 6 (and through the insert 123 but not through the cap 70), i.e. the pocket 2 and the reservoir 6 are at least partly at the same level.

The internal volume of pocket 2 is delimited at least partly between the insert 123 and the wall 22 held between the cap 70 and the insert 123.

The wall 22 has a shape of outer pocket.

The wall 22 forms at the same time both side outer walls and a bottom outer wall of the device on the side of the wall 91.

The cap 70 is fixed to the open end of the pocket 2 formed by the wall 22.

The reservoir 6 is located at least partly inside the pocket 2.

In a variant not shown in FIG. 64, the reservoir 6 is delimited at least partly by a flexible wall 108 as in FIG. 55 or 56, and the valve 4 and the vent 321 are on the same side of the reservoir 6. The vent 321 passes through the insert 123 and the cap 70. The wall 22 (preferably flexible) is wedged between the cap 70 and the insert 123.

FIG. 67*a* illustrates one embodiment of a device 17000 for dispensing fluid. Only its differences with the device 16000 of FIGS. 64 to 66 will be described.

In this embodiment, the insert 123 extends outside of the cap 70.

As for the embodiment of FIG. 56, the interior volume of the reservoir 6 is delimited by a flexible deformable wall 108 closed by a bottom wall 91 immobilized by the insert 123.

This flexible wall 108 is inside the insert 123.

The device 17000 includes a refill connector 225 arranged to allow fluid to be recharged inside the device 17000 (more exactly inside the reservoir 6) without this fluid passing through the pocket 2 or the dispensing valve 5 or the feed valve 4.

The connector 225 includes a refill valve that:

at rest is closed, and is arranged to open when the means 225 is connected to a source of fluid to be dispensed.

The connector 225 is removable.

The reservoir 6 more precisely the wall 91 emerges outwards so as to form a neck having a slope 224 avoiding trapping air in the reservoir 6.

In addition, sealing means 218 of the device, more precisely in the connector 225 or at the position of the neck 85, make it possible to prevent air from entering the reservoir 6 when recharging the reservoir 6.

The valve of connector 225 opens into reservoir 6.

The connector 225 passes through the wall 91.

The insert 123 is wedged between the wall 22 and the wall 91.

There is at least one transverse section perpendicular to the direction 125 and passing through the pocket 2 and through the reservoir 6 (and through the insert 123 and through the wall 108), i.e. the pocket 2 and the reservoir 6 are at least partly at the same level.

The internal volume of the pocket 2 is delimited at least partly between the insert 123 and the wall 22.

The pocket 2 (and wall 22) surrounds the reservoir 6 at 360° around the direction 125.

The reservoir 6 is located at least partly inside the pocket 2.

The connector 225 is at the position of the opening 87 and is blocked by the plug 310. The connector 225 can make it possible to fill both the pocket 2 and the reservoir 6.

A cover or handle 226 covers the neck 85 of the connector 225 and the wall 91 so as to hide them from the outside of the device.

In another variant not illustrated on the connector 225 and/or the valve 4 comprises a valve of the "duckbill" type ("duck valve" in English), to allow the introduction of a filling pipe 46 allowing to fill the reservoir 6 and/or the pocket 2 with fluid to be dispensed.

The filling pipe may include two holes, including:

a first hole 68 (preferably at the end of the filling pipe introduced into the device) which opens into the pocket 2, and a second hole 67 (preferably located laterally along the filling pipe) which opens into the reservoir 6.

It is noted that in this variant the refill is not done under pressure.

A spring element 212 is interposed between the insert 123 (more exactly the bottom wall 21 of the insert 123) and the wall 22. This element 212 may be present in each of the variants of FIG. 67*a*, 67*b* or 67*c* or even 64.

The wall 22 is fixed on the insert 123, more exactly in a groove of the insert 123. The device comprises a clipping means 213 for clipping the pocket 22 on the insert 123, more precisely a ring 213 is clipped in a groove of the insert 123.

This ring 213 further comprises a fixing means 214 for fixing the applicator 208 such as a border 223 or a border section surrounding the device laterally so as to hold the edge of the applicator 208. The applicator is removable and is provided on its periphery with a less elastic edge element coming to cling to the edge 223.

The wall 22 is flexible and is injected in thermoplastic elastomer, for example in TPO.

The dispensing valve 5 is inserted into the wall 22. The valve 5 is more flexible than the wall 22 at the position of an extra thickness of the wall 22 in which the valve 5 is housed.

In another variant illustrated in FIG. 67*c*, the cap 70 comprises several walls 22, each wall 22 being equipped with its valve 5 leading to a pocket 2 common to all the valves 5. This makes it possible to distribute the product coming from the reservoir over a greater surface. Optionally, all these walls 22 are covered by the same porous surface 208. Volume parts 217, typically made of foam, are arranged to erase differences in height level between the parts of the cap 70 with or without wall 22.

A method of filling the device 17000, but which would also be applicable to any embodiment or variant of device according to the invention equipped with the orifice 87, is as follows:

1) the reservoir 6 and/or pocket 2 are filled through the orifice 87 even though this orifice is not equipped with connector 225, as illustrated in FIG. 67*b*, or just equipped with a "duck valve" type valve; the air 210 can escape.

Typically, one may use a filling pipe 46 comprising two holes or at least two holes, including:

a first hole 68 (preferably at the end of the filling pipe introduced into the device) which opens into the pocket 2, and a second hole 67 (preferably located laterally along the filling pipe) which opens into the reservoir 6;

Then 2) the orifice 87 is equipped with the connector 225 if the device does not comprise a "duck valve" used for filling in step 1.

3) The reservoir 6 and/or the pocket 2 are at least partially emptied using the device, then 4) the reservoir 6 and/or the pocket 2 are filled through the orifice 87 while this orifice is equipped with the connector 225 and/or the sealing means 218, as shown in FIGS. 67*a* and 67*d*, In a variant, illustrated in FIG. 67*d*, of FIGS. 67*a*, 67*b* and 67*c*, the device according to the invention does not include connector 225.

The filling is done through a refill valve 219 of the "duck valve" type which leads to reservoir 6.

Two means or filling heads 220 and 221 make it possible to fill respectively:

the reservoir 6 and the pocket 2 for the long tool 220. During the first filling of the reservoir 6 and the pocket 2 by the tool 220, the air 210 coming from the reservoir 6 can escape through the valve 219;

the reservoir 6 for the tool 221 shorter than the long 220. The tool 221 or a neck 75 leading to the valve 219 comprises a seal 218 placed between the neck 75 and the tool 221, so that during the second filling of the reservoir 6 by the tool 221, the air 210 cannot pass through valve 219 and in particular cannot enter reservoir 6 through the valve 219;

A description will now be given, with reference to FIGS. 69*a* to 69*c*, of various embodiments of the device according to the invention.

All these embodiments of these FIGS. 69*a* to 70*f* have in common to have continuity of material or overmolding or bi-injection between:

- the cap 70 (if present, otherwise generally the pressing wall 25)
- the deformable wall 22,
- a movable wall 420, arranged to translate, inside a conduit or cylinder 430 or outside a piston 430, and whose translation movement is guided by a rail 112 which is coupled to a slide 113, the rails 112 and/or a slide 113 thus being arranged to guide the cap 70 (or the pressing surface 25).

The rail 112 or the slide 113 is secured to the cap 70 (more precisely formed in the cap 70), while respectively the slide 113 or the rail 112 is secured to the bottom wall 21 or to the part 430, (or part fixed delimiting at least partly the interior volume of the pocket). This rail/slide couple may be replaced or supplemented by another rod/cylinder couple arranged so as not to compress the fluid does not delimit the pocket 2.

Preferably at least one rail/slide pair is arranged to have transverse support (perpendicular to the pressing direction 140) in all directions.

The outlet 24 is equipped with a nozzle 59 arranged to generate a spray.

A description will now be given, with reference to FIG. 69*a*, of an embodiment of a device according to the invention. This embodiment will only be described for its differences from the embodiment of FIG. 4.

In this embodiment, the deformable wall 22 does not at least partially delimit the interior volume of the pocket 2. The deformable wall 22 is in contact with an air pocket 34 (an outer pocket 34 comprising air).

In this embodiment, the movable wall 420 delimits at least partly (with the conduit 430) the interior volume of the pocket 2.

The cap 70 further comprises a dispensing spout 30 carrying the outlet 24. This dispensing spout 30 extends laterally beyond the width of the side walls 118 delimiting or containing the reservoir 6. The dispensing spout comprises the dispensing cavity 8 which extends to the side walls 118 or beyond.

The movable part 420 sunk to the maximum in or around the part 430 leaves a part 36 of the part 430 in which the part 420 has not sunk by a length of at least 20 mm or even at least 30 mm.

The pocket 2 leaves a portion 36 with a length of at least 20 mm or even 30 mm between the feed orifice 41 and the bottom wall 21.

The spout 30 is equipped with a nozzle 59 arranged to generate a spray.

This embodiment further comprises a rib 37 coming from the bottom wall 21 arranged to prevent the pocket 108 from sinking into the device around the pocket 2, in particular around its part 36.

The whole 108, 112, 6, 87, 2, 70 122 is placed in a case 170, 180 formed by an assembly of an upper part 170 of the case and a lower part 180 of the case.

The spout emerges from the case, preferably:

- either by a hole formed in the upper part 170
- or by a hole formed between the upper part 170 and the lower part 180.

The spout 30 is part of the cap 70 in the form of a single part of the same material (without material discontinuity).

A cartridge 200 is formed by assembling the reservoir 6 and the chamber 2 (and also preferably the cap 70 and/or the valve 4 and/or the valve 5).

When the parts 170 and 180 are assembled, a skirt 145 of the upper part blocks the cartridge or refill 200 in order to prevent this cartridge 200 from moving within this embodiment of the device according to the invention, even when pressing on the cap 70.

Referring to FIGS. 69*b* and 69*c*, the upper part 170 comprises:

- a part 178 forming a button arranged to press on the cap 70
- a part 177 forming a mobile ring surrounding the button 178
- an intermediate part 179, located between parts 177 and 178, movable, comprising clipping means arranged to clip onto the lower part 180, and arranged to unclip from the lower part when pulling on the part 177.

A description will now be given, with reference to FIGS. 70*a* to 70*h*, of an embodiment of device 19000 according to the invention. This embodiment will only be described unless otherwise stated for its differences with respect to the embodiment of FIG. 4.

In this embodiment, the deformable wall 22 does not at least partially delimit the interior volume of the pocket 2.

The deformable wall 22 may include resilient tongues extending over bottom wall 21 outside of piston 420.

In this embodiment, the movable wall 420 delimits at least partly (with the conduit 430) the interior volume of the pocket 2. The outlet 24 is equipped with a nozzle 59 arranged to generate a spray. The device 19000 does not comprise a cap 70. The bottom part 289 comprises the bottom wall 21. The bottom part 289 comprises a fixing means 89 to the reservoir or the end piece 89.

The deformable wall 22 is in contact with an outer pocket 34, comprising fluid surrounding the pocket 2, connecting the pocket 2 to the reservoir via an orifice 163, and being arranged to receive fluid coming from the reservoir. The volume of the pocket 34 is larger than the volume of the pocket 2, preferably at least twice as large.

A button 250 comprising the deformable wall 22 delimits, with the bottom part 289 or 245, an elastic pocket 255 comprising the pocket 2 and the pocket 34, the pocket 34 in this device is arranged to form a fluid passage from the reservoir 6 to the pocket 2.

The elastic pocket 255 is delimited by the bottom wall 249 of the bottom part 289 or 245 and the button 250. The button 250 provided with the deformable wall 22 comprises a continuous or non-continuous curve which may be interpolated by two or three discontinuous slopes, including:

- a first slope 50 or a central part 50 preferably non-deformable or slightly deformable with respect to the wall 22, preferably forming an angle between 0° and 20° with respect to the bottom wall 21 or with respect to the plane perpendicular to the compression axis 290 of the pocket 2;
- around the first slope, a second slope 51 of the deformable wall 22 forming an angle between 25° and 75° with respect to the bottom wall 21 or with respect to the plane perpendicular to the compression axis 290 of the pocket 2; and
- around the second slope, a third slope 52 of the deformable wall 22 forming an angle between 50° and 100° with respect to the bottom wall 21.

This first slope or central part 50 located substantially in the center of the button is more rigid than the deformable wall 22 surrounded by the deformable wall 22 (typically formed by a thicker wall) therefore more rigid than the slopes 51 and/or 52.

The deformable wall 22 of the button is integral with the central wall 50.

This additional thickness of the slope 50 or central wall 50 constitutes a braking means 55 of the wall 22 but also a hollow and/or a bump at the position of the rail/slide pair or even the fitting of the piston 420 in the conduit 430 may increase this braking.

The braking means 55 is created by the part 50 arranged to deform a larger perimeter of the wall 22 compared to the pressing that would be more point-like without part 50. The wall 50 comprises a surface of at least 50 mm2, even at least 70 mm2 and even at least 100 mm2 having a movement guided by a guide means 251 in order to prevent the wall 50 from yielding to the maximum pressing force. The central wall 50 of the button 250 has a width of at least 8 mm, even at least 10 mm and even at least 12 mm (measured on the plane perpendicular to the compression axis 290 of the pocket 2). The compression axis 290 of the pocket 2 corresponds to the axis of movement of the part 50 and is parallel to the guide means 251.

The pressing force is arranged to decrease by at least 30% or at least 40% at the start of the movement of the central part 50 (from its rest position). Preferably, the maximum pressing force 140 on the pressing surface 25 (in the undeformed state of the wall 22) to trigger the deformation of the wall 22 is at least 1.6 times and even 1.8 times or even even at least 2 times greater than the force that must be exerted on the button to continue the deformation between the first and the second millimeter of displacement of the pressing wall 25 towards the bottom wall 21 and/or between the second millimeter and the third millimeter of displacement of the pressing wall towards the bottom wall 21.

The guide means 251 comprise at least one guide wall and preferably at least one rail 112 and/or a slide 113, these guide means 251 being integral with the central wall 50. The guide means 251 preferably comprise merely 1 to 3 guide means (or rail 112 and/or a slide 113) but preferably two guide means (or rail 112 and/or a slide 113). In the case of a guide means, it may comprise a cylinder that is preferably open by at least 240 degrees.

The central wall 50 of the button 250 comprises walls being thicker than the wall 22 and/or stiffened by the guide means 251 and integral with the wall 22 or parts of the wall 22 if it comprises for example strips. The guide element 251 is a wall oriented towards the bottom wall 249 of the elastic pocket 255 and substantially parallel to the direction 140 and 290, preferably substantially perpendicular to the wall 50 (perpendicular to the surface of the wall 50 on the side of the elastic pocket 255).

The guide means 251 (more precisely the rail 112 and/or the slide 113) is arranged to guide the pressing surface. The element 251 is placed in the pocket 34 but is not in the pocket 2, it does not pass through the bottom wall 249 (or the bottom wall 21).

The guide means 251 of the button 250 (or guide wall 251) and the central wall 50 are arranged to translate and to guide the pressing surface 25.

The guide means 251 of the button are arranged to cooperate with a fixed element 252 and/or hollow 252 of the bottom wall 249 of the bottom part 289.

The movable wall 420 is integral with the central part 50 being itself integral with the wall 22, there is continuity of material between the deformable wall 22, the wall 50 and the piston 420.

The pocket 34 surrounds the pocket 2 and is delimited by the wall 22 and is delimited partly by the wall 50 for at least 10% and even at least 20%.

The walls 22 of the button 250 form a return means for the movable wall 420 and the wall 50, the piston 420 being arranged to translate, inside the conduit 430 or outside the piston 430. Around the piston 420 and the conduit 430 or piston 430 the guide means 251 cooperates with the bottom wall 249 (a fixed element 252 and/or hollow 252) (preferably rails 112 and/or slides 113) being arranged to guide the central part 50 and the wall 420 by translation. The rail 112 or the slide 113 is fixed to the part 50 while respectively the slide 113 or the rail 112 is fixed to the bottom wall 249. The guide means 251 are arranged around the piston 420 preferably separated by at least 7 mm and even at least 10 mm (measured relative to the plane perpendicular to the compression axis 290 of the pocket 2). The pair 251/252 is arranged so as not to compress the fluid. The pair 251/252 does not delimit pocket 2.

Preferably the wall 50 of the button 250 is substantially in the continuity of the wall 22. The pockets 2 and 34 have an interior volume delimited partly by the wall 50, pressing the pressing surface 25 causes a simultaneous reduction of the pockets 2 and 34.

The wall 22 is integral with the wall 50 itself integral with the movable wall 420 and the rails 112 and/or slides 113, the movable wall 420 being arranged to translate, the translational movement being guided by the means 251 cooperating with an fixed element 252 and/or hollow 252 preferably rail 112/slide 113 pair, each rail 112 and/or slide 113 is arranged to guide the pressing surface 25. The central wall 50, the deformable wall 22, the piston 420, the guide means 251 (or wall 251) are made in one part without discontinuity of material preferably polypropylene of bending modulus of at least 300 Mpa and even at least 500 Mpa and less than 14000 Mpa (Megapascal).

On average, this extra thickness of the wall 50 is preferably at least twice as thick as the parts 51 and/or 52 of the wall 22.

The part of the wall 22 forming the slope 50 is at least 1.5 times and even 2 times wider (according to a measurement axis parallel or substantially parallel to the bottom wall 21) or (measured on the plane perpendicular to the compression shaft 290 of the pocket 2).

With reference to FIG. 70*b* and with reference to FIG. 70*c*, in a variant with respect to FIG. 70*a*, the part 50 is substantially parallel to bottom wall 21, the part 51 is not present or barely present and the part 52 represents at least 70% of the wall 22 and even the entire wall 22 forms an angle of substantially 90° with the bottom wall 21 (substantially 90° with respect to the plane perpendicular to the compression axis 290 of the pocket 2). The part 52 (the side part of the button or the wall 22) comprises at least partly an elastomeric material that is more flexible than the part 50. The parts 52 and 50 of the wall 22 are made in a single part by overmolding or bi-injection. Referring to FIG. 70*b* the wall 22 and the dispensing part 23 are made in a single part called body 246. A bottom part 245 comprising the bottom wall 21 closes the pocket 2, preferably by welding or interlocking with the body 246. The bottom part 245 does not include the fixing means to the reservoir 89 (or the end piece 89).

The deformable walls 22 of the elastic pocket 255 and of the pocket 2 are formed at least partly by a foldable wall 301 (preferably forming a closed curve) comprising an assembly of strips or parts 146, 147 (preferably by successive alternation of parts 146 and 147). The parts 146 are arranged to be able to deform or even buckle under the action of a force exerted on the pressing surface 25. The parts 147 are formed by a flexible material, preferably elastic (more flexible than the strips or parts 146) and/or by openings or fluid passages allowing the passage of the fluid between the interior volume of the pocket 2 and the reservoir 6.

During the buckling or sudden deformation of the parts 146, each strip or part 147 is widened so that:

- the space L2 between two strips 146 after buckling (or sudden deformation) is greater than the space L1 between two strips 146 before buckling, and/or
- the circumference of the closed curve after buckling (or sudden deformation) is greater than the circumference of the closed curve before buckling (or deformation).

The strips 146 form elastic tongues preferably being in a rigid or semi-rigid material (for example a polypropylene with a flexural modulus of between 500 MPa and 1200 MPa) making it possible to resist a pressing force in a direction 140 in order to create a threshold force until the buckling (or sudden deformation) of the parts 146, the strips 147 are preferably made of elastomer (for example a TPO with a flexural modulus of between 10 MPa and 80 MPa). The parts 147 are arranged to form return means additional to the return means specific to the parts 146 (to restore the rest position, after the pressing force 140 on the wall 25 has been removed). The parts 147 are arranged to reduce the lateral stresses (at the position of L2 in the plane perpendicular to the compression axis 290 of the pocket 2) of the strips 146 avoiding deformation beyond the elastic limits of the material, the strips 147 are arranged to absorb the majority of the lateral deformation L2 minus L1. Preferably, the strips or parts 147 are wider than the strips or parts 146, these strips or parts 146 and 147 being made by overmolding or bi-injection in a single part with the central part 50, the strips 146 being in the same material as part 50. The strips or tongues 146 extend over the height of a cylinder forming an angle of less than 30 degrees with respect to the axis 290. Preferably the wall 301 substantially forms a cylinder generated by the strips 146.

The button 250 comprises on its side part the foldable wall 301 or wall 22 surrounding the movable wall 420 and comprising the guide means 251 between the movable wall 420 and the foldable wall 301. Preferably the wall 22 or 301 comprises at least 3 strips or tongues 146 forming an angle of less than 30 degrees with respect to the axis 290, and comprises at least 2 flexible parts 147 between two tongues 146.

In a variant with respect to FIG. 70*b*, and with reference to FIGS. 70*d*, the foldable wall 301 partly delimits the pocket 2, the wall 50 comprises the guide means 251 surrounding the foldable or deformable wall 22. The button 250 comprises the foldable wall 301 or deformable wall 22 in its central part and comprises the guide means 251 outside the foldable wall. Note that the wall 301 is sealed, the parts 146 and 147 completely surround the pocket 2, the parts 147 do not include a passage but flexible material (flexible parts 147).

The button 250 comprises in its central part the foldable wall 301 or deformable 22, and comprises the guide means 251 at the end of the wall 50 (forming a skirt) surrounding the foldable wall 301 or deformable wall 22. It is noted that the guide means 251 comprises a single guide wall forming a cylinder comprising rails and/or slides formed by slots inside or outside the cylinder.

The pocket 2 is delimited partly by a foldable wall 301 or deformable wall 22 arranged to block or close the feed orifice 41. The movable or deformable wall 22 comprises a flexible part 435 preferably obtained by overmolding or bi-injection on a part 146 which is more rigid than part 435 in the same material as the flexible parts 147, this flexible part 435 is in the pocket 2 and is oriented towards the bottom wall. The part 435 is not movable relative to the wall 22 (except for the compression of the material) and is arranged on a part of the wall 22 or a part integral with the wall 22 like the part 50, the guide means 251 or even the cap 70. The part 435 is arranged for, during an exercise of the pressing force 140 on the pressing surface 25 from the outside of the pocket 2, transmitting at least partly this pressing force 140 to the flexible part 435 by pressing on the bottom wall or a part secured to the bottom wall. It is noted that the fluid passes through an orifice 41 formed in the bottom wall and/or passes through a variable orifice 41 arranged to close or open between the wall 22 and the bottom wall 21, more precisely the periphery of the wall 22 on the side of the bottom wall comprising a flexible edge 426 which in a closed position is arranged to press against or fit into the bottom wall 21 to block or limit the passage of fluid from the pocket 2 to the reservoir 6 and/or part 34. In the open position, the wall 22 is arranged to move away from the bottom wall 21 to allow the fluid to enter the pocket 2 (this open position is obtained when the pressure on the pressing wall 25 is released in particular if the closure between the part 426 and the bottom wall is not completely sealed to avoid a suction effect). The wall 22 with its edge 426 forms a valve 4. In the case of the orifice 41 formed in the bottom wall (which can be combined with the variable orifice between the wall 22 and the wall 21), when a pressing 140 is on the pressing surface 25, the flexible part 425 blocks a passage of fluid from the pocket 2 to the part 34 or the reservoir 6; when the pressing 140 is released, the device is arranged so that the part 425 can move away from the wall 21, for example by having a slight hollow on the flexible part 425 to break the seal between the wall 22 and the wall 21.

In a variant with respect to FIG. 70*a*, and with reference to FIGS. 70*e* to 70*h*, the wall 51 is present but the wall 52 is not, the wall 51 forms an angle of more than 35 degrees with respect to the elongation plane of the device. Preferably, the device comprises side walls 22 making on average a single slope 51 of more than 35 degrees, or more than 40 degrees or even more than 45 degrees (measured on the plane perpendicular to the compression axis 290 of the pocket 2). The button 250 or the deformable wall 22 is not welded to the bottom wall 249 but simply bears against the bottom wall provided with blocking means 243 to prevent lateral sliding of the wall 22. The button 250 is clipped with the bottom part 289 or 245. Preferably the guide means 251 comprises at least one clip 247 for clipping with the element 252 (fixed and/or hollow element of the bottom wall), more precisely the rail 112 or the slide 113 of the button is clipped with respectively slide 113 or rail 112 of the bottom wall. There are holes 256 in the button 250 in the part 50 so as to form the clip(s) 247 and holes 256 in the bottom wall 249 so as to form the hollow(s) 248. The device comprises a means of indexing 244 to position the button 250. In the rest position the valve 4 is open, the opening being formed by the space between formed between the end 420*a* of the piston 420 and the end of the cylinder 430*a*. Preferably the opening 428 of the valve 4 (the sum of the spaces between the end of the piston 420*a* and the cylinder 430*a* in the rest position)

is preferably at least 120 degrees with respect to the axis of the piston 420. Preferably the opening 428 is at least 1 mm2 preferably at least 2 mm2. The opening 428 extends in the axis of the reservoir 6, when filling the device in a direction 87*a* corresponding to the elongation of the reservoir, with a non-viscous fluid such as water, part of the opening 428 is in contact with the fluid while the other part of the opening 428 is in communication with the exterior of the device and water enters the pocket 2. As indicated in the document WO2019002527 the device comprises a step of filling at least a part of the pocket 2 while it is open in communication with the outside of the device.

With reference to FIGS. 70*g* and 70*h*, the width 54*a* of the central wall 50 is preferably greater than 0.25 times, or even 0.30 times and even greater than 0.40 the width 54*b* of the wall 22 (without taking into account the edge of the wall 22 pressed against the bottom wall and measured on the plane perpendicular to the compression axis 290 of the pocket 2. With reference to FIG. 70*h*, preferably the width 54*a* of the central wall 50 is greater than 0.3 times, or even 0.4 times and even greater than 0.5 times the width 54*c* corresponding only to the width of the wall 22 which moves or deforms (measured on the plane perpendicular to the compression axis 290 of the pocket 2).

A description will now be given, with reference to FIGS. 70*i*, of an embodiment 20000 of a device according to the invention. This embodiment will only be described for its differences from the embodiment of FIG. 70*b*.

The parts 146 and 147 can be visible from outside the device. The pocket 34 surrounding the pocket 2 (between the foldable wall 301 and the piston 420/cylinder 430 pair) preferably includes air and does not include a fluid inlet orifice 163.

The parts 147 are formed by a flexible material and/or by air passages. The parts 146 and 147 surround (completely or not) the sealed piston 420 and the conduit or cylinder 430 which delimits the interior volume of the pocket 2. The cap 70 comprises at its base shoulders 302 which extend towards the outside of the device. The cap 70 is superimposed on the foldable wall 301 at the position of the shoulders 302. The strips or parts 146 and 147 are substantially parallel to the axis of elongation of the device and/or to the axis of the cap 70 and are made of a single part by overmolding or bi-injection with the cap 70. In a variant not shown with respect to FIG. 70*d*, the piston 420/cylinder 430 is replaced by the foldable wall 301, the foldable wall is in the cap 70 and the guide means integral with the wall 302 of the cap 70.

A description will now be given, with reference to FIGS. 71 to 73*a*, of an embodiment of device 21000 according to the invention. Unless otherwise stated, this embodiment will only be described for its differences from the embodiment of FIG. 70*a*.

In this embodiment the pocket 2 is outside the reservoir, the pressing surface 25 comprises the central wall 50. In this embodiment, the movable wall 420 does not delimit at least partly the interior volume of the pocket 2.

In this embodiment, the deformable wall 22 at least partly delimits the interior volume of the pocket 2. The elastic pocket 255 coincides with the pocket 21, the bottom wall 249 coincides with the bottom wall 21 (relative to the device 19000, in the description the pocket 255 may be replaced by the pocket 2 and the bottom wall 249 replaced by the bottom wall 21). There is no piston 420 and cylinder 430 forming the pocket 2, the fluid arrives directly in the pocket 2 through the membrane of the intake valve 4 without passing through an intermediate pocket 34.

In this embodiment, the wall 22 is arranged to press directly or indirectly on the valve 4 more precisely the wall 22 comprises at its periphery a part 53 arranged to, during an exercise of the pressing force 140 on the pressing wall 22 from outside the pocket 2, transmit at least partly this pressing force 140 to the feed valve 4, either directly to the feed valve 4, or either as shown in FIG. 73*a* through a pressing member 139 of the feed valve comprising a tongue 138 being arranged to press on the feed valve 4, more precisely press on its membrane to press the feed valve 4 against the bottom wall part 21. When pressing on the wall 25, the part 53 of the wall 22 is arranged to deform before the deformation of the other parts of the deformable wall 22, more precisely before the sudden deformation of the walls 51 and 52. The wall 50 of the button 250 is arranged to move by translation towards the bottom wall being guided by the rail/slide couple. The pressing member 139 of the feed valve 4 is integral with the part of the bottom wall 21. The member 139 belongs to the same part as the bottom wall 21 and comes from the molding of the bottom wall 21 and cavity 8 of the dispensing valve.

The feed valve 4 (more exactly on its membrane) comprises a bubble or a bump 135 (to join the pin 139 and have a more centered effort) which can be in contact with the bottom wall 21 by forming a spring.

The part 50 integral with the wall 22 forming the slope 50 has a width 54*a* (along a measurement axis parallel or substantially parallel to the bottom wall 21 or measured on the plane perpendicular to the compression axis 290 of the pocket 2) equal on average to at least 0.3 times or even at least 0.4 times the width 54*b* of the pocket 2 (measured for the part of the pocket 2 closest to the wall 21 and measured along an axis parallel or substantially parallel to the bottom wall 21). The width 54*a* of the central wall 50 is greater than 0.4 times or even 0.5 times the width 54*c* corresponding only to the part of the wall 22 which moves or deforms towards the wall the pressing axis 140 (measured on the plane perpendicular to the compression axis 290 of the pocket 2).

In this device with reference to FIG. 73, there is a reinforcement 131 of the wall 50 integral with at least 2 guide walls 251.

The wall 22 and/or the bottom wall 22 is provided with a skirt 155 having a height at least at least as high, in the same direction of measurement, as the height at the entrance to the cavity 8 on the pocket side. 2 (i.e. minimum of 1.5 mm or 3 mm).

This skirt 155 allows the insertion of the valve 5 into the cavity 8 from inside the pocket 2 or the outlet 24 perpendicular or substantially perpendicular to the direction of measurement of the height of this skirt 155. Thanks to this skirt 155, the bottom wall 21 takes the form of a flat or substantially flat surface 156 and facilitates the welding of the bottom wall 21 to a face 56 of the flexible bag 14 forming the reservoir 6.

The bag 14 is an open film before being welded to the wall 21, then is folded (along the fold 144) and closed on itself in order to form the interior space of the reservoir 6, the outlet 24 is lateral the dispensing spout 30 is located at the position of the fold 144. The dispensing spout 30 protrudes less than 3 mm and even protrudes less than 1 mm with respect to the edge of the bag 14 once formed.

With reference to FIG. 72 in another variant, the part 53 comprises a flexible part 435 which may or may not go around the deformable wall 22, the deformable wall being arranged for during an exercise of the pressing force 140 on the pressing surface 25 from outside the pocket 2, transmitting at least partly this pressing force 140 to the flexible part

435. The characteristics of the device 19000 can be combined with the characteristics of the device 21000, in particular the pocket 2 may comprise a successive alternation of parts 146 and 147.

It is noted that the part of the wall 22 forms a hollow 57 which surrounds the movable part of the wall 22, thus the force 140 is better centered, the movable part of the wall 22 is protected and the thickness of the device is less for the same dose distributed. It is noted that the deformable wall 22 forming the hollow 57 is located opposite the orifice of the valve cavity 8. There is a straight line passing through the cavity 8 of the dispensing valve and crossing three times or four times the deformable wall 22.

With reference to FIGS. 74, 75 and 76, each of the embodiments or variants previously described comprising a deformable wall 22 (preferably delimiting at least partly the interior volume of the pocket 2) which is not located inside of the reservoir 6, may be equipped with a button 162 equipped with a thread 164, preferably screwed to an element integral with the wall 22 which is located at the top of the concave shape of the wall 22 ((for example at the cap 70 if the latter is located on the top of the wall 22 (FIGS. 4, 13, 14, 16, 18, 23, 24, 30, 32, 34, 35, 40, 45, 69 on the example of the FIG. 75) or on a rod or support 166 added to the top of the wall 22 provided with a screw thread (FIGS. 19, 38, 56, 58, 72 on the example of FIG. 74)).

This screw thread 164 is arranged to, depending on the screwing of the plug 162 on the wall 22, adjust a space between the plug 162 and the bottom wall 21 or another part of the device according to the invention, or in general to adjust the maximum possible amplitude 165 of the movement of the button 162 on the wall 22, and therefore adjust the maximum quantity or product delivered by the outlet 24 of the device according to the invention when the button 162 is pressed (and therefore adjust different states compression of the pocket 2 by the button 162).

The pressing surface 25 can be located at least partly on the button 162 and/or on the cap 70 (which can protrude from the button 162 or pass through the button 162) and/or on the support 166 (which can protrude from the button 162 or cross button 162).

The device according to the invention may comprise (between the button 162 and another part of the device such as for example on a crown 158 surrounding the pocket 2 and in contact with the button 162) sensitive notches 167*b* and/or dosage notches 167*a* arranged to block different screwing positions of the button 162 on the element 70 or 166 fixed to the wall 22 and therefore different states of compression of the pocket 2 by the button 162. The crown 158 comprises on its internal face grooves arranged to cooperate with at least one tongue 159*b* of the button 162 and comprises on its outer face hollows arranged to cooperate with at least one bump or a small wall 159*a* integral with the side walls of the button 162. The hollows indicate a metering marked on a wall of the device, more precisely on the bottom wall 21. The device is arranged so that between a minimum metering position and a maximum metering position the rotation of the button is less than 360 degrees. In the maximum dosage position, the button is arranged so as not to unscrew, for example a finger on the bottom wall comes into abutment with the tongue 159*b*. Referring to FIG. 74, the support 166 is arranged to enter the bottom wall 21 on the side of the feed valve 4, the thread 164 is inside the support.

With reference to FIG. 76, it is noted that the hollows are not positioned regularly on the crown due to the nonlinear deformation of the pocket. It is noted that this device makes it possible to purge the chamber 2 in a position of the button 162 offering a large displacement of the pocket 2, this avoids defusing the device and makes it possible to dispense low doses.

In a method according to the invention for all the embodiments of devices according to the invention previously described:

- the reservoir 6 or product to be dispensed is filled, then once the reservoir 6 is filled or produced, the opening 87 is closed, then
- with reference to FIG. 68*a*, the device 580 according to the invention is placed with the head upwards (i.e. the pocket 2 located above (relative to the earth's attraction) at least part of the reservoir 6) in an enclosure 500 under vacuum (preferably with a depression of at least 0.5 bar relative to a pressure of one atmosphere) so that the air leaves the device according to the invention, for example via the dispensing valve 5 (the vacuum being carried out by suction means 526), then
- still in the enclosure still under vacuum (preferably with a vacuum of at least 0.3 bar or even 0.5 bar relative to a pressure of one atmosphere) the device is tilted (typically by tilting a support 501) according to the invention in a new position by tilting it by at least 30 degrees and even by at least 90 degrees (preferably 180 degrees) with respect to the vertical, and
- with reference to FIG. 68*b*, while the device according to the invention is in this new position and/or while the device according to the invention is tilted in this new position, the pressure is increased in the enclosure (preferably up to one atmosphere, typically by bringing in air through an air inlet 525).

This method of priming a device according to the invention is implemented by a system comprising:

- an enclosure arranged to accommodate a device according to the invention in an initial position with the head upwards (i.e. preferably the outlet located above (relative to gravity) at least part of the reservoir)
- means for placing the enclosure under vacuum (preferably with a depression of at least 0.3 bar or even 0.5 bar relative to a pressure of one atmosphere) so that the air leaves the device according to the invention (for example by its dispensing valve); these vacuum means preferably comprise suction means, then
- means for tilting a device according to the invention located in the enclosure into a new position by tilting it by at least 30 degrees and even preferably by at least 90 degrees (preferably by 180 degrees) with respect to the vertical (in relation to its initial position); these tilting means typically comprise means for tilting the enclosure or a support located in the enclosure; And
- means for increasing the pressure in the enclosure (typically comprising means for bringing air into the enclosure via an air inlet).

Referring to FIGS. 77 and 78, for each of the device embodiments according to the invention, in particular those that can be implemented for a "spray" (for example the embodiments of FIGS. 69 to 74), the feed valve 5 includes:

- a movable membrane 116, arranged to move between the open position and the closed position of the valve 5, and
- a junction element 115, which carries the movable membrane of the valve 5, and which is held in the dispensing channel connecting the outlet 24 inside the pocket 2. This dispensing channel comprises the cavity 8. Preferably, the junction element is held by tightening the internal walls of the dispensing channel on the junction element.

The dispensing channel 114 comprises means 136 arranged to push the junction element 115 against the internal walls of the dispensing channel.

These means 136 typically comprise at least one element (such as teeth or small walls) which emerges from the internal walls of the dispensing channel and which is inserted into a hollow 137 of the junction element so as to push, from the inside of the junction element, two parts of the junction element in two opposite directions but both directed towards at least one of the internal walls of the dispensing channel.

The end of the membrane 116 (opposite the end of the membrane 116 joining with the junction element 115) carries a pin 117.

This pin 117 is inserted into a part comprising a nozzle 59 and arms 132.

The stud 117 and the nozzle 59 are arranged to leave between them at least one channel arranged to create a vortex of the fluid to be dispensed.

The arms 132 are arranged to push the valve 5 into the channel 114 during the insertion of the nozzle 59 into the channel 114.

With reference to FIGS. 79 to 86, unless otherwise stated, only the differences will be described with respect to device 101 of FIG. 3.

In this device 22000, the movable or deformable wall 22 is not in the reservoir, it is superimposed on the reservoir 6. The bottom wall 21 is substantially horizontal. The vertical and the horizontal are not defined with respect to the direction of earth's gravitation. We choose the vertical and horizontal terms by convention as two orthogonal directions. The wall 22 is preferably a deformable wall but may also be a movable wall.

The bottom part 289 includes the bottom wall 21. The end piece 89 or the skirt 148 is arranged to fix the bottom wall to the reservoir. The bottom wall is horizontal or substantially horizontal, the dispensing conduit 114 is horizontal or substantially horizontal.

The device comprises a cap 70, said cap being placed above the bottom wall 21. The cap 70 comprises the deformable wall 22 and the pressing surface 25. The pocket 2 is delimited by the cap 70 and by the bottom part 289.

The cap 70 is formed in one part:
- is formed of only one material, without discontinuity of this material, or,
- is made of two materials or of at least two materials and is a part resulting from a bi-injection molding or from an overmolding of material(s) on another material.

The cap 70 includes a skirt 149 extending vertically or substantially vertically from the pressing wall 25 or from the top of the cap 70. The bottom part 289 includes a skirt 148 extending from the bottom wall 21 arranged to fix the bottom wall 21 to the reservoir 6 and receive the cap 70, the bottom part and bottom wall is fixed by interlocking, by screwing or even gluing or welding. The skirt 149 of the cap 70 fits over the skirt 148 of the bottom part 289.

Referring to FIGS. 79, 80 and 81, the bottom part 289 comprises at least one orifice or filling hole 87 opening onto the inside of the reservoir (more precisely placed on the periphery of the bottom part). The cap comprises at least one plug 310 comprising the deformable wall 22 delimiting at least partly the interior volume of the pocket. Preferably, with reference to FIG. 79, the bottom wall 21 comprises two orifices 87. The skirt 148 and/or the return 361 is fixed by gluing or welding to the reservoir 6.

The reservoir 6 comprises at least one layer of sealing material 352 such as a PE or PP or an adhesive arranged to be welded or glued to the skirt 148 of the bottom part 289. Preferably the reservoir comprises a layer 360 which is more rigid at the exterior than the interior layer 352 such as cardboard or cellulose material.

It is noted that the skirt may include a return or transverse wall 352 forming an abutment during the insertion (for the welding or gluing operation) of the bottom part 289 from inside the reservoir 6.

According to another aspect of the invention, there is proposed a method for manufacturing a device comprising a reservoir of fluid to be dispensed, a part of and a cap provided with a plug, comprising:
- In a first step of manufacturing the device, the bottom part is glued or welded to the reservoir (the skirt 148 and/or the return 361) by inserting the bottom part from inside the reservoir (the part of the reservoir without the bottom or lower part of the reservoir).
- In a second step of manufacturing the device, the reservoir 6 is closed by gluing or welding the lower part of the reservoir to the upper part provided with the bottom part.
- In a third step, the reservoir is filled through the filling hole(s) 87, 87*b*
- In a fourth step, the at least one filling opening 87 of the bottom part is closed with the at least one plug 310, the cap 70.

The walls 118 of the reservoir are fixed between the skirt 148 and/or the return 361 and the cap 70.

Preferably, the outlet orifice 24 is elongated so as to take the form of a channel 189 inside a spout 30, this spout 30 being part of the cap 70, the orifice 24 being connected to the cap orifice 188 close to and preferably in contact with the skirt 148 of the bottom part or the bottom part 289. The channel 189 connects the dispensing orifice 24 to the cap orifice 188 by crossing the skirt 149, the outlet orifice 24 passes through the skirt 149. The outlet 24 and/or the channel 189 is lateral.

The outlet orifice 24 is arranged so that the fluid exits in a lateral direction; the channels 114 and 189 have substantially the same lateral direction.

The dispensing conduit 114 connects the dispensing orifice 355 to the outlet orifice 24. The dispensing conduit 114 and the bottom wall 21 is formed in the bottom part 289 and opens into an orifice 340.

The device 22000 comprises a feed orifice 41 passing vertically through the bottom part 289 (more exactly passing through the wall 21) and arranged to let the fluid pass to the inside of the pocket 2.

The device 22000 comprises a dispensing orifice 355 passing vertically through the bottom part (more exactly passing through the wall 21) and arranged to let fluid out from inside the pocket, preferably at least into the dispensing conduit 114.

The dispensing valve 5 which, in an open state, is arranged to let out fluid from inside the pocket 2 through the dispensing orifice 355, and, in a closed state, is arranged not to let out fluid from inside pocket 2 through dispensing orifice 355.

Preferably, the valves 4 and 5 form a single part via a junction element 115.

The dispensing valve 5 comprises a so-called dispensing membrane 116.

The feed valve 4 comprises a so-called feed membrane 119.

In its closed state, the feed valve 4 (more exactly the membrane 119) blocks the orifice 41, and is pressed against the bottom part 21. In the closed state of the valve 4, the membrane 119 extends according to the elongation of the conduit 114, that is to say horizontally or substantially horizontally.

In its open state, the feed valve 4 (more exactly the membrane 119) does not block the orifice 41, and is separated at least partly from the bottom part 21 (more precisely separated from the seat 127) with respect to its closed state.

In its closed state, the dispensing valve 5 (more exactly the membrane 116) blocks the orifice 355, and is pressed against the bottom part 21. In the closed state of the valve 5, the membrane 116 extends horizontally or substantially horizontally.

In its open state, the dispensing valve 5 (more precisely the membrane 116) does not block the orifice 355, and is separated at least partly from the bottom part 21 with respect to its closed state.

The feed valve 4 is fixed to the wall 21 by a junction element 115. The dispensing valve is fixed to the bottom wall by junction element 115. The intake 4 and/or distribution 5 valves are independent and removable.

The intake valve 4, more precisely the membrane 119 is not part of the cap (is not part of the cap), is not manufactured or injected with the cap 70 or the bottom part 289, it is not there is no continuity of material from the intake valve 4 with the cap 70 or the bottom part 289. The dispensing valve 5 or its seat is not part of the cap, and is not manufactured or injected with the cap or the bottom part 289, there is no continuity of material from the dispensing valve 5 with the cap 70 or the bottom part 289. The bottom wall is fixed, the bottom wall 21*n* is not movable relative to the skirt 148.

The device 22000 may further comprise:

(in the "atmospheric" version) a tube plunging into the reservoir and forming a feed conduit (vertical or substantially vertical) arranged to conduct the fluid from the reservoir 6 and up to the feed valve 4; this tube can be part of the bottom part 289 or be a separate part; or (in the "airless" version) a piston which rises inside the reservoir 6 or a flexible bag which is crushed as fluid is extracted from the reservoir 6.

The device comprises means to facilitate priming, a first means as illustrated in FIGS. 79 to 83 is a protective element 126 of the cavity 134 of the bottom wall 21 more exactly in a circumference of the feed orifice 41 this in order to protect the sensitive part 370 (periphery of the moving part of the valve 4).

An element 126 of the bottom wall 21 only partly covers the valve 4 with respect to a direction 140 perpendicular to the bottom wall 21, preferably so that pressing on the surface 25 along this direction 140 cannot lift the valve 4 or limits the lifting of the valve 4 by an overpressure effect in the pocket 2 during the compression phase of the pocket 2.

In the cavity 134 is inserted at least a part of the movable periphery 370 (370 only indicates the movable part of the membrane 119 during product pumping operations) of the feed membrane 119.

More exactly:

two opposite movable side edges 371, 372 of the feed membrane 4, and a front movable edge 376 of the feed membrane 119, this movable edge 376 forming the junction between the two lateral movable edges 371, 372, these edges being inserted at least partly into the cavity 134.

The front movable edge 376 is farther from the junction element 115 than the movable edges 371 and 372.

Preferably at least 50% of the movable perimeter (371, 372,376) is housed between the cavity 134 more precisely between the feed seat 127 and the element 126. It is noted that the perimeter 370 is tapered so as to marry the seat of feed 127. The feed membrane 119 comprises a thickness which becomes thinner in the direction of at least a part (371, 372, 373) of the periphery of the feed membrane.

Another means to facilitate priming of the device consists of a bump 350 or bumps 350 on the periphery of the bottom wall, these bumps being discontinuous or not (for example four bumps if the pocket is square) these bumps 350 are distributed the periphery of the bottom wall 21 except at the center. Referring to FIG. 80 showing the compressed state of the movable or deformable wall 22 (that is to say when the central part of the wall 22 is pressed against the bottom wall 21) at least one bump 350 is arranged to fit into the bend or deformation 190 formed at the periphery of the wall 22. Compared to a substantially planar bottom wall without bump 350 the air remaining in the pocket 2 (in its compressed state) is reduced by at least least 20% or even at least 40%. Preferably, the height of these bumps is at least 1 mm or even at least 2 mm towards the outside of the device relative to the center of the bottom wall. The bottom wall comprises one or more bumps arranged to reduce the volume of air in the pocket during the compression of the pocket during the priming of the device.

With reference to the variant FIG. 85 in this variant of the device 22000 the movable or deformable wall 22 is arranged to press directly or indirectly on the feed valve 4 more precisely the movable or deformable wall 22 comprises at its periphery a part 53 or a pin 398 arranged (or rigid part) for during an exercise of the pressing force 140 on the pressing surface 25, from the outside of the pocket 2, to transmit at least partly this pressing force 140 to the feed valve 4 directly or indirectly with or through a pressing member 139 (as shown in FIG. 73*a* and the variant in FIG. 85, more precisely a pin or rigid part 198 and/or a tongue 138) of the feed valve 4 being arranged to, by pressing on the feed valve 4, close the valve 4 (by pressing the feed valve 4 against its seat 127 by pressing on the membrane 119).

With reference to FIGS. 72 and 85 where the part 53 or the pin 198 (or rigid part) of the pocket 22 directly presses the valve 4 more precisely on a bubble 135 of the membrane 119 of the feed valve 4 being arranged to, by pressing on the feed valve 4, close the valve 4 (by pressing the feed valve 4 against its seat 127 by pressing on the membrane 119).

The priming is thus facilitated by preventing air from passing through the orifice 41. The part 53 or the pin 198 (or rigid part) of the wall 22 or the pressing member 139 comes into contact with the valve 4.

The tongue 138 extends horizontally in the feed orifice 41. The pressing member 139 of the feed valve 4 is integral with the bottom part 289 (more exactly integral with the bottom wall 21) but step of the pressing surface 25. The member 139 belongs to the same part as the bottom part 21. The member 139 comes from the molding of the bottom wall 21 and of the channel 114, the pin 198 of the member 139 is preferably vertical, extending from the bottom part, more precisely from the tongue 138.

Referring to FIGS. 84 and 85, the movable or deformable wall 22 is arranged to press directly or indirectly on the valve 5 more precisely the movable or deformable wall 22 comprises at its periphery or in the center a part 153 or a pin 338 arranged, during an exercise of the pressing force 140 on the pressing wall 25, from the outside of the pocket 2 delimited partly by a movable or deformable wall, to transmit at least partly this pressing force 140 to the valve 5 either directly on the valve 5 more precisely the membrane 116, or either as shown in FIG. 85 through a pressing member 339 of the valve 5 comprising a tongue 338 and/or a pin 398 being arranged, by pressing the valve 5, open the valve 5, thus priming is facilitated by helping the air to pass through the orifice 355. The part 153 or the pin 398 of the wall 22 or the pressing member 339 comes into contact with the valve 5 pressing on the membrane 116, more exactly by moving the dispensing valve 5 away from the bottom part 289 (more exactly by moving it away from the bottom wall 21).

The pressing member 339 of the dispensing valve 5 is integral with the bottom part 289 (more exactly integral with the bottom wall 21 and has just been molded, with the pin which forms the channel 114).

During the compression of the pocket 2 the pressing member 339 of the dispensing valve 5 is arranged to move after the pressing member 139 of the intake valve arranged during an exercise of the pressing force 140 on the pressing wall 25 from outside the pocket 2. The pressing member 139 of the intake valve is arranged to move in the inlet orifice 41 and the pressing member 339 of the dispensing valve is arranged to move into the dispensing orifice 355.

Note that the wall 21 includes a tongue 138 which extends (preferably horizontally) into the feed orifice 41.

The wall 21 includes a tongue 338 which extends (preferably horizontally) into the dispensing orifice 355.

With reference to FIG. 84 during a complete pressing from the state of rest on the pressing surface 25 the pressing member of the dispensing valve 5 presses after 70% of the compression of the pocket 2 while the pressing member of the feed valve 4 presses on the feed valve before 30% of the compression of the pocket 2 or before 2 mm of deformation of the top of the wall 22.

The pressing wall 25 comprises, on the pocket 2 side, a concave surface or part 254 of the movable or deformable wall 22 being surrounded by a flexible edge 253 of the movable or deformable wall 22 and being surrounded by the pressing surface 25. The edge 253 comprises the part 53 and/or the part 153, these parts being placed preferably on a flexible part of the edge 253 forming a flexible portion of at least 180 degrees, and even 360 degrees around pressing surface or the compression axis 290 (perpendicular to bottom wall 21 around the center of the bottom wall).

The part 254 of the wall 22 forms with the edge 253 a junction line 293 of the wall 22 (preferably forming a circle), this junction line 293 of the wall 22 is not resting on the wall 21, the edge 253 is cantilevered and rests on the periphery of the bottom wall 21 and/or on the skirt 148 (towards the peripheral edge of the pocket 2) forming a support line 292 of the flexible edge 253. The flexible edge 253 is between the junction line 293 and the support line 292 having a width of at least 3 mm and even a width of at least 4 mm or even at least 5 mm (measured in a plane perpendicular to axis 140).

During a pressing 140 on the pressing surface, the flexible edge 253 surrounding the pressing surface or surrounding the part 254 deforms towards the bottom wall at the position of the junction line 293, preferably the entire junction line 293 preferably moves substantially parallel to the bottom wall 21 (or moves at an angle of less than 20 degrees relative to the bottom wall 21) preferably at the start of the compression of the pocket 2, before 10% (from the initial volume of the pocket 2) of the compression of the pocket 2, or at least before 30% (from the initial volume of the pocket 2) of the compression of the pocket 2, or at least before 50% (from the initial volume of the pocket 2) of the compression of the pocket 2 (along the compression axis 290 at the center of the pocket 2). The flexible edge 253 comprising part 53 and/or 153 deforms (at least at part 53 and/or part 153) by at least 0.1 mm or even 0.3 mm towards the bottom wall before 10% (from the initial volume of the pocket 2) of the compression of the pocket 2, or at least before 30% (from the initial volume of the pocket 2) of the compression of the pocket 2, or at least before 50% (from the initial volume of the pocket 2) of the compression of the pocket 2 (along the compression axis 290 at the center of the pocket 2). Preferably the entire edge 253 moves at least 0.2 mm and even at least 0.4 mm (and even at least 0.8 mm if the edge 253 comprises a flexible material) towards the bottom wall before 30% of the compression of pocket 2 at its junction line 293.

It is noted that the pins 198 and 398, being respectively secured to the part 53 and the part 153, move towards the bottom wall by the same distance as the parts 53 and 153 respectively.

Referring to FIGS. 85 and 86, the device comprises two pressing means 53 and 153, when pressing from the rest state of the device, it is preferable that pressing the intake valve 4 by the part 53 (directly or indirectly) starts before the pressure on the dispensing valve 5 by the part 153 (directly or indirectly), the pressure on the intake valve 4 by part 53 is done before 30% (from the initial volume of pocket 2) of the compression of pocket 2, and the pressure on the dispensing valve is done after 50% (from the initial volume of pocket 2) of the compression of pocket 2.

The edge 253 is preferably substantially planar parallel to the bottom wall or forming an angle of less than 20 degrees with the bottom wall. The pressing wall or pressing surface 25 comprises the deformable or movable wall 22. The surface 253 can comprise a flat part and/or comprise at least one hollow or hollows and/or bump(s) in order to create a zone more flexible (and deformable) in order to have more stroke towards the valve 4 and/or 5 and to have a greater displacement. The part 53 and 253 is less thick than the part 254 on average or the part 253 is made of a more flexible material than the part 254, more flexible at least than a part of the pressing surface 25, and preferably more flexible than the top of the pocket 2.

Referring to FIG. 85*a* in a variant the movable or deformable wall 22 is arranged to press directly or indirectly on the feed valve 4 comprising a flexible part 435 preferably obtained by overmolding or bi-injection (or in the same material as the flexible edge 253 in the case where it is made of elastomer), this flexible part 435 secured to the flexible edge 253 is in the pocket 2 is oriented towards the bottom wall. The flexible part 435 coincides with the valve 4 and is not movable with respect to the wall 22. The part 435 is arranged to, during an exercise of the pressing force 140 on the pressing surface 25 from the outside the pocket (2), at least partially transmit this pressing force 140 to the flexible part 435 by pressing on the bottom wall or a part integral with the bottom wall to block or close the feed orifice. The pressing part 53 or rigid part 198 comprising the flexible part 435 and forming the valve 4.

The part 53, the part 153, the pins 198, the pin 398, the flexible part 435 (valve 4) all these parts are integral with the edge 253. The edge 253 is arranged to, during an exercise of the pressing force 140 on the pressing surface 25 from the outside of the pocket 2 (delimited partly by a movable or deformable wall), transmit at least partly this pressing force 140 to the feed valve 4 to press the valve 4 on the bottom wall and/or transmit at least part of this pressing force 140 to the dispensing valve 5 by pressing on the dispensing valve to detach the dispensing valve from the bottom wall 21, more precisely to detach the membrane 116 of the dispensing valve 5 from the dispensing seat of the valve 5 formed on the bottom wall 21.

All the aspects of the different variants facilitating priming may be combined in particular, the bump 350, the protection element 126, the pressures on the intake valve 4 and/or the dispensing valve 5.

In the variants of FIGS. 84 and 86 of the device 22000 does not include caps 310 and the cap 70 may rotate relative to the bottom part 289, it may rotate 360 degrees in the variant of FIG. 85 but not completely for the variant of FIG. 84 due to the pin 198 which interferes with the bottom wall in this case a bean-shaped opening in the bottom wall 21 is provided allowing rotation.

The cap 70 is arranged to rotate around with respect to the bottom part 289 (preferably around a vertical axis perpendicular to the wall 21, this axis preferably passing through the center of the wall 21) between the open position and a cap 70 closed position for which the cap 70 (more exactly the skirt 149) blocks a fluid outlet through the dispensing orifice 355 to the outside of the device. The cap 70 is arranged to block or stop the dispensing of the pocket 2 (up to the filling of the channel 114) in a closed position the orifice 340 is covered by the skirt 149 and in an open position the orifice 340 is released and communicates with the orifice 188 opening the passage from the channel 114 to the channel 189.

The bottom part 289 or the bottom wall 21 is clipped onto the neck 85 and may rotate relative to the reservoir 6, so as to be orientable by a user. Thus, to achieve the closure, either the bottom part 289 is held by a part 195 and the cap 70 is turned, or the cap 70 is held and the bottom part 21 is turned with the part 195. The channels 114 and 189 may rotate relative to the same axis and communicate when they are more or less opposite. An orifice 188 of the cap 70 is in communication with an orifice 340 of the bottom part.

Visual markers 365, 366 make it possible to make the visual distinction, from outside the device, between the open and closed positions of the cap 70. The skirt 148 comprises the part 195 of the bottom part 89 visible from the outside of the device being longer than the skirt 149, this visible part 195 does not go around the wall 21 and includes the notches or visual marks 366 while the skirt 149 includes the notches or visual marks 365.

In this closed position, the dispensing conduit 114 does not lead to the outlet orifice 24 or the orifice 188 so that the cap 70 (more exactly the skirt 149) blocks the dispensing conduit 114.

Referring to FIG. 82, the device 22000 comprises two sealing lines 341 and 342 on either side of the orifice 340, more precisely hollowed lines and/or bumps at the position of the skirts 148 and 149. In a variant not shown the sealing line 341 comprises one or two sealing skirts of the cap 70 arranged to rotate in the grooves of the bottom wall 21.

In all the embodiments, the reservoir can comprise external walls made of cardboard (more generally made of cellulose) and internal walls or film made of plastic.

Note that in all the embodiments described above, the device is arranged to operate (i.e. to distribute fluid through the outlet via the feed and/or dispensing valves) with its distribution head upwards (i.e. outlet 24 located above reservoir 6) or downwards (i.e. outlet 24 located below reservoir 6).

The invention claimed is:

1. A device for dispensing a fluid, comprising:
- a bottom part comprising a bottom wall,
- a pocket having an interior volume arranged to contain the fluid,
- a pressing surface arranged to, under an exertion of pressure, reduce the interior volume of the pocket,
- a feed orifice arranged to let the fluid pass to the inside of the pocket,
- an outlet,
- a dispensing valve, which in an open state, allows a passage of the fluid from inside the pocket towards the outlet, and, in a closed state, does not allow a passage of fluid from inside the pocket towards the outlet, and
- a cap or a button, said cap or button being placed above of the bottom wall, wherein
- the cap or the button partly delimits the pocket, and comprises:
- a movable or deformable wall surrounding the pressing surface,
- a flexible edge of the movable or deformable wall, which rests on the bottom wall and has a width between a junction line and a support line, and
- a dispensing orifice passing through the bottom part and being arranged to allow fluid to escape from inside the pocket, wherein the cap or the button is arranged to rotate between an open position and a closed position of the cap or the button so as to block or permit an outlet of fluid through the dispensing orifice to the outside of the device.

2. The device according to claim 1, wherein the cap or the button is formed in a single part comprising:
- the pressing surface,
- a skirt extending from the pressing surface, and
- the outlet passing through the skirt.

3. The device according to claim 1, wherein the bottom part comprises a skirt extending from the bottom wall arranged to be fixed on a reservoir.

4. The device according to claim 1, wherein the bottom part comprises at least one filling orifice or hole opening onto the inside of a reservoir.

5. The device according to claim 1, wherein the cap or the button comprises at least one plug arranged to block an orifice.

6. The device according to claim 1, wherein the cap or the button is made in a single part from the same rigid material, the flexural modulus of which is at least 500 megapascals.

7. The device according to claim 1, wherein the bottom wall comprises one or more bumps arranged to reduce the volume of air in the pocket during the compression of the pocket when priming the device according to the invention, and/or,
- an element of the bottom wall partially covers a feed valve with respect to a direction perpendicular to the bottom wall.

8. The device according to claim 1, wherein the movable or deformable wall is arranged
- to press directly or indirectly on a feed valve, wherein the movable or deformable wall comprises at its periphery a part or a pin or rigid part arranged to, during an exercise of the pressing force on the pressing surface from outside the pocket, transmit at least part of this pressing force to the feed valve either directly on the feed valve, or either to through a pressing member of the feed valve being arranged to, by pressing on the feed valve, close the feed valve, and/or
- to plug or close the feed orifice, wherein the movable or deformable wall comprises a flexible part fixed with respect to the movable or deformable wall, and oriented towards the bottom wall, and this flexible part is on a part of the movable or deformable wall or at the end of a pin or rigid part, and is arranged to, during an exercise of the pressing force on the pressing surface from outside the pocket, transmit at least part of this pressing force to the flexible part, and/or to press on the dispensing valve, wherein the movable or deformable wall comprising a part or a pin or a rigid part arranged to, during an exercise of the pressing force on the pressing surface from outside the pocket, transmit at least part of this pressing force to the dispensing valve either directly on the dispensing valve, or either through a pressing member of the dispensing valve being arranged to, by pressing on the dispensing valve, open the dispensing valve.

9. The device according to claim 1, wherein the flexible edge is arranged to, during an exercise of the pressing force on the pressing surface from outside the pocket, transmit at least partially this pressing force to a feed valve by pressing on the feed valve and/or transmit at least partially this pressing force to the dispensing valve by pressing on the dispensing valve.

10. The device according to claim 1, wherein the device comprises on the side of the pocket a concave part, made of the movable or deformable wall, forming with the flexible edge the junction line, the junction line is arranged to move before at least 30% compression of the pocket.

11. The device according to claim 1, wherein the junction line is arranged to move before at least 10% compression of the pocket.

12. The device according to claim 1, wherein the flexible edge has the width between the support line and the junction line of at least 3 mm.

* * * * *